United States Patent
Kang et al.

(10) Patent No.: US 10,394,328 B2
(45) Date of Patent: Aug. 27, 2019

(54) FEEDBACK PROVIDING METHOD AND ELECTRONIC DEVICE FOR SUPPORTING THE SAME

(71) Applicant: Samsung Electronics Co., Ltd., Suwon-si, Gyeonggi-do (KR)

(72) Inventors: Doo Suk Kang, Suwon-si (KR); Yo Han Lee, Seongnam-si (KR); Yong Joon Jeon, Hwaseong-si (KR); Bo Kun Choi, Seoul (KR); Jeong Seok Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 15/789,265

(22) Filed: Oct. 20, 2017

(65) Prior Publication Data
US 2018/0113512 A1   Apr. 26, 2018

(30) Foreign Application Priority Data
Oct. 20, 2016   (KR) .................. 10-2016-0136550

(51) Int. Cl.
| | | |
|---|---|---|
| G06F 3/045 | (2006.01) | |
| G06F 3/041 | (2006.01) | |
| G06F 3/01 | (2006.01) | |
| G06F 3/044 | (2006.01) | |
| G06F 3/0488 | (2013.01) | |
| G01L 1/14 | (2006.01) | |
| G01L 5/22 | (2006.01) | |

(52) U.S. Cl.
CPC ............. G06F 3/016 (2013.01); G06F 3/044 (2013.01); G06F 3/0488 (2013.01); G01L 1/142 (2013.01); G01L 1/146 (2013.01); G01L 5/228 (2013.01); G06F 2203/04105 (2013.01); G06F 2203/04112 (2013.01)

(58) Field of Classification Search
CPC ........................................................ G06F 3/016
See application file for complete search history.

(56) References Cited

U.S. PATENT DOCUMENTS

| | | | |
|---|---|---|---|
| 9,619,076 B2 | 4/2017 | Bernstein et al. | |
| 9,753,639 B2 | 9/2017 | Cieplinski et al. | |
| 2012/0105358 A1* | 5/2012 | Momeyer | G06F 3/0414 345/174 |
| 2014/0055377 A1* | 2/2014 | Kim | G06F 3/0418 345/173 |
| 2015/0062052 A1 | 3/2015 | Bernstein et al. | |

(Continued)

FOREIGN PATENT DOCUMENTS

KR   10-2015-0129638 A   11/2015

*Primary Examiner* — Nan-Ying Yang
(74) *Attorney, Agent, or Firm* — Jefferson IP Law, LLP

(57) ABSTRACT

An electronic device is provided. The electronic device outputs a user interface (UI) including at least one object, receives a pressure input of a specified level or more for selecting the object, verifies information associated with an object selected by the pressure input, outputs vibration feedback of a first frequency or first amplitude if the information associated with the object is less than a first criterion, and outputs vibration feedback of a second frequency relatively lower than the first frequency or second amplitude higher than the first amplitude if the information associated with the object is greater than or equal to the first criterion.

6 Claims, 31 Drawing Sheets

(56) References Cited

U.S. PATENT DOCUMENTS

| | | |
|---|---|---|
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067601 A1 | 3/2015 | Bernstein et al. |
| 2015/0149899 A1 | 5/2015 | Bernstein et al. |
| 2015/0149964 A1 | 5/2015 | Bernstein et al. |
| 2015/0160771 A1* | 6/2015 | Takeuchi .............. G06F 3/0414 345/177 |
| 2016/0041750 A1 | 2/2016 | Cieplinski et al. |
| 2017/0212673 A1 | 7/2017 | Bernstein et al. |

* cited by examiner

| TYPE OF INPUT | INTENSITY OF INPUT | DURATION OF INPUT |
|---|---|---|
| FIRST FORCE | F▸ L2 / L1 | 5 SECONDS |
| SECOND FORCE | F▸ L2 / L1 | 10 SECONDS |
| THIRD FORCE | F▸ L3 / L2 / L1 | 30 SECONDS |

| CLASSIFICATION ACCORDING TO CAPACITY | INTENSITY OF FEEDBACK | CONSIDERATION |
|---|---|---|
| Text | $T_1$ VIBRATION | THE NUMBER OF TEXT CHANGE IN PARAGRAPH AND THE LIKE |
| IMAGE | $T_2$ $T_1$ VIBRATION | IMAGE SIZE IMAGE CAPTURE TIME THE NUMBER OF INCLUDED PERSONS AND THE LIKE |
| VIDEO FILE | $T_3$ $T_2$ $T_1$ VIBRATION | SIZE IMAGE CAPTURE TIME THE NUMBER OF INCLUDED PERSONS AND THE LIKE |

FIG.7

FEEDBACK PROVIDING METHOD AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Oct. 20, 2016 in the Korean Intellectual Property Office and assigned Serial number 10-2016-0136550, the entire disclosure of which is hereby incorporated by reference.

TECHNICAL FIELD

The present disclosure relates to providing feedback according to a pressure input.

BACKGROUND

Recently, the distribution of various types of portable electronic devices, such as smartphones and table personal computers (PCs), has been expanded. Each of the portable electronic devices may provide various input schemes of performing user inputs.

The above information is presented as background information only to assist with an understanding of the present disclosure. No determination has been made, and no assertion is made, as to whether any of the above might be applicable as prior art with regard to the present disclosure.

SUMMARY

A portable electronic device may receive a touch input, a pressure input, or the like depending on a user operation. In the portable electronic device, the pressure input may be classified by strength of pressure or the like to be operated in various forms. Since a user does not know whether pressure input by him or her is a pressure input of any level in the electronic device, it is difficult to adjust a level of the pressure. Therefore, it is difficult to perform various types of pressure inputs.

Aspects of the present disclosure are to address at least the above-mentioned problems and/or disadvantages and to provide at least the advantages described below Accordingly, an aspect of the present disclosure is to provide a feedback providing method for easily performing various operations of a pressure input by providing intuitive feedback depending on an input situation of the pressure input in an electronic device which may receive a touch input and the pressure input and an electronic device for supporting the same.

In accordance with an aspect of the present disclosure, an electronic device is provided. The electronic device includes a touch screen display, a pressure sensor, a wireless communication circuit, an actuator, a memory configured to store at least one instruction, at least one processor configured to be electrically coupled with the touch screen display, the pressure sensor, the wireless communication circuit, the actuator, and the memory wherein the at least one instruction, when executed by the at least one processor, is configured to cause the electronic device to display a user interface (UA) on the touch screen display, detect pressure on the touch screen display based on the pressure sensor, and control the actuator to generate feedback corresponding to at least one selected frequency among various frequencies based on at least part of the detected pressure, wherein, if the detected pressure is within a first range, the selected frequency is changed from a specified first frequency to a second frequency, wherein, if the detected pressure is within a second range different from the first range, the selected frequency is changed from a third frequency to a fourth frequency, and wherein a difference between the third frequency and the fourth frequency differs from a difference between the first frequency and the second frequency.

In accordance with another aspect of the present disclosure, an electronic device is provided. The electronic device includes a touch screen display, a pressure sensor, a wireless communication circuit, an actuator, a memory configured to store at least one instruction, and at least one processor configured to be electrically coupled with the touch screen display, the pressure sensor, the wireless communication circuit, the actuator, and the memory, wherein the at least one instruction, when executed by the at least one processor, is configured to cause the electronic device to display a UI including at least one of a first object or a second object on the touch screen display, the first object and the second object having different a characteristic, receive a user input for selecting any one of the first object or the second object on the touch screen display, detect pressure on the display while the user input is received based on the pressure sensor, and control the actuator to generate feedback corresponding to a selected frequency among various frequencies based on at least part of a characteristic of the selected object, wherein, if the selected object is the first object, the selected frequency includes a frequency changed from a first frequency to a second frequency, wherein, if the selected object is the second object, the selected frequency includes a frequency changed from a third frequency to a fourth frequency, and wherein a difference between the third frequency and the fourth frequency is higher than a difference between the first frequency and the second frequency.

In accordance with yet another aspect of the present disclosure, an electronic device is provided. The electronic device includes a touch screen display, a pressure sensor, an actuator, a memory configured to store at least one instruction, and at least one processor configured to be electrically coupled with the touch screen display, the pressure sensor, the actuator, and the memory, wherein the at least one instruction, when executed by the at least one processor, is configured to cause the electronic device to display a UI including at least one object on the touch screen display, receive a pressure input via the pressure sensor of a specified level or more associated with selecting the object, and output different types of vibration feedback via the actuator depending on a difference of information associated with an object selected by the pressure input.

In accordance with still another aspect of the present disclosure, a method for providing feedback by an electronic device including a touch screen display; a pressure sensor, and an actuator is provided. The electronic device includes displaying a UI including at least one object on the touch screen display, receiving a pressure input via the pressure sensor of a specified level or more associated with selecting the object, and outputting different types of vibration feedback via the actuator depending on a difference of information associated with an object selected by the pressure input.

As described above, various embodiments may minimize user learning associated with a pressure input and may perform an intuitive, easy user input operation associated with the pressure input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Figure 8:
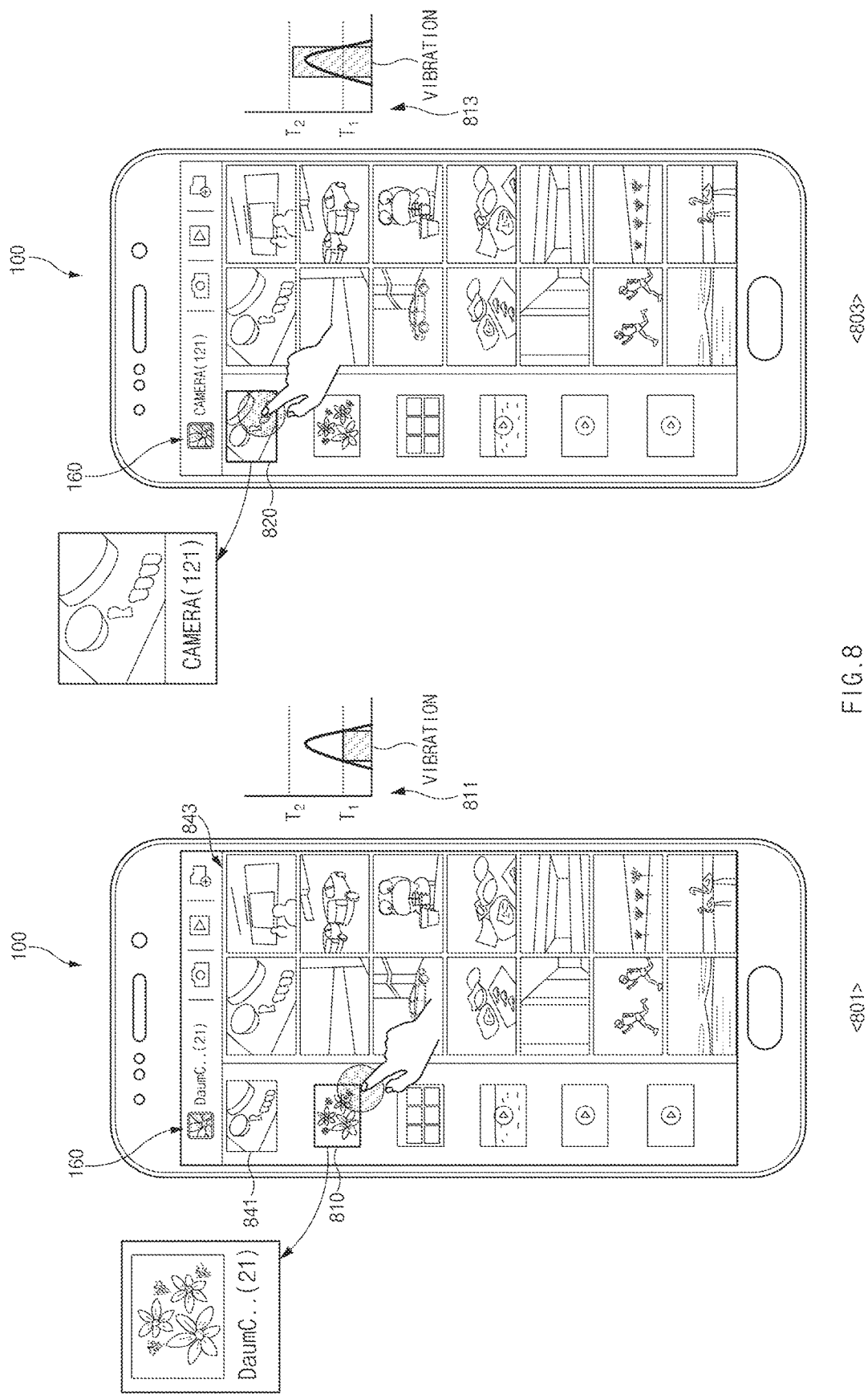
Figure 9:
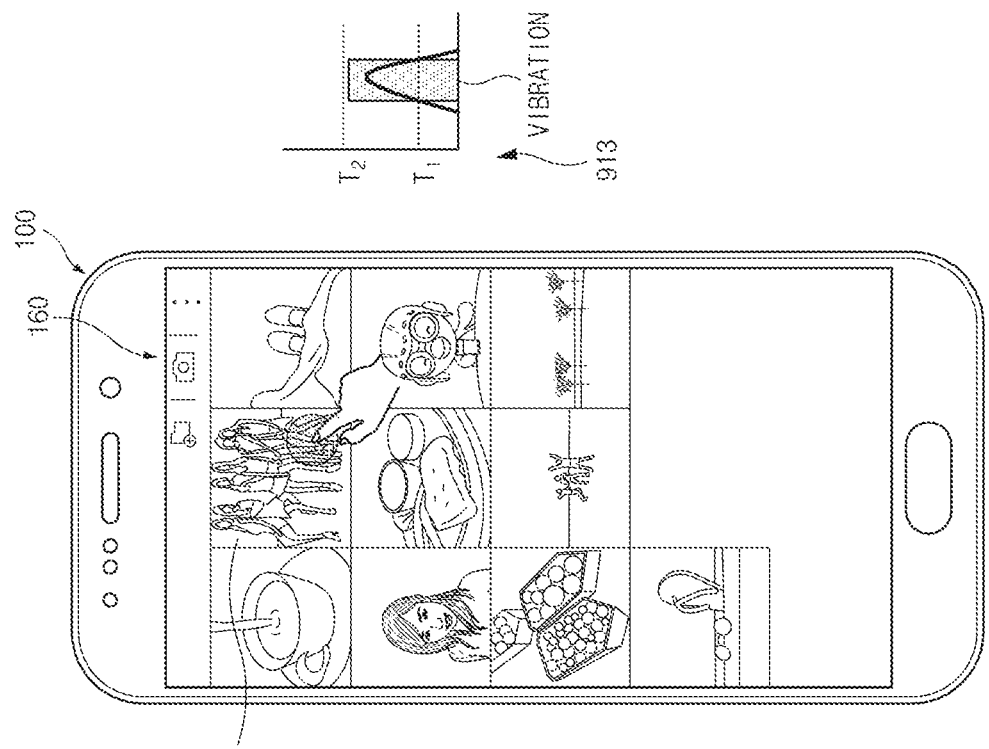
Figure 9:
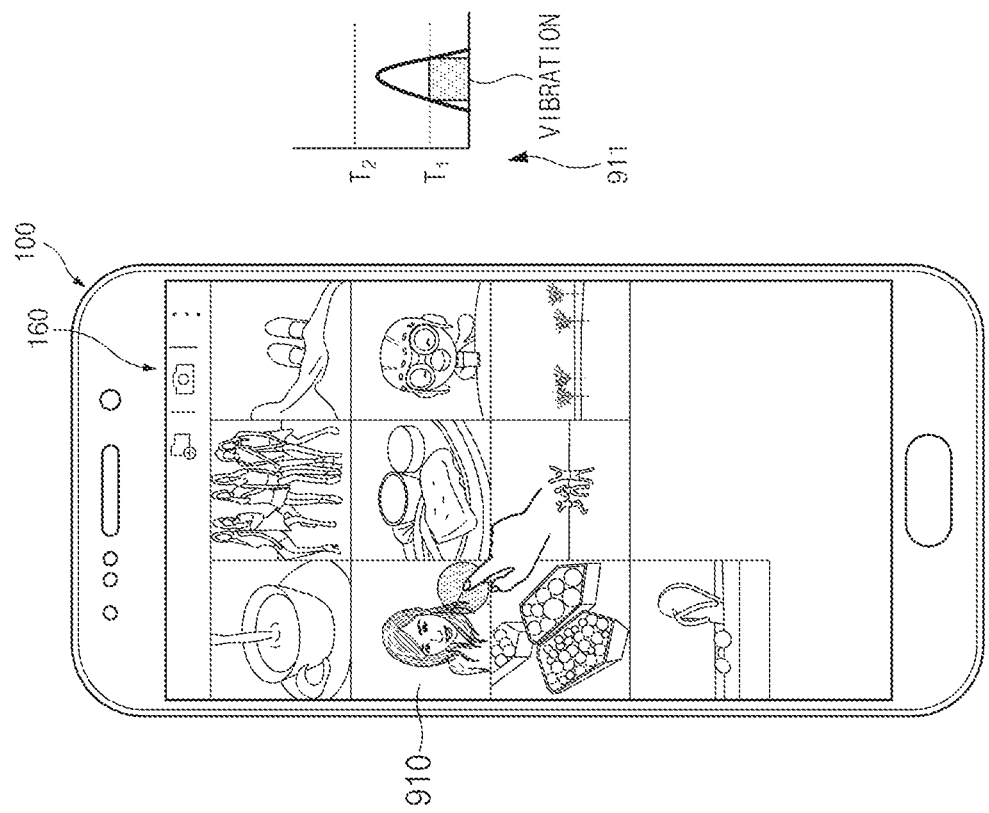
Figure 10:
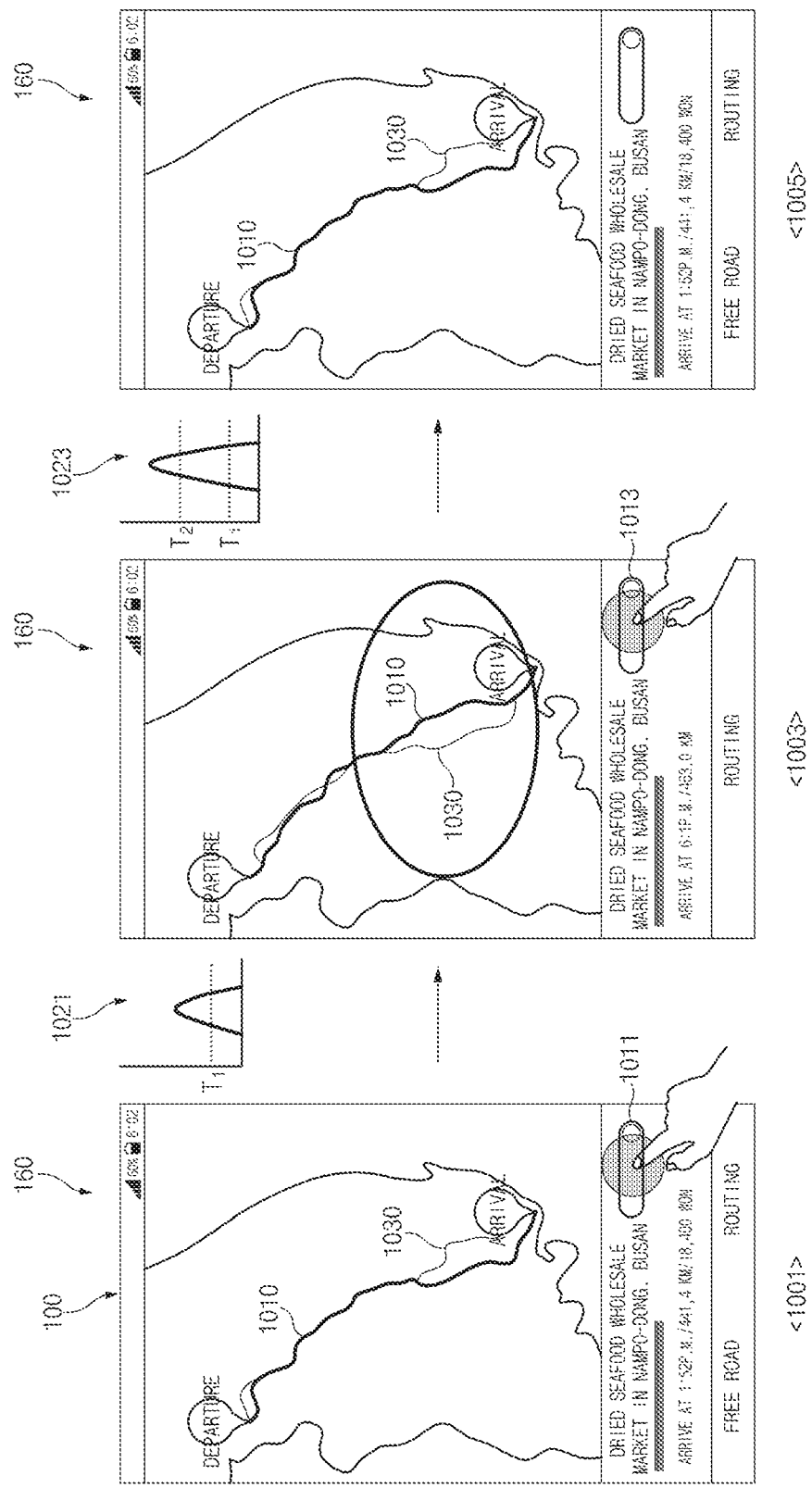
Figure 11:
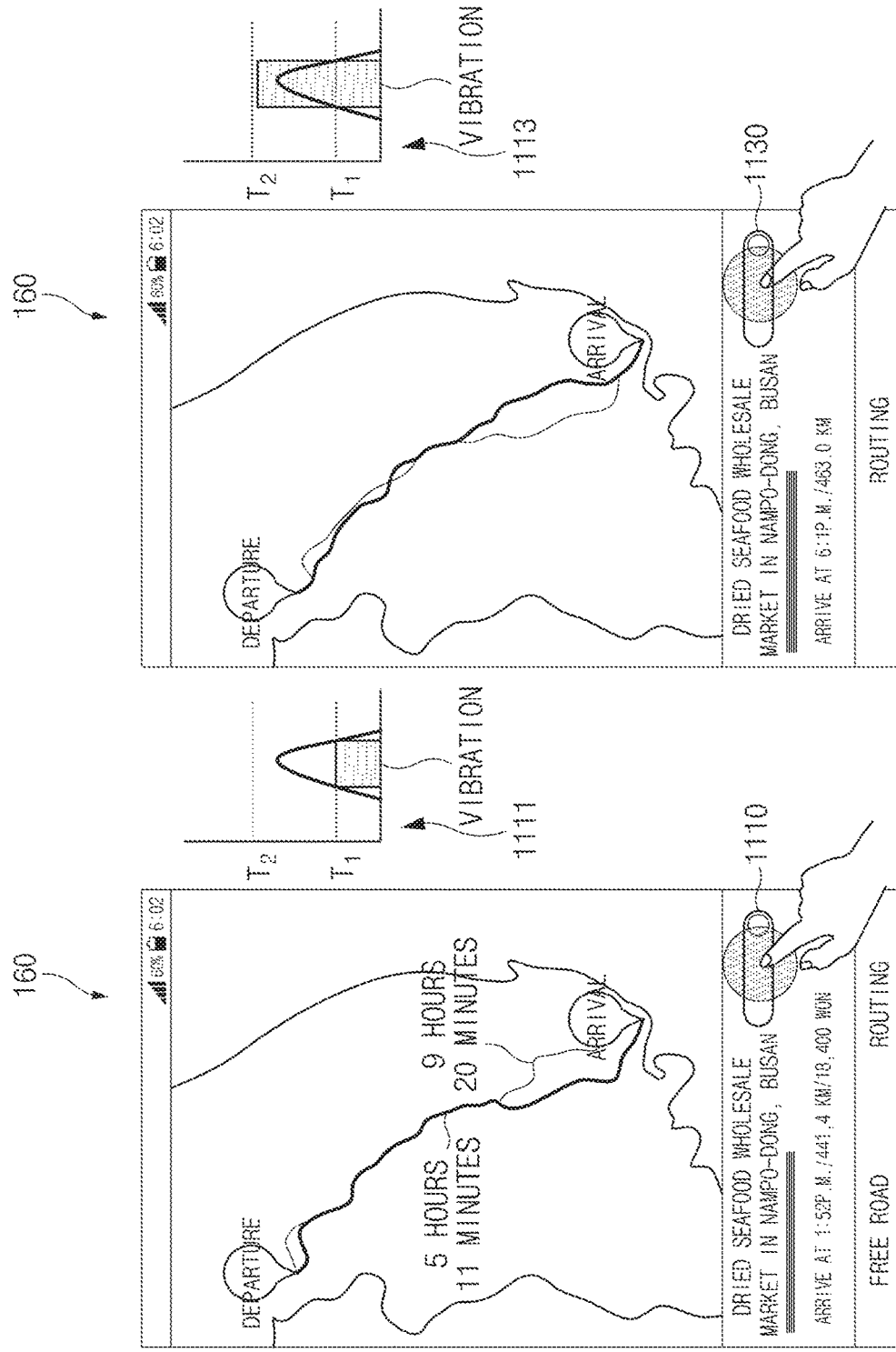
Figure 12:
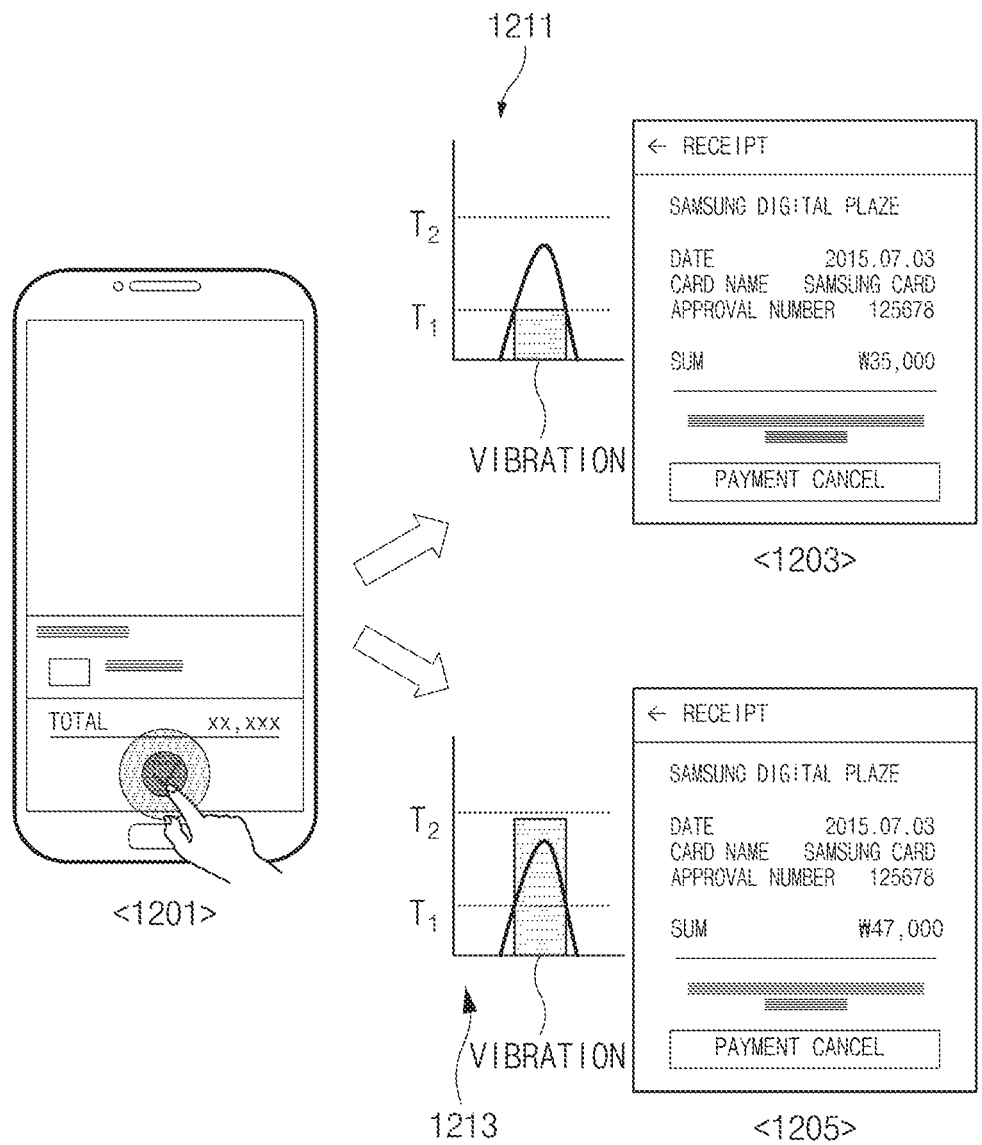
Figure 13:
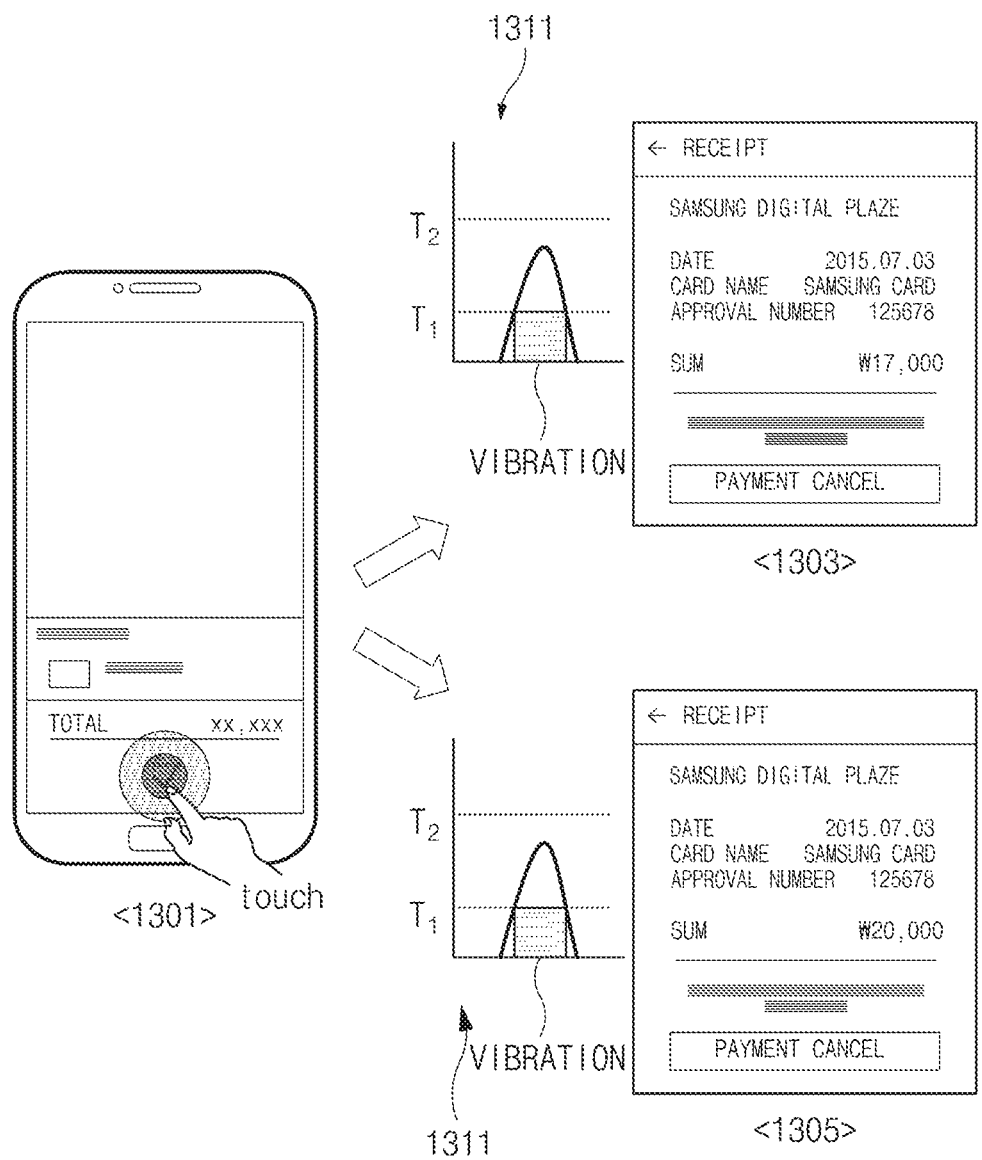
Figure 14:
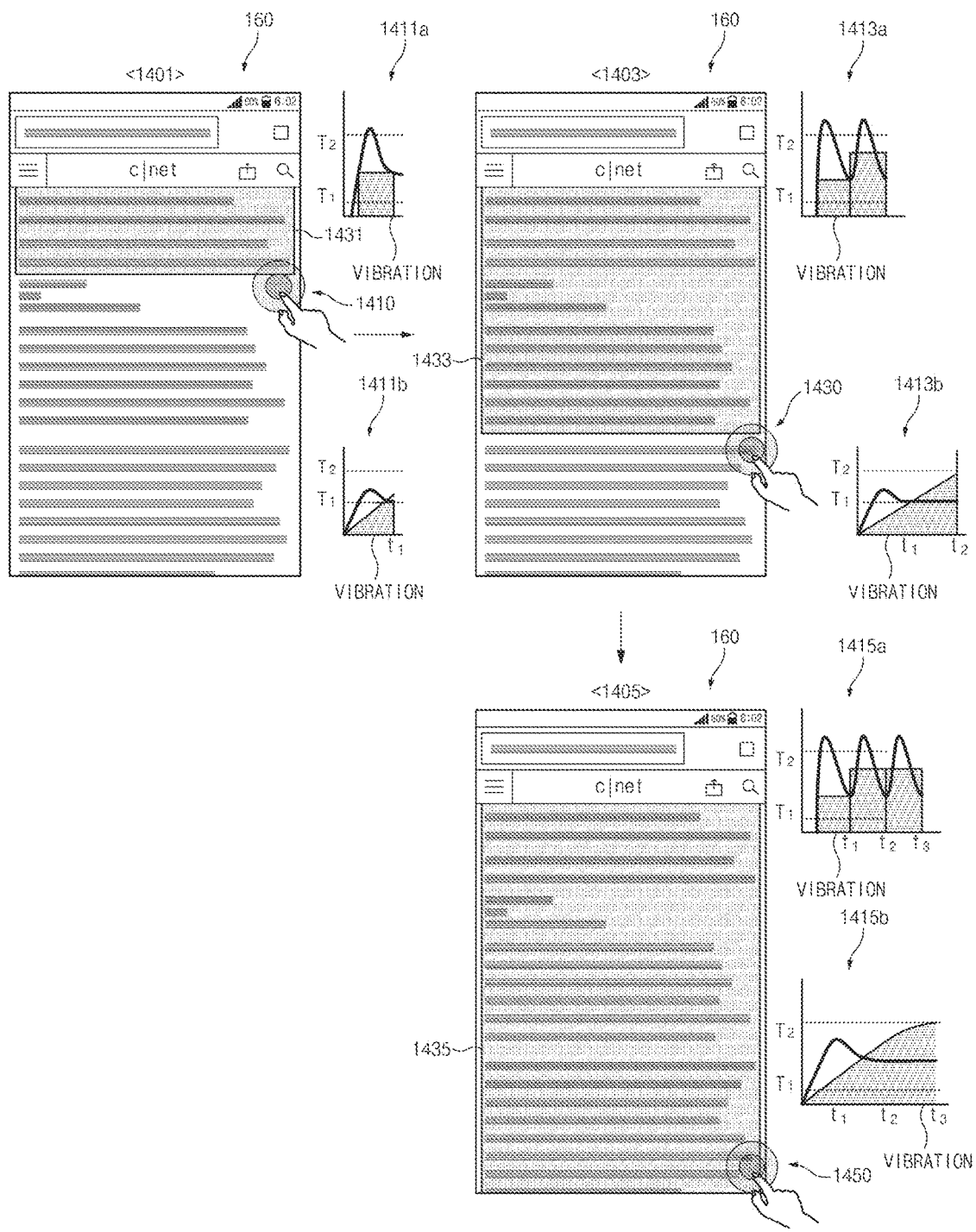
Figure 15:
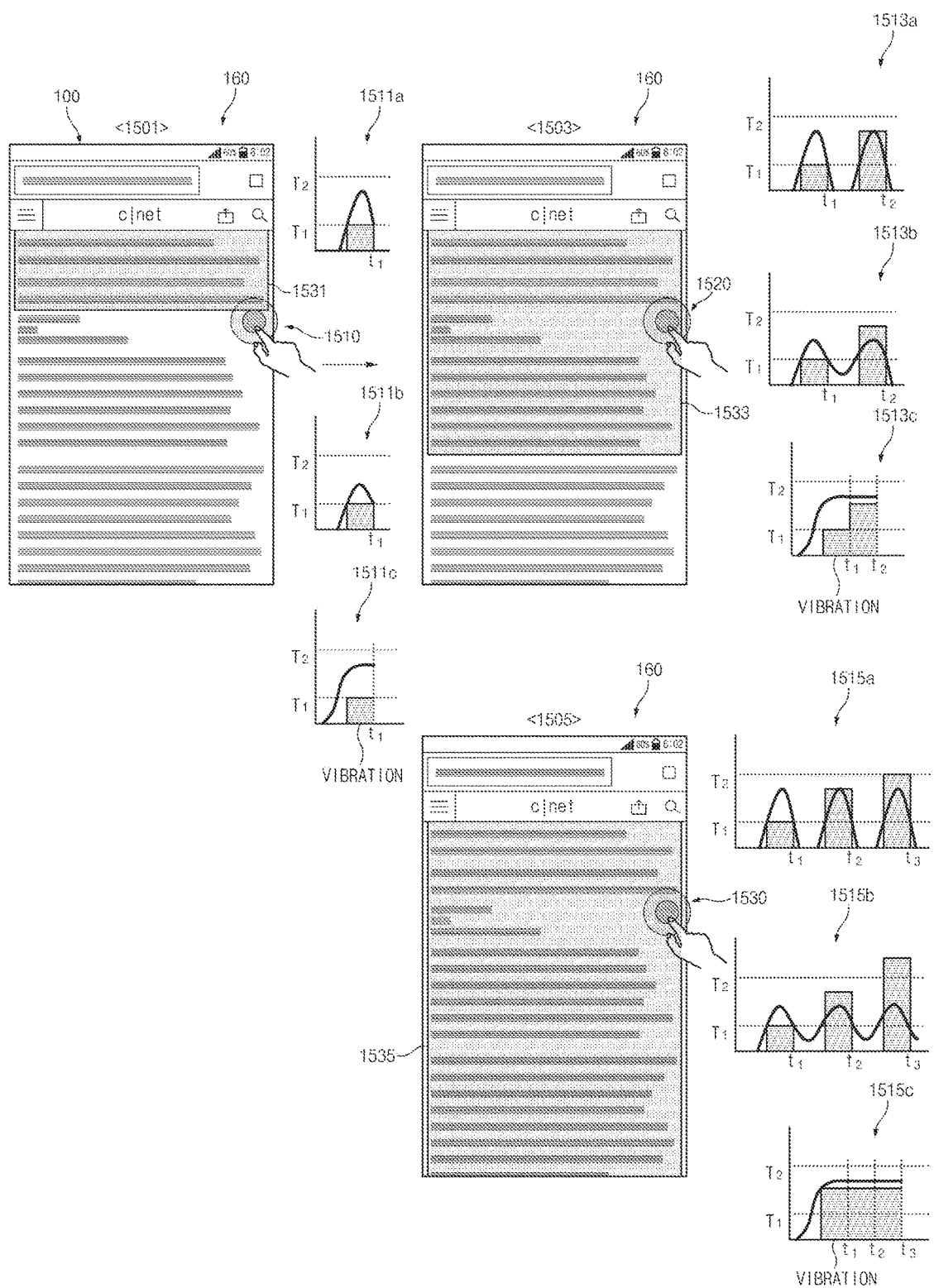
Figure 16:
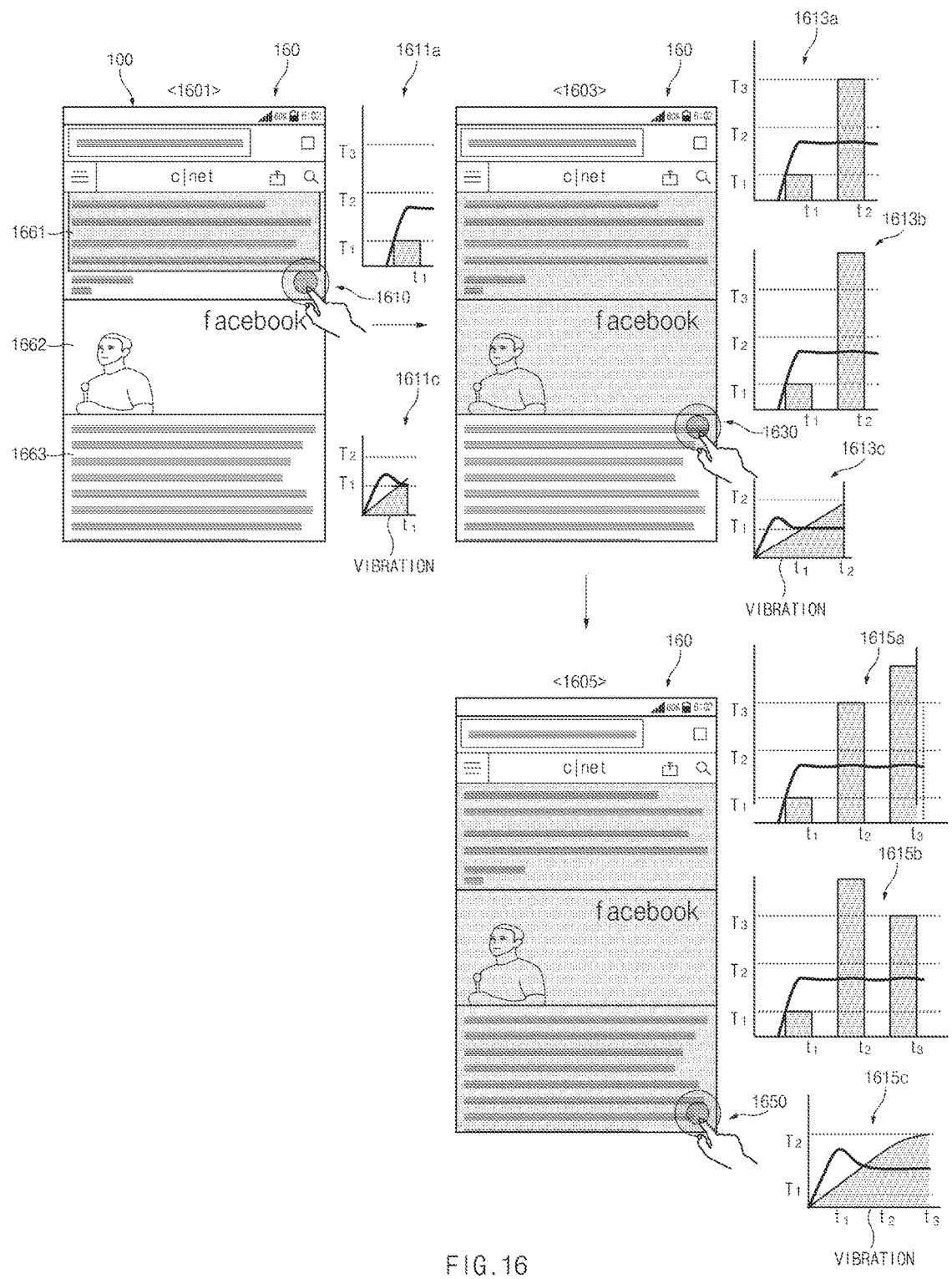
Figure 17:
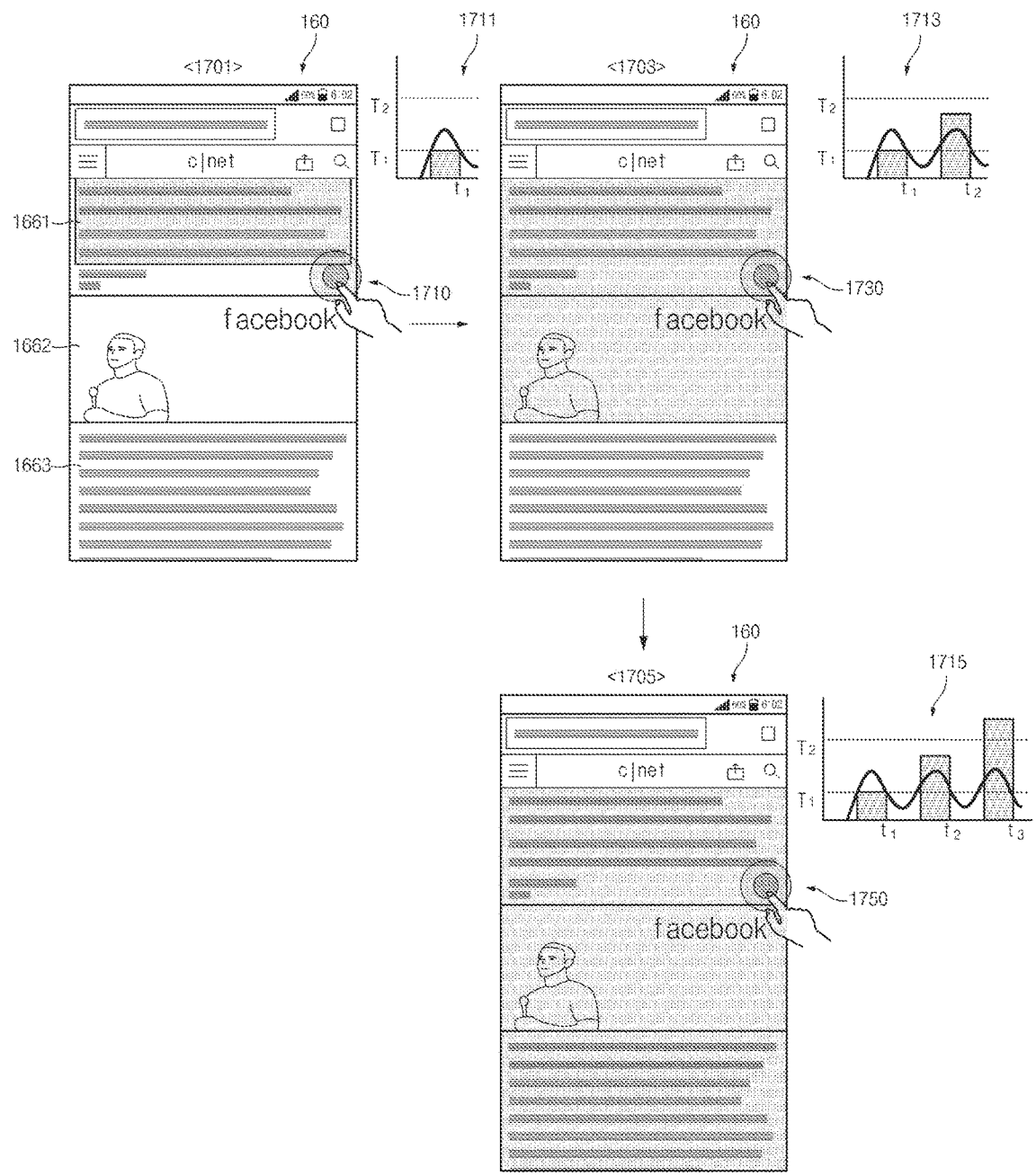
Figure 18:
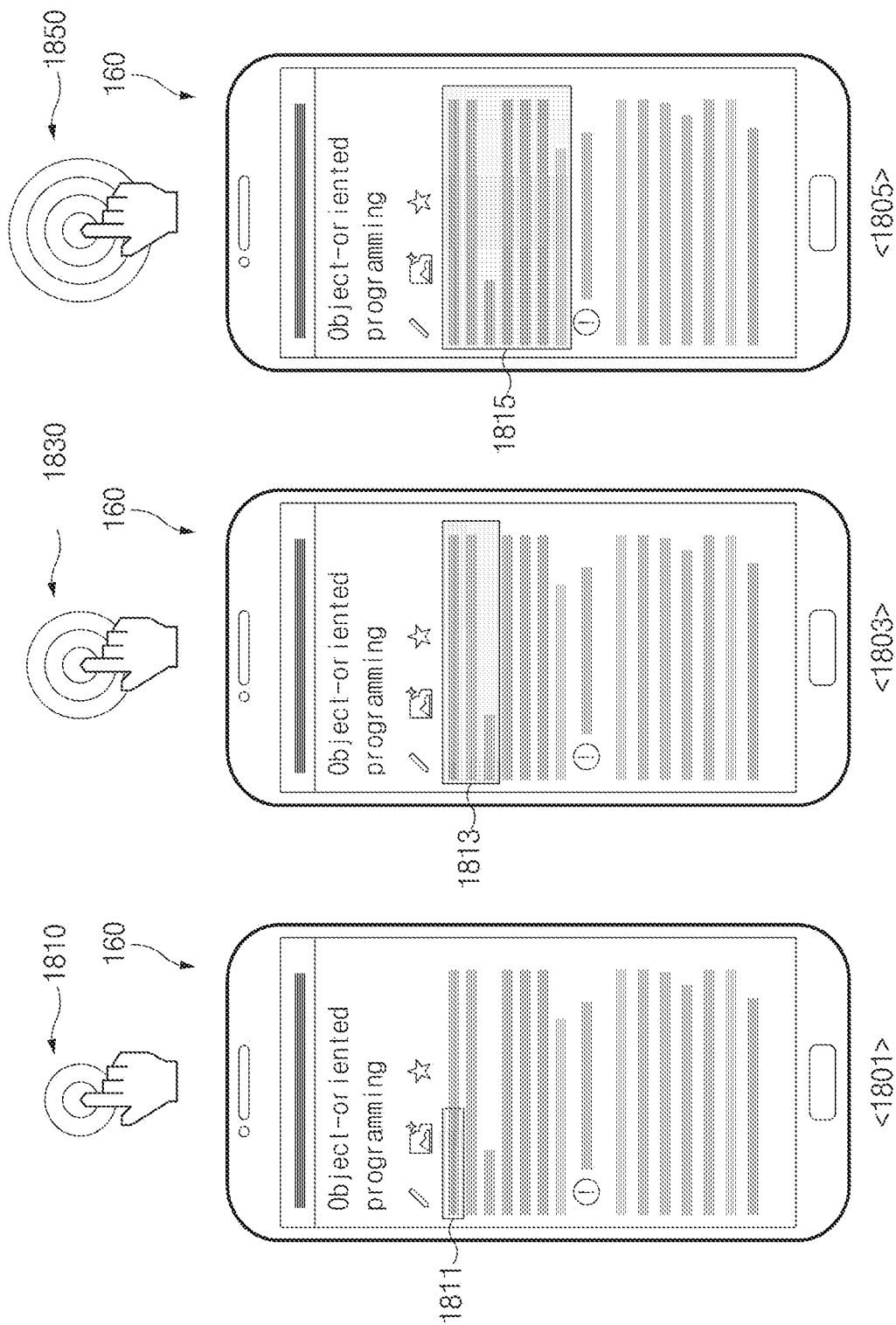
Figure 19:
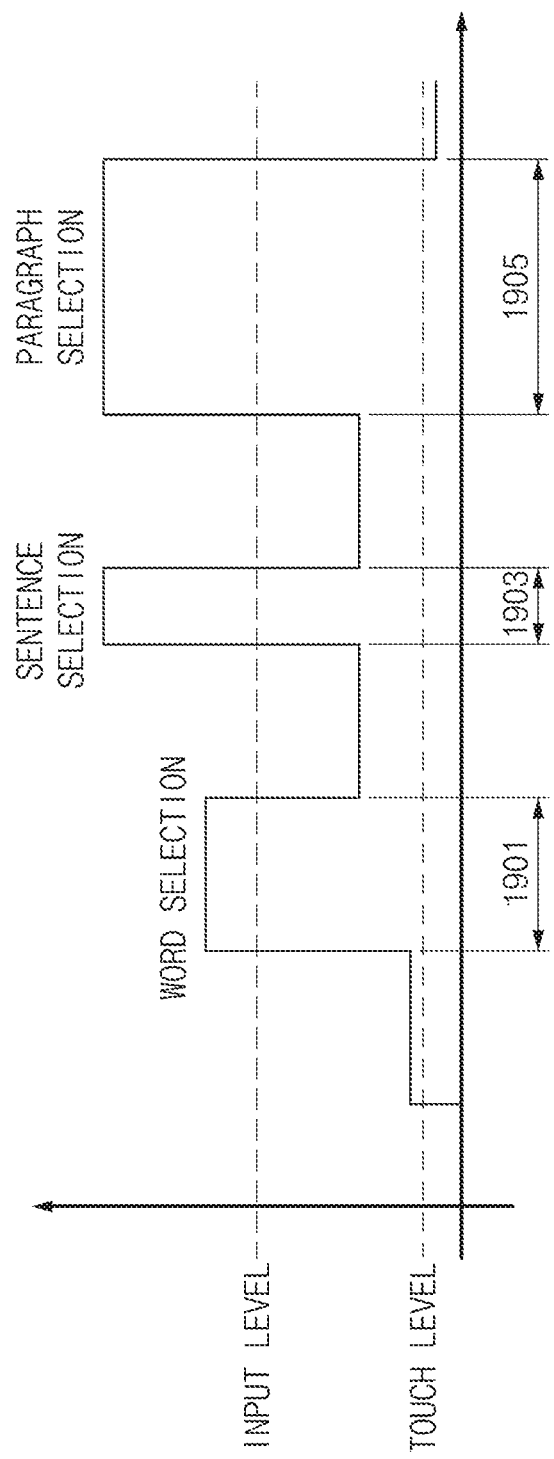
Figure 20:
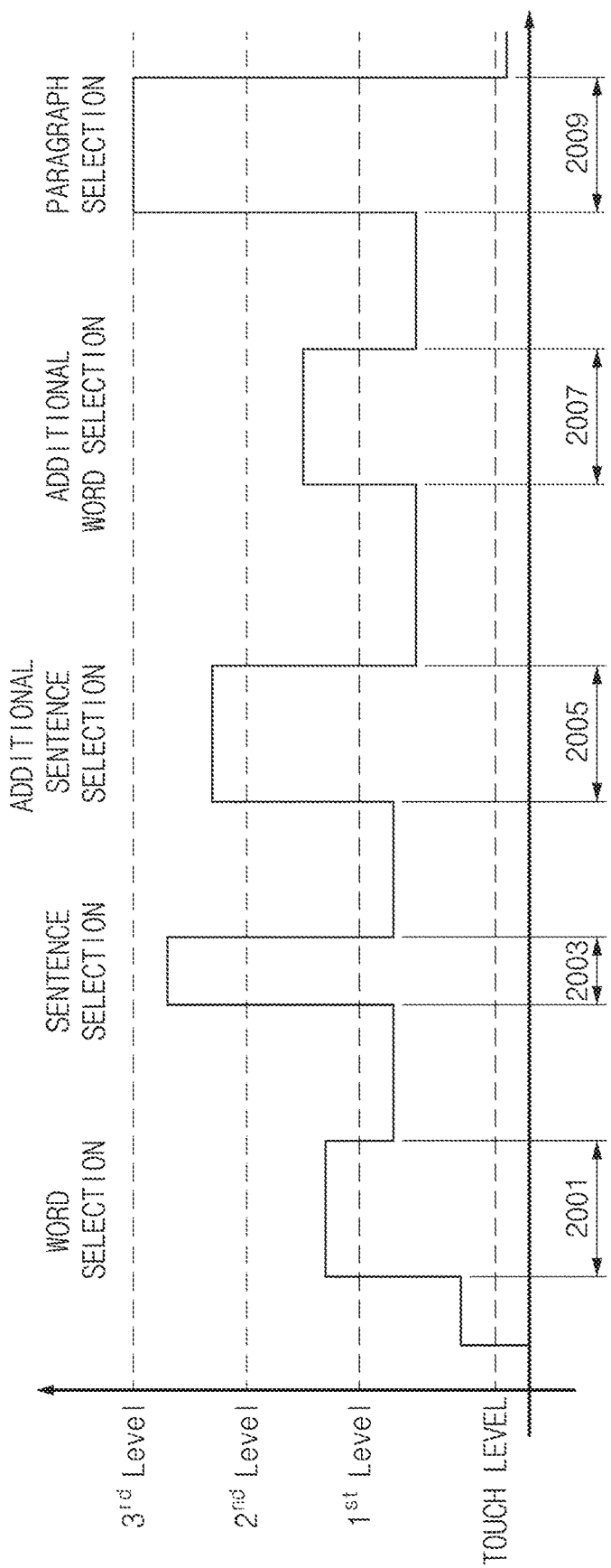
Figure 21:
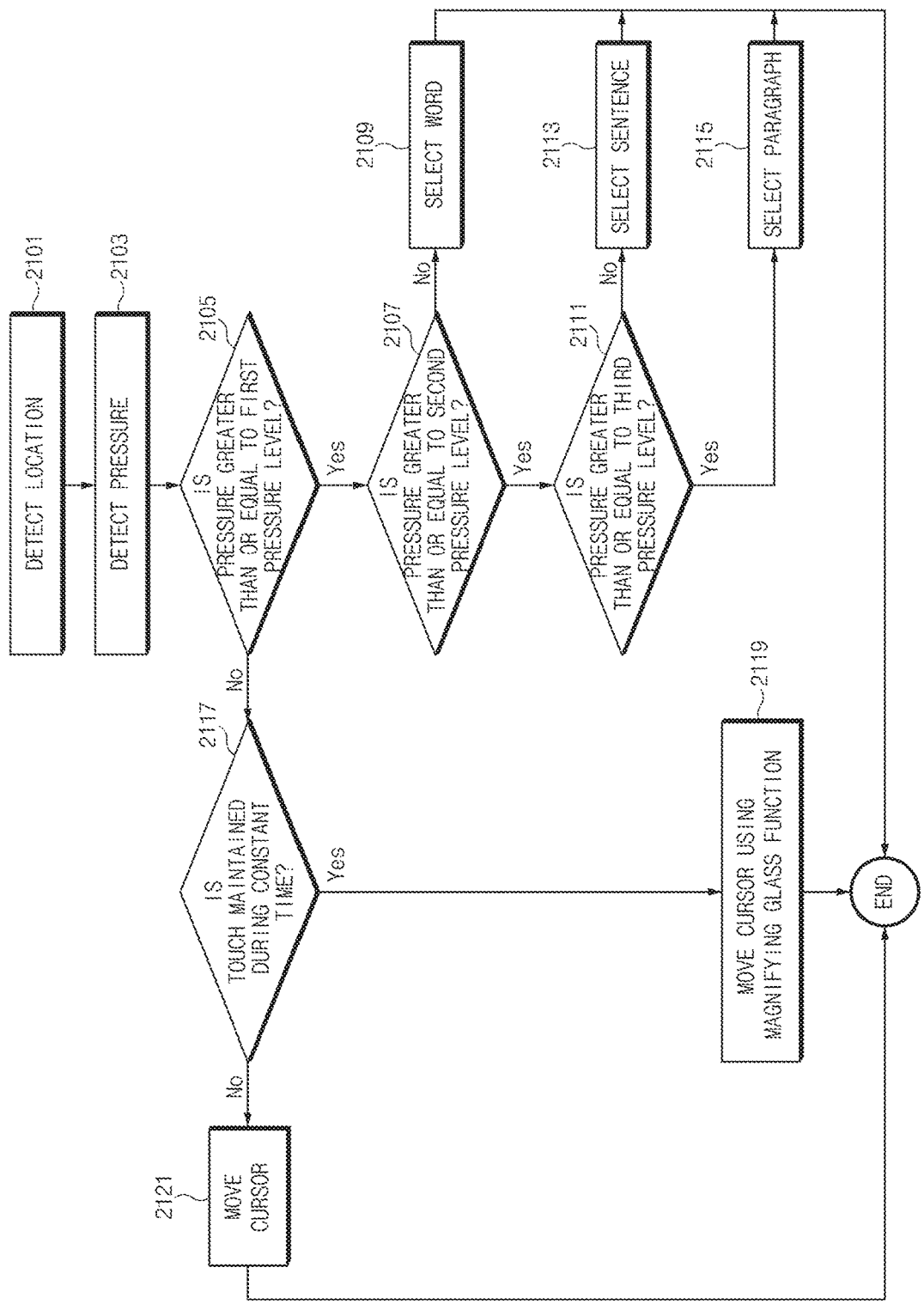
Figure 22:
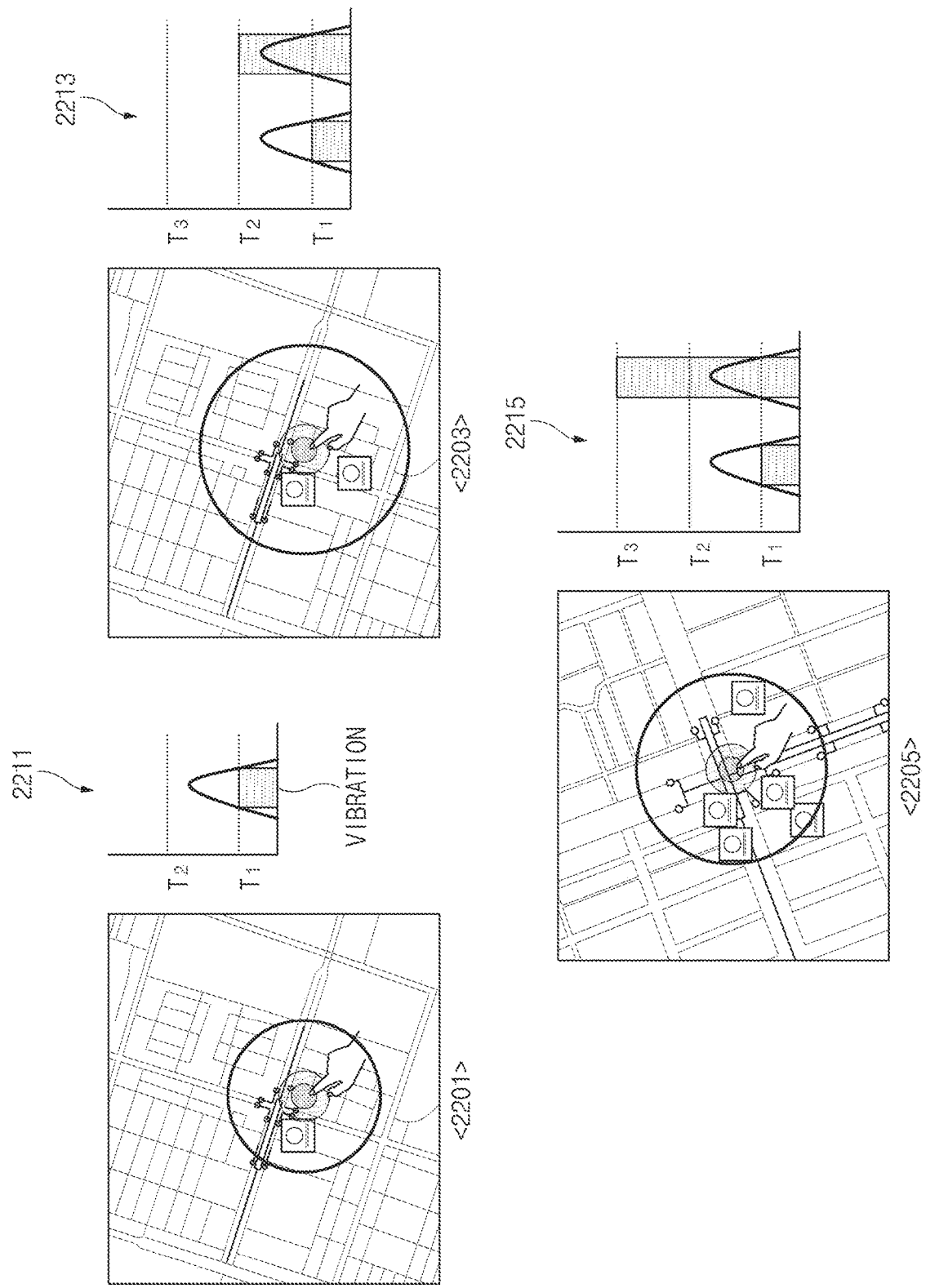
Figure 23:
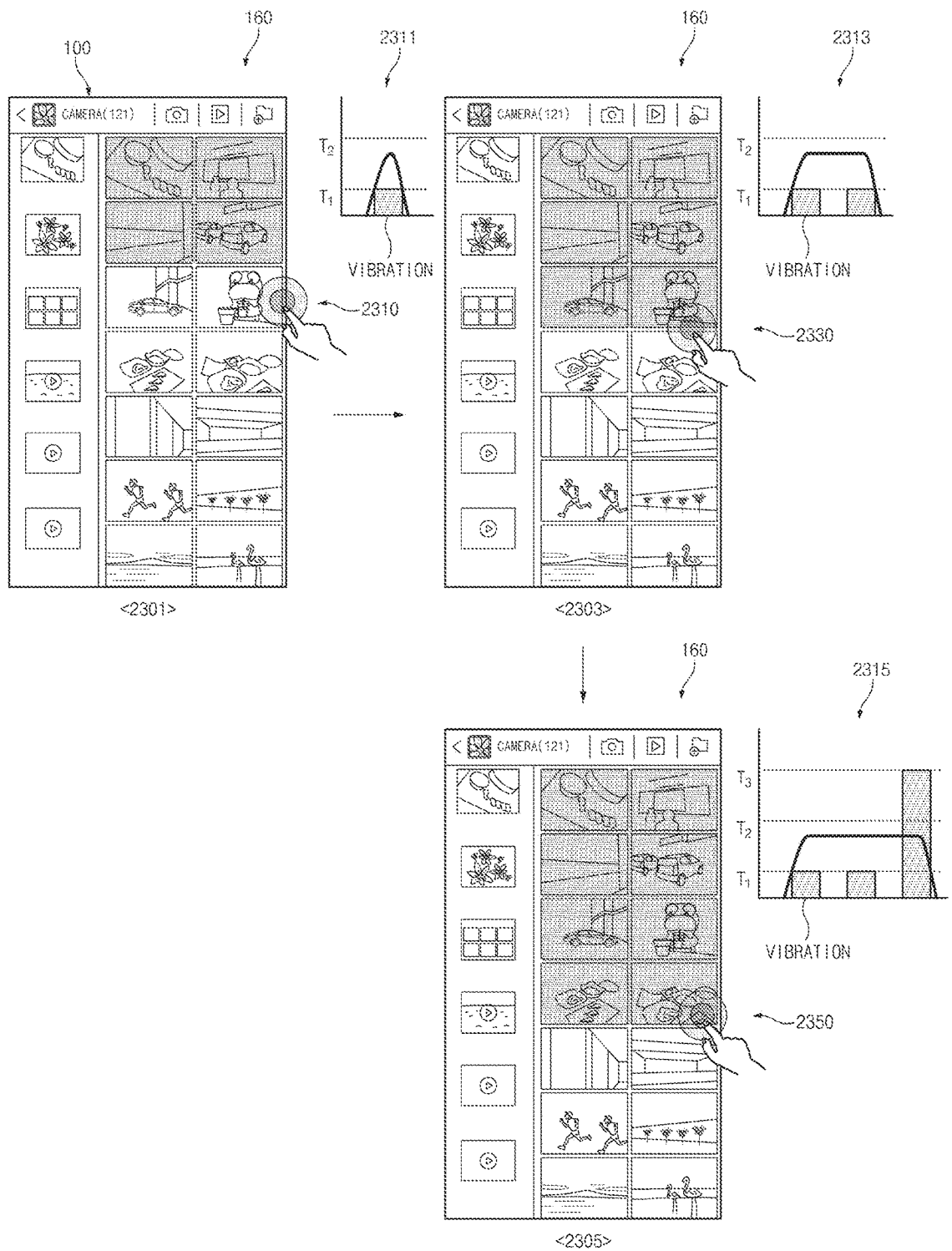
Figure 24:
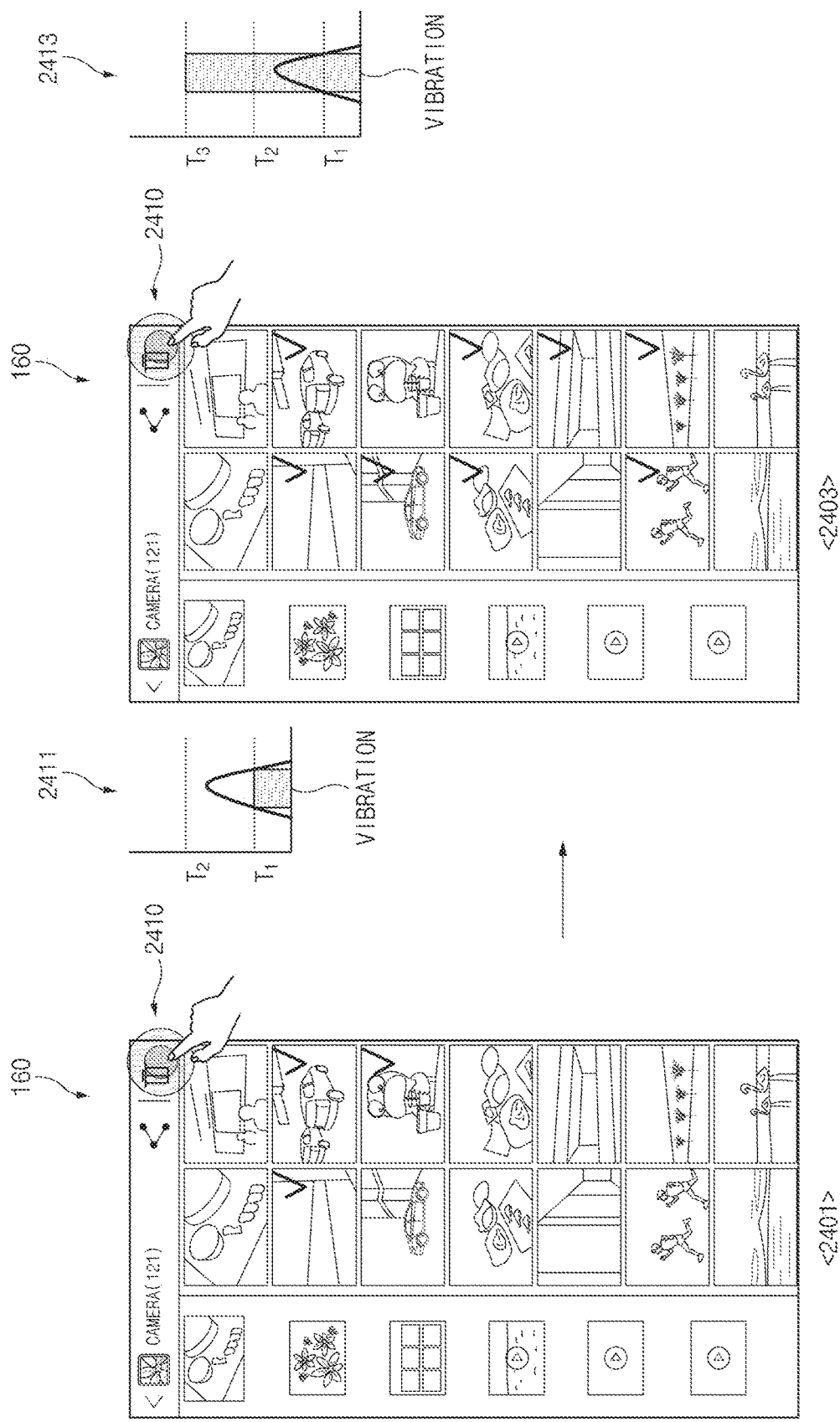
Figure 25:
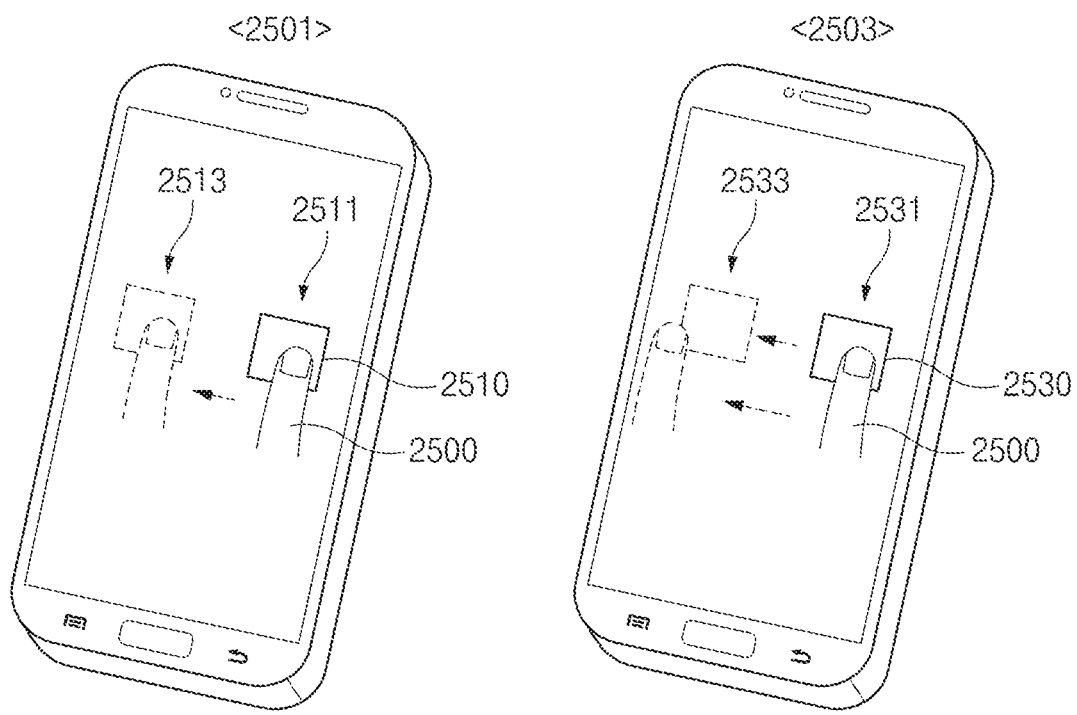
Figure 26A:
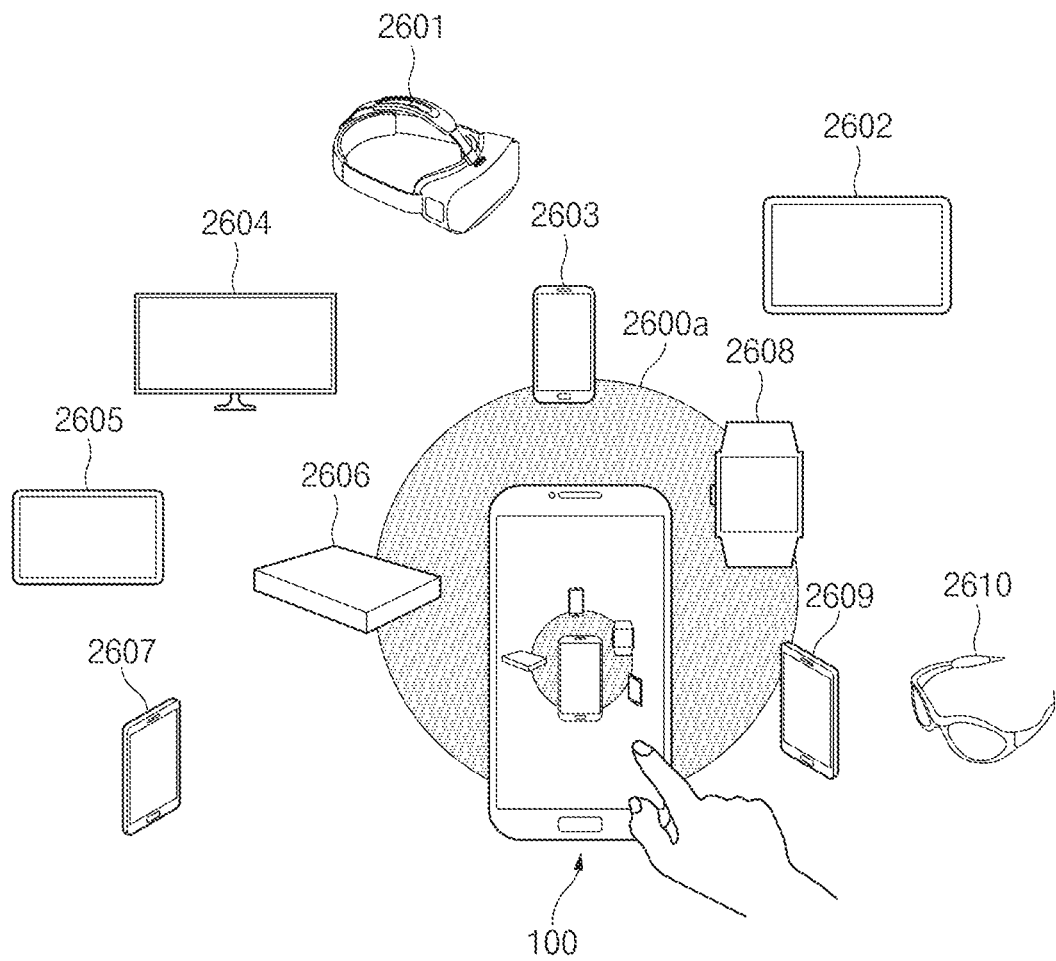
Figure 26B:
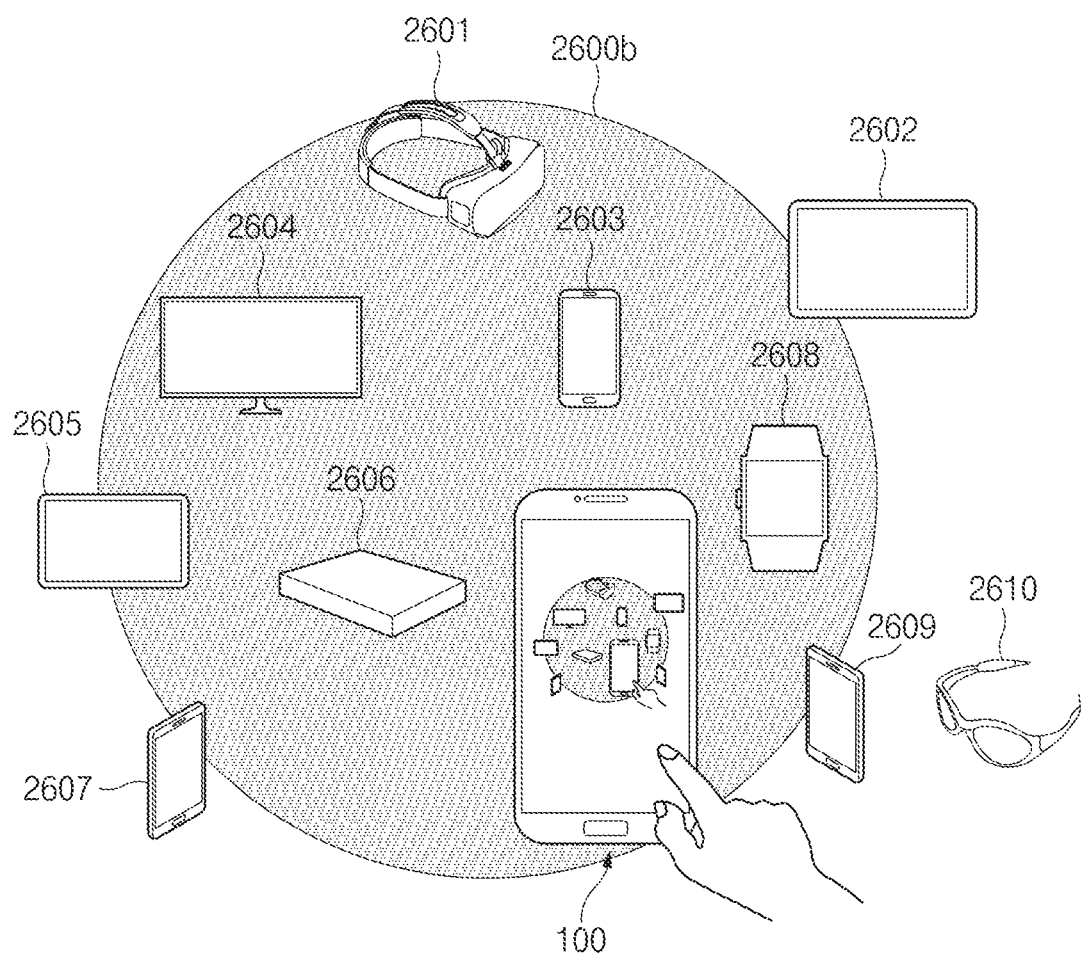
Figure 27:
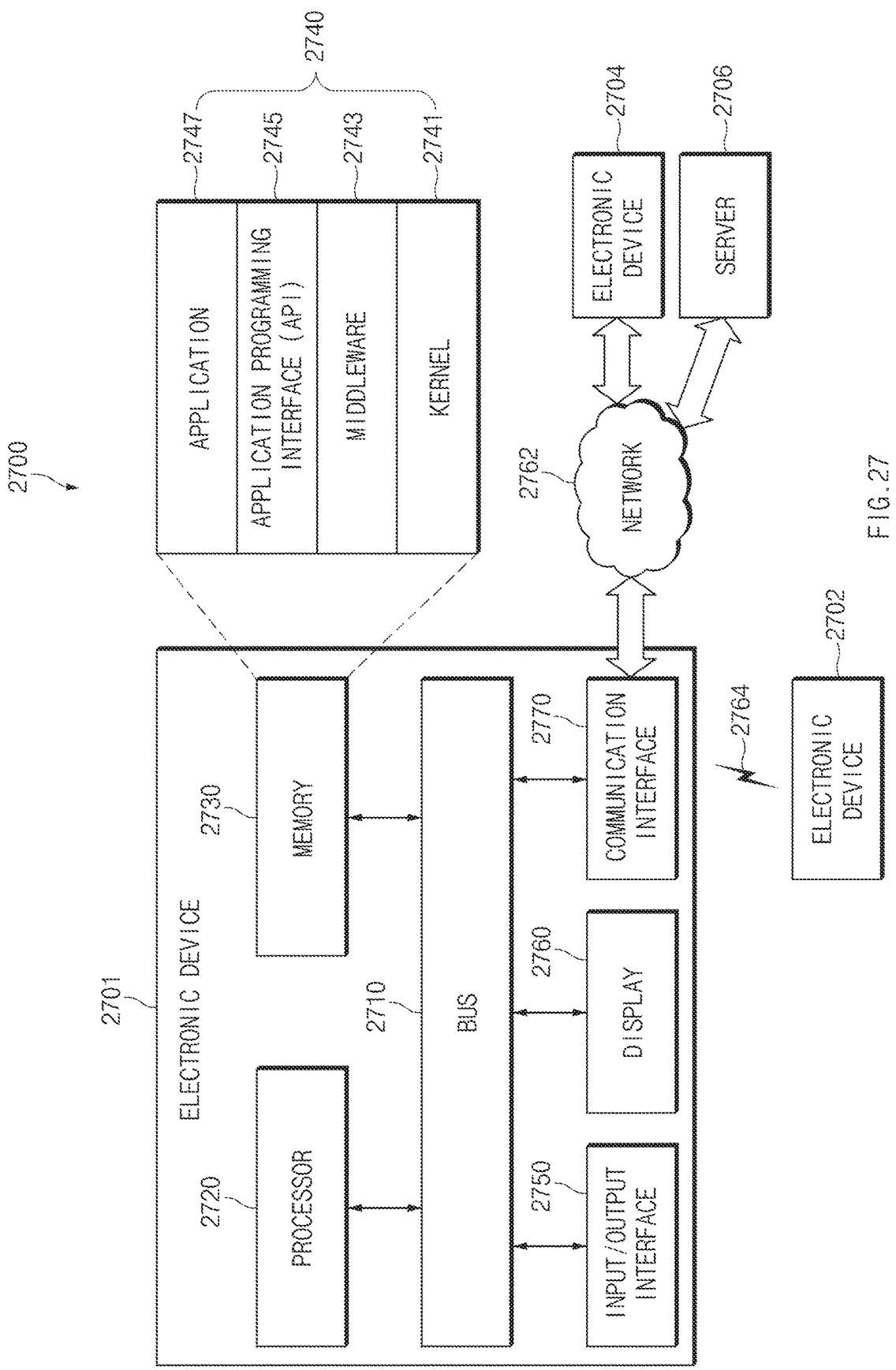
Figure 28:
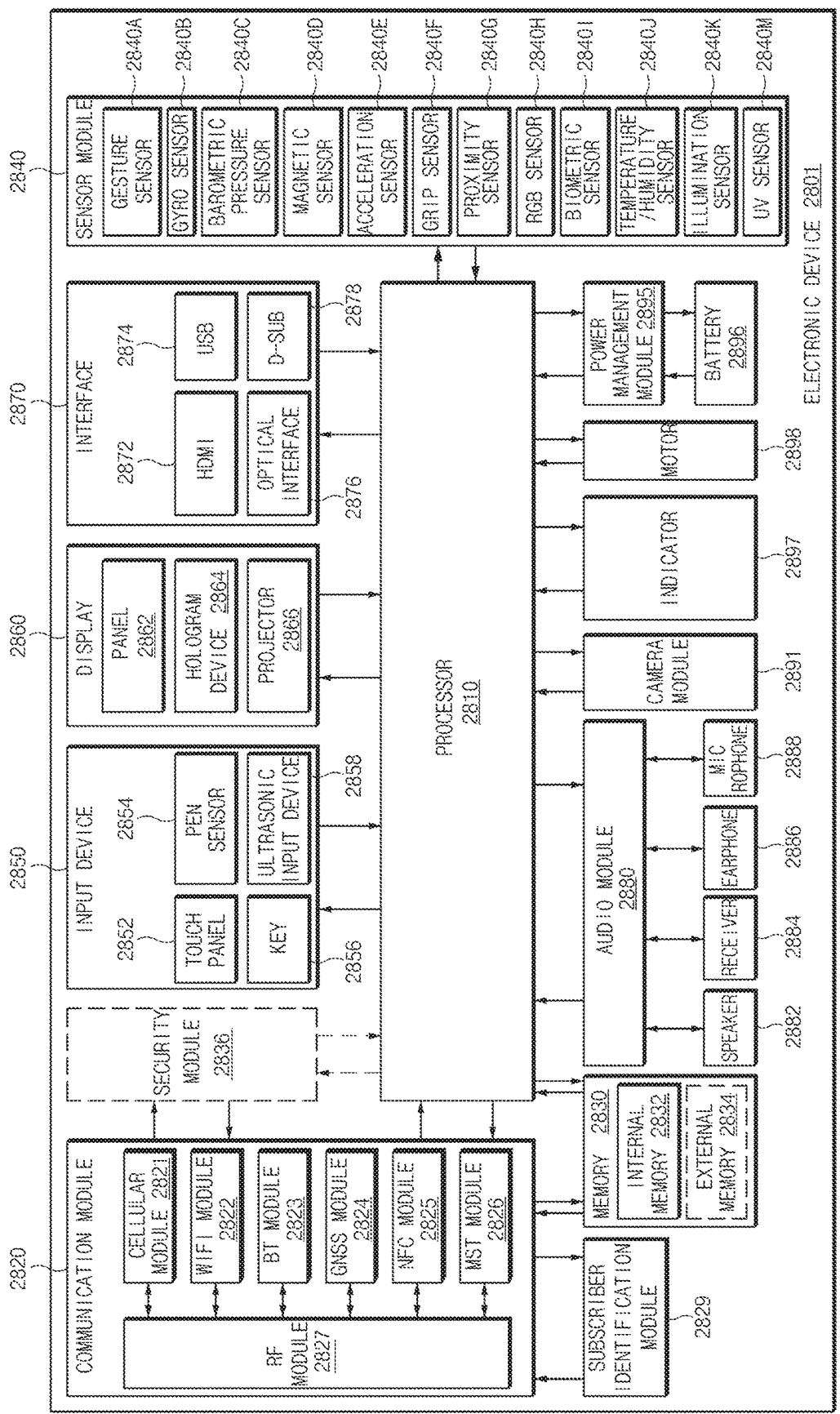
Figure 29:
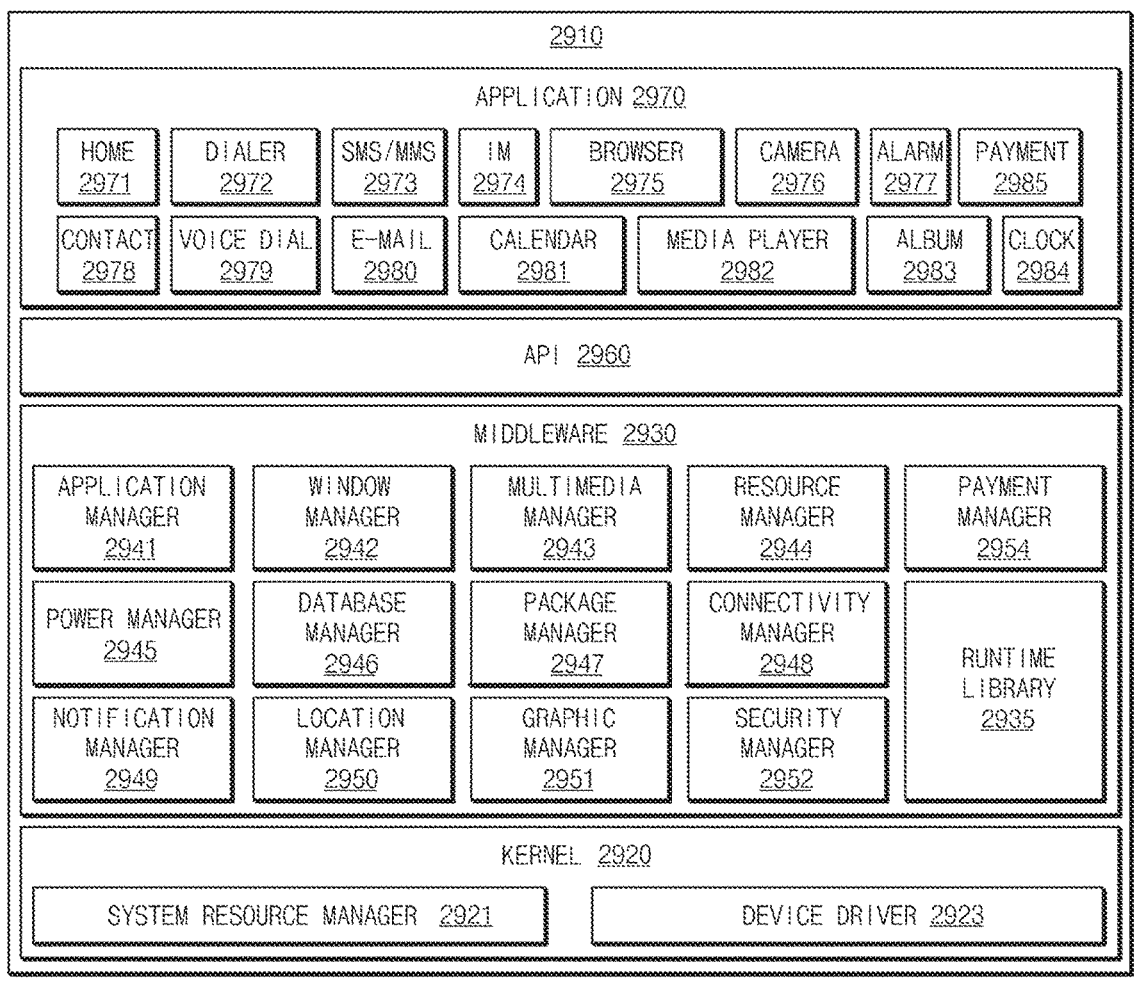

FIG. GB is a drawing illustrating an example of a pressure input according to a form of an input according to an embodiment of the present disclosure;

FIG. 7 is a drawing illustrating a feedback change according to properties of an object according to an embodiment of the present disclosure;

FIG. 8 is a drawing illustrating an example of a feedback output according to information associated with a selected object according to an embodiment of the present disclosure;

FIG. 9 is a drawing illustrating another example of a feedback output according to information associated with a selected object according to an embodiment of the present disclosure;

FIG. 10 is a drawing illustrating an example of a feedback output according to comparison of relative information of selected objects according to an embodiment of the present disclosure;

FIG. 11 is a drawing illustrating another example of a feedback output according to comparison of relative information of selected objects according to an embodiment of the present disclosure;

FIG. 12 is a drawing illustrating an example of a payment related feedback output according to an embodiment of the present disclosure;

FIG. 13 is a drawing illustrating another example of a payment related feedback output according to an embodiment of the present disclosure;

FIG. 14 is a drawing illustrating an example of a feedback output according to an amount of variation of an object selected in response to an input change according to an embodiment of the present disclosure;

FIG. 15 is a drawing illustrating another example of a feedback output according to an amount of variation of an object selected in response to an input change according to an embodiment of the present disclosure;

FIG. 16 is a drawing illustrating another example of a feedback output according to an input change and a change in selected object type according to an embodiment of the present disclosure;

FIG. 17 is a drawing illustrating another example of a feedback output according to an input change and a change in selected object type according to an embodiment of the present disclosure;

FIG. 18 is a drawing illustrating object selection and a feedback change according to a change in a level of a pressure input according to an embodiment of the present disclosure;

FIG. 19 is a waveform chart illustrating an example of describing a text selection according to a pressure input which is repeatedly input according to an embodiment of the present disclosure;

FIG. 20 is a waveform chart illustrating another example of describing a text selection according to a pressure level according to an embodiment of the present disclosure;

FIG. 21 is a flowchart illustrating a method for operating an electronic device associated with selecting a text region according to an embodiment of the present disclosure;

FIG. 22 is a drawing illustrating an example of a feedback output according to a search result according to an embodiment of the present disclosure;

FIG. 23 is a drawing illustrating an example of a feedback output according to the number of selected objects according to an embodiment of the present disclosure;

FIG. 24 is a drawing illustrating an example of a feedback output according to an additional function associated with a selected object according to an embodiment of the present disclosure;

FIG. 25 is a drawing illustrating an example of a visual based feedback output according to an embodiment of the present disclosure;

FIG. 26A is a drawing illustrating an example of a device search or connection according to a pressure level according to an embodiment of the present disclosure;

FIG. 26B is a drawing illustrating another example of a device search or connection according to a pressure level according to an embodiment of the present disclosure;

FIG. 27 is a block diagram illustrating a configuration of an electronic device in a network environment according to an embodiment;

FIG. 28 is a block diagram illustrating a configuration of an electronic device according to various embodiments; and FIG. 29 is a block diagram illustrating a configuration of a program module according to various embodiments.

Throughout the drawings, it should be noted that like reference numbers are used to depict the same or similar elements, features, and structures.

DETAILED DESCRIPTION

The following description with reference to accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "have", "may have", "include" and "comprise", or "may include" and "may comprise" used herein indicate existence of corresponding features (e.g., elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments, but do not limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element)

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. Central processing unit (CPU), for example, a "processor configured to perform A, B, and C" may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a. dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (RDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart watches, and the like.

According to another embodiment, the electronic devices may be home appliances. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to another embodiment, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a. computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to another embodiment, the electronic devices may include at least one of parts of furniture or buildings/structures, electronic boards, electronic signature receiving devices, projectors, or various measuring instruments (e.g., water meters, electricity meters, gas meters, or wave meters, and the like). In the various embodiments, the electronic device may be one of the above-described various devices or a combination thereof. An electronic device according to an embodiment may be a flexible device. Furthermore, an electronic device according to an embodiment may not be limited to the above-described electronic devices and may include other electronic devices and new electronic devices according to the development of technologies.

Hereinafter, an electronic device according to the various embodiments may be described with reference to the accompanying drawings. The term "user" used herein may refer to a person who uses an electronic device or may refer to a device (e.g., an artificial intelligence electronic device) that uses an electronic device.

Figure 1:
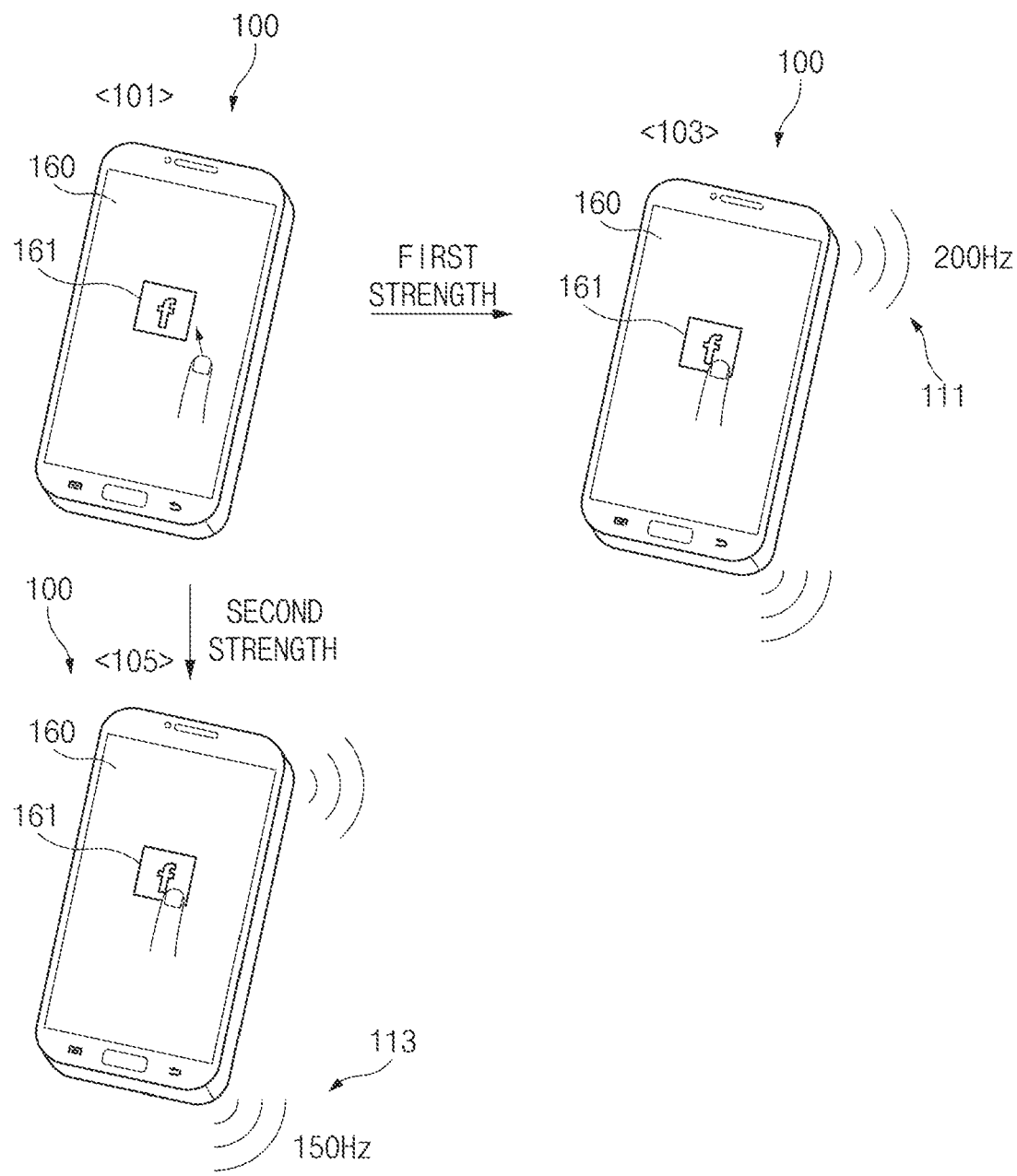
FIG. 1 is a drawing illustrating an example of a pressure input environment according to an embodiment of the present disclosure.

FIG. 1 is a drawing illustrating an example of a pressure input environment according to an embodiment of the present disclosure.

Referring to FIG. 1, an electronic device 100 may output, for example, at least one object 161 on a display 160 in state 101. The electronic device 100 may output a variety of feedback depending on a form of a pressure input generated in connection with the output object 161.

According to an embodiment, if a first pressure input of a first level occurs in connection with the object 161 in state 103, the electronic device 100 may output first feedback 111 corresponding to the first pressure input. As the pressure input generates, for example, force of the first level (e.g., pressure of a constant level which may be distinguished from a touch input or pressure which is higher than a touch input defined as a specified level) on the display 160 where the object 161 is located, a pressure sensor of the electronic device 100, located in a lower portion of the display 160, may collect a sensor signal corresponding to the force of the first level. The first feedback 111 may include, for example, a vibration pattern having a first frequency (e.g., 200 Hz). In this regard, the electronic device 100 may include a haptic actuator and may generate vibration corresponding to the first frequency.

According to various embodiments of the present disclosure, if a second pressure input of a second level (e.g., a level which is different from the first level or is greater than the first level) occurs in connection with the object 161 in state 105, the electronic device 100 may output second feedback 113 corresponding to the second pressure input. For example, as force of the second level (e.g., a level which is relatively greater than the first level) occurs on the display 160 where the object 161 is located, a pressure sensor located in a lower portion of the display 160 may collect a sensor signal corresponding to the force of the second level. The second feedback 113 may include, for example, a vibration pattern having a second frequency (e.g., 150 Hz). The electronic device 100 may generate vibration corresponding to the second frequency based on the haptic actuator.

As described above, the electronic deice 100 according to an embodiment of the present disclosure may provide feedback associated with a pressure input to a user to allow him or her to intuitively understood a situation about where he or she recognizes pressure he or she provides as a signal of a level of some degree. The feedback may be provided by various combinations of, for example, vibration, a sound, light, and a screen (or graphic). According to various embodiments, the electronic device 100 may provide a variety of feedback or different feedback based on at least part of properties of the object 161 associated with a pressure input. The properties of the object may include information associated with the object, for example, a type (e.g., text, an image, or the like) of the object selected in response to a user input, a size of the object, a frequency of use of the object, importance of the object, or the like.

According to various embodiments, if a pressure input of the user is detected, the electronic device 100 may provide feedback based on at least one of a manner of determining and outputting properties of the feedback (e.g., a type of the feedback, a size of the feedback, or a degree of an effect of the feedback) based on properties of the detected pressure input (e.g., a level of the pressure, a location of the pressure, duration of the pressure, and the like) and a manner of determining and outputting properties of the feedback based on properties of an object selected by an input (e.g., a type of the object, contents of the object, a frequency of use of the object, and the like).

According to various embodiments, the electronic device 100 may provide feedback of allowing the user to differently feel heavy depending on a size of a selected object. The electronic device 100 may use a haptic feedback method of adjusting a vibration frequency of a motor (e.g., providing a relatively heavy feeling upon a touch if a frequency is lowered) as the method for allowing the user to feel heavy.

Figure 2:
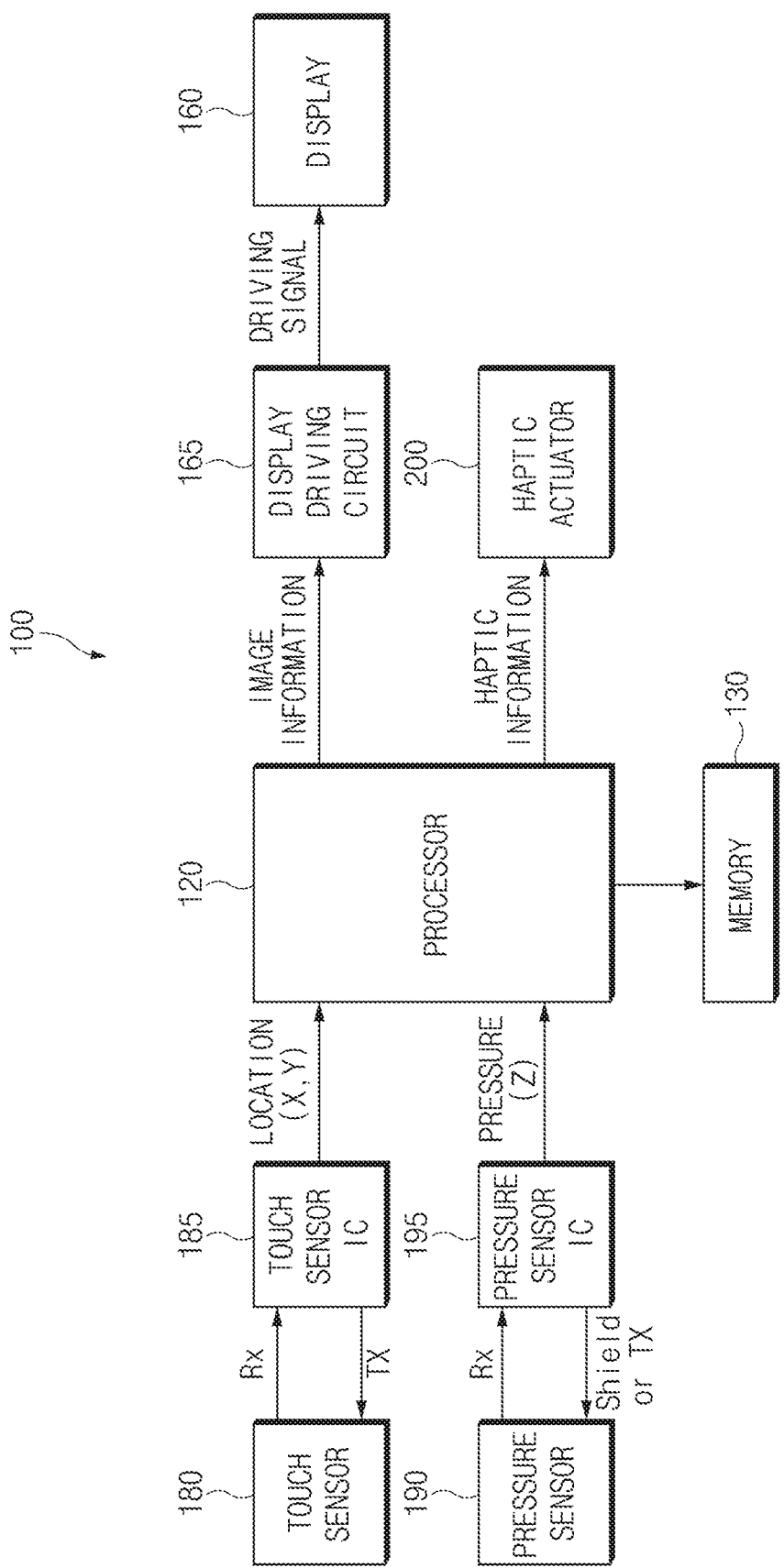
FIG. 2 is a block diagram illustrating a configuration of an electronic device according to an embodiment of the present disclosure.

FIG. 2 is a block diagram illustrating a configuration of an electronic device according to an embodiment of the present disclosure.

Referring to FIG. 2, an electronic device 100 according to an embodiment may include a display 160, a display driving integrated circuit (IC) (DDI) 165, a touch sensor 180, a touch sensor IC 185, a pressure sensor 190, a pressure sensor IC 195, a haptic actuator 200, a memory 130, and a processor 120. The above-mentioned electronic device 100 may be applied to electronic devices in various examples described above.

According to various embodiments, the display 160 may receive an image driving signal provided from the DDI 165. The display 160 may display a variety of content (e.g., text, an image, a video, an icon, a symbol, or the like) based on the image driving signal. In the specification, the display 160 may be combined to be overlapped with the touch sensor 180 and the pressure sensor 190. For example, if the display 160 and the touch sensor 180 are combined with each other, the combined body may be referred to as a "touch screen display". The display 160 may output various types of screen effects according to properties of a pressure input.

According to various embodiments, the DDI 165 may provide the image driving signal corresponding to image information received from the processor 120 (a host) to the display 160 at a predetermined frame rate. Although not illustrated, according to various embodiments, the DDI 165 may include a graphic random access memory (RAM), an interface module, an image processing unit, a multiplexer, a display timing controller (T-con), a source driver, a gate driver, an oscillator, and/or the like.

According to various embodiments, a specified physical quantity (e.g., voltage, an amount of light, resistance, an amount of electric charge, capacitance, or the like) may vary in the touch sensor 180 by a touch from a user. According to an embodiment, the touch sensor 180 may be located to be overlapped with the display 160.

According to various embodiments, the touch sensor IC 185 may detect a change in physical quantity (e.g., voltage, resistance, capacitance, or the like) in the touch sensor 180 and may calculate a location (X, Y) where a touch is performed, based on the change in physical quantity. The calculated location (coordinates) may be provided to the processor 120.

According to various embodiments of the present disclosure, if part (e.g., a finger) of a user's body, a stylus (e.g., an electronic pen), or the like is in contact with a glass (not shown) of the display 160, a coupling voltage between a transmit (Tx) end and/or a receive (Rx) end included in the touch sensor 180 may be changed. For example, the change in the coupling voltage may be detected by the touch sensor IC 185. The touch sensor IC 185 may transmit coordinates of a location where the touch is performed to the processor 120. The processor 120 may obtain data about the coordinates of the location as an event about a user input.

According to various embodiments, the touch sensor IC 185 may be referred to as a touch IC, a touch screen IC, a touch controller, a touch screen controller IC, or the like. According to various embodiments, in an electronic device which does not include the touch sensor IC 185, the processor 120 may play a role of the touch sensor IC 185. According to various embodiments, the touch sensor IC 185 and the processor 120 may be implemented as one element (e.g., a one-chip).

According to various embodiments, the pressure sensor 190 may sense an external input (or force). For example, the pressure sensor 190 may sense pressure provided to a touch screen display by a finger of the user. According to an embodiment, a physical quantity (e.g., capacitance) between a Tx end (e.g., a first electrode) and an Rx end (e.g., a second electrode) may vary by the touch in the pressure sensor 190.

According to various embodiments, the pressure sensor IC 195 may detect a change in physical quantity (e.g., capacitance or the like) in the pressure sensor 190 and may calculate pressure Z provided by a touch of the user based on the change in physical quantity. The pressure value may be provided together with a level of pressure, a location (X, Y) where the touch is performed, and duration of the touch to the processor 120. According to various embodiments, the pressure sensor IC 195 may be referred to as a force touch controller, a force sensor IC, a pressure panel IC, or the like. Further, according to various embodiments, the pressure sensor IC 195 and the touch sensor IC 185 may be implemented as one element (e.g., a one-chip).

According to various embodiments, the haptic actuator 200 may provide haptic feedback (e.g., vibration) to the user depending on a control command of the processor 120. For example, when a touch input (e.g., including a touch, hovering, or a force touch) is received from the user, the haptic actuator 200 may provide haptic feedback to the user. According to an embodiment, the haptic actuator 200 may output different vibration patterns in response to at least one of properties of a pressure input and properties of an object selected by a pressure input in response to control of the processor 120.

According to various embodiments, the memory 130 may store instructions or data associated with an operation of an element included in the electronic device 100. For example, the memory 130 may store instructions, when executed, for causing the processor 120 to perform various operations described herein. According to an embodiment, the memory 130 may store a mapping table in which a form and a size of feedback to be output are mapped according to at least one of properties of a pressure input or properties of an object.

The processor 120 may be electrically connected with, for example, elements 130 and 160 to 200 included in the electronic device 100 and may perform an arithmetic operation or data processing about control and/or communication of the elements included in the electronic device 100.

According to an embodiment, the processor 120 may detect pressure provided to a touch screen display by a finger of the user using the pressure sensor 190. The processor 120 may output different feedback depending on properties of the detected pressure input. According to various embodiments, in a state where the display 160 is turned on and off, the processor 120 may detect the provided pressure and may output specified feedback based on properties of the pressure input or properties of an object selected by the pressure input.

For example, in a state (e.g., an idle state or a sleep mode) where the display 160 is turned off, the processor 120 may maintain the pressure sensor 190 to sense occurrence of pressure. The display 160 may be in the turned-off state when the electronic device 100 operates in the idle mode or the sleep mode. For another example, in a state where the display 160 is turned on, the processor 120 may output specified feedback depending on properties of sensed pressure or properties of an object selected by the sensed pressure. The display 160 may output a lock screen, a home screen, or a screen where an application is executed, in its turned-on state.

The above-mentioned operation of the processor 120 is an example and is not limited to the above description. For example, an operation of the processor, described in another portion of the specification may be understood as an operation of the processor 120. Further, in the specification, at least some of operations described as an operation of an "electronic device" may be understood as an operation of the processor 120.

Figure 3:
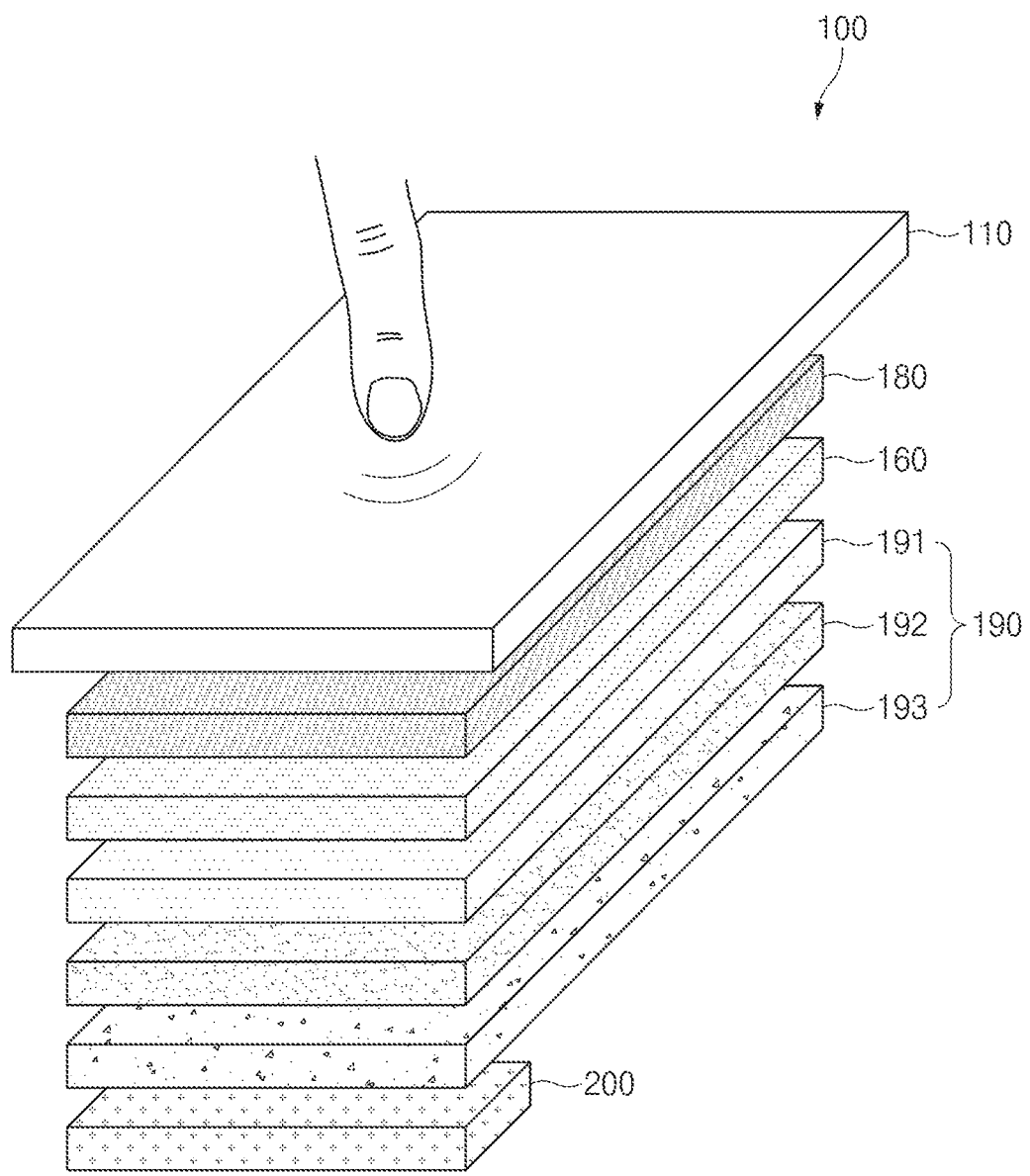
FIG. 3 is a drawing illustrating an example of a multi-layered structure of an electronic device according to an embodiment of the present disclosure.

FIG. 3 is a drawing illustrating an example of a multi-layered structure of an electronic device according to an embodiment of the present disclosure.

Figure 4:
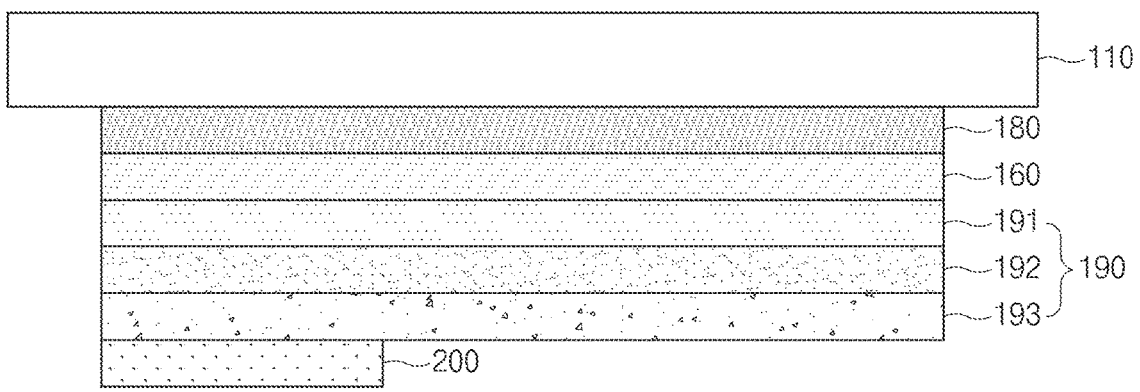
FIG. 4 is a drawing illustrating another example of a multilayered structure of an electronic device according to an embodiment of the present disclosure.

FIG. 4 is a drawing illustrating another example of a multilayered structure of an electronic device according to an embodiment of the present disclosure.

An electronic device 100 shown in FIGS. 3 and 4 may include a window 110, a touch sensor 180, a display 160, a pressure sensor 190, and a haptic actuator 200. For example, the multilayered structure may be applied to various electronic devices described in the specification.

In the multilayered structure of the electronic device 100 according to an embodiment, the window 110 may be disposed in an internal space between a front surface (a first surface) of the electronic device 100 and a rear surface (a second surface) of a housing (not shown) of the electronic device 100. The window 110 may be exposed through the front surface (the first surface) of the electronic device 100 and may transmit light generated by the display 160. A user may bring part (e.g., a finger) of his or her body into contact with the window 110 to perform a "touch" (including a contact using an electronic pen). The window 110 may be formed of, for example, tempered glass, reinforced plastic, a flexible polymer material, or the like to protect the display 160 and the electronic device 100 on which the display 160 is mounted from an external impact. According to various embodiments, the window 110 may be referred to as a glass window or a cover window.

The touch sensor 180 may be located in the internal space between the front surface (the first surface) of the electronic device 100 in which the window 110 is disposed and the read surface (the second surface) of the housing of the electronic device 100. A specified physical quantity (e.g., voltage, an amount of light, resistance, an amount of electric charge, capacitance, or the like) may vary in the touch sensor 180 by a touch from the user. For example, the touch sensor 180 may include a capacitive touch panel, a resistive touch panel, an infrared touch panel, a piezo touch panel, or the like. According to various embodiments, the touch sensor 180 may be referred to various names, such as a touch panel, depending on an implemented form.

According to various embodiments, the display 160 may output content (e.g., text, an image, a video, an icon, a widget, a symbol, or the like). The display 160 may include a liquid crystal display (LCD) panel, a light emitting diode (LED) display panel, an organic LED (OLED) display panel, a micro electro mechanical systems (MEMS) display panel, or an electronic paper display panel.

According to various embodiments, the display 160 may be integrated with a touch sensor 180 (or a touch panel). In this case, the display 160 may be referred to as a touch screen panel (TSP) or a touch screen display panel.

The pressure sensor 190 may be located in the internal space between the front surface (the first surface) of the electronic device 100 in which the window 110 is disposed and the read surface (the second surface) of the housing of the electronic device 100. The pressure sensor 190 may sense pressure (or force) of the outside (e.g., a finger of a user) on the window 110. According to an embodiment, the pressure sensor 190 may include a first electrode 191, a second electrode 192, and/or a dielectric layer 192. For example, the pressure sensor 190 may sense pressure of the touch based on capacitance between the first electrode 191 and the second electrode 193 which are changed by the touch.

According to an embodiment, the first electrode 191 and/or the second electrode 193 may be implemented to be transparent or opaque. For example, if the first electrode 191 and/or the second electrode 193 is implemented to be opaque, it or they may be implemented with copper (Cu), silver (Ag), magnesium (Mg), titanium (Ti), or opaque graphene. If the first electrode 191 and/or the second electrode 193 is implemented to be transparent, it or they may be implemented with indium tin oxide (ITO), indium zinc oxide (IZO), an Ag nanowire, a metal mesh, a transparent polymer conductor, or a transparent graphene.

For example, one of the first electrode 191 and/or the second electrode 193 may he implemented with one metal plate which plays a role of the ground, and the other may be formed as a repeated polygon pattern using the above-mentioned member (a so-called self-capacitance type). For another example, one (e.g., a Tx end) of the first electrode 191 and/or the second electrode 193 may be formed as a pattern extended in a first direction, and the other (e.g., an Rx end) may be formed as a pattern extended in a second direction intersecting the first direction at a specified angle (e.g., a right angle) (a so-called mutual-capacitance type).

The dielectric layer 192 may be implemented with dielectric material, for example, silicon foam, a silicon membrane, optical clean adhesive (OCA), a sponge, rubber, or a polymer (e.g., polycarbonate (PC), polyethylene terephthalate (PET), or the like).

When a touch input (including a touch, hovering, and a "force touch") is received from a user, the haptic actuator 200 may provide haptic feedback (e.g., vibration) to him or her. For this purpose, the haptic actuator 200 may include a piezoelectric member, a vibration plate, and/or the like. The haptic actuator 200 may output a specified vibration pattern depending on at least one of properties of a pressure input or properties of an object selected by the pressure input in response to control of a processor 120 of FIG. 2.

The above-mentioned multilayered structure of the electronic device 100 of FIG. 3 or 4 may he an example, and various modifications are possible. For example, the touch sensor 180 may be directly formed on a rear surface of the window 110 (a so-called a touch pane integrated with a window). Alternatively, the touch sensor 180 may be separated manufactured and may be inserted between the window 110 and the display 160 (a so-called add-on touch panel). Alternatively, the touch sensor 180 may be directly formed on the display 160 (a so-called on-cell touch panel). Alternatively, the touch sensor 180 may be included in the display 160 (a so-called in-cell touch panel). According to various embodiments, the first electrode 191 of the pressure sensor 190 may be formed on a circuit board (e.g., a flexible printed circuit board (FPCB)) and may be attached to the display 160, or may he directly formed a rear surface of the display 160.

Figure 5:
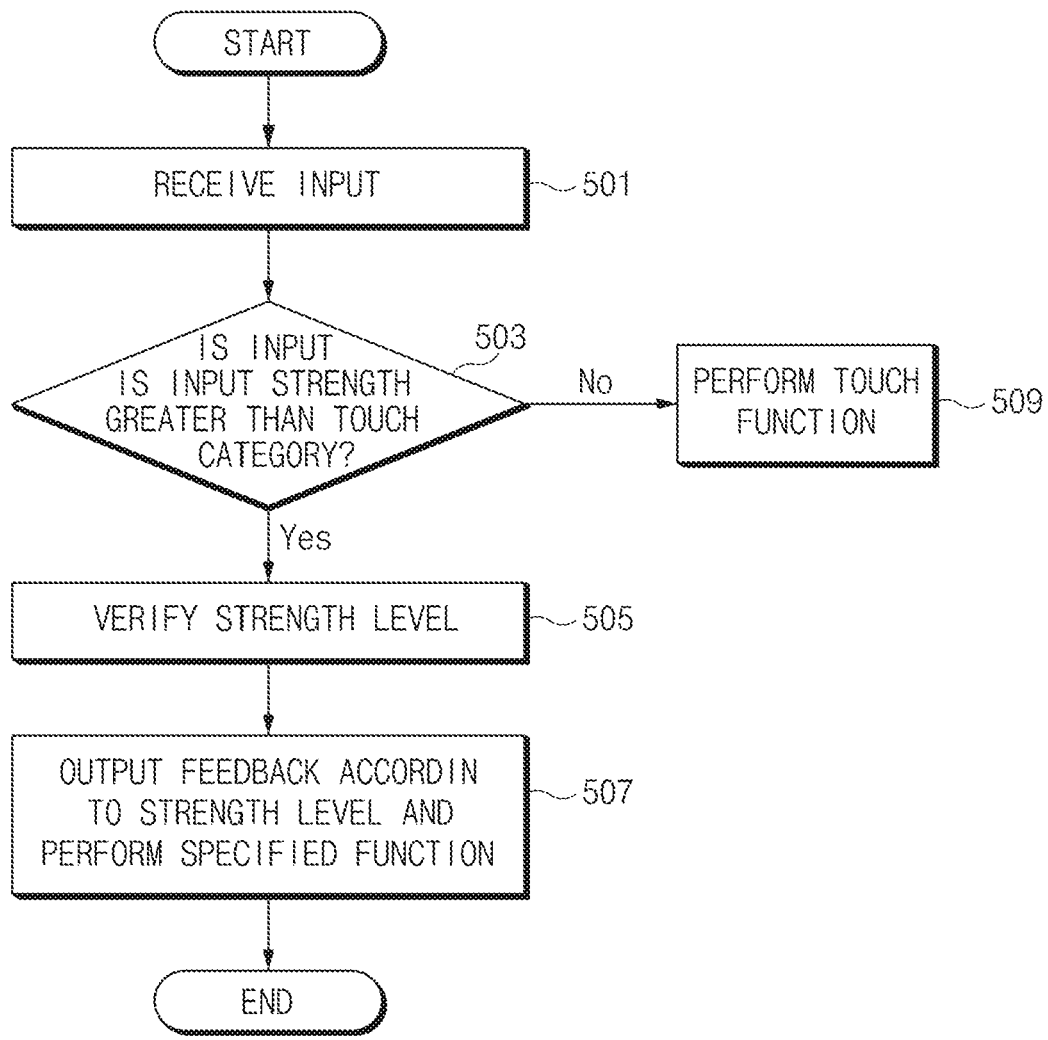
FIG. 5 is a flowchart illustrating an example of a method for operating an electronic device according to an embodiment of the present disclosure.

FIG. 5 is a flowchart illustrating an example of a method for operating an electronic device according to an embodiment of the present disclosure.

Referring to FIG. 5, in connection with the method for operating the electronic device according to an embodiment of the present disclosure, in operation 501, a processor 120 of an electronic device 100 of FIG. 2 may receive information associated with an input which occurs on a display 160 of FIG. 2. The information associated with the input may include at least one of a level, a location, and a duration of pressure in response to a user operation in a form where a constant point of the display 160 is pushed.

In operation 503, the processor 120 may determine whether input strength is greater than a touch category. In this regard, the electronic device 100 may store a reference value for classifying a touch input (or touch input information) and a pressure input (or pressure input information) in a memory 130 of FIG. 2. According to an embodiment, a level of the touch input may be defined as a pressure value which is greater than or equal to a first level and is less than or equal to a second level. A level of the pressure input may be defined as values which are greater than the second level. The pressure input may include values in which pressure values greater than the second size are classified into a plurality of stages.

If the pressure input is greater than the touch category, in operation 505, the processor 120 may verify a strength level of pressure. In this regard, the electronic device 100 may include a plurality of strength levels, and each of the plurality of strength levels may include a constant pressure range. In operation 507, the processor 120 may output feedback according to the strength level and perform a specified function. For example, if a pressure input corresponding to a first strength level occurs, the processor 120 may output first feedback corresponding to the first strength level. The processor 120 may perform a specified user function, for example, may select an object or may play back the object, depending on occurrence of the pressure input of the first strength level. Alternatively, if a pressure input corresponding to a second strength level which is different from the first strength level or is greater than the first strength level occurs, the processor 120 may output second feedback corresponding to the second strength level. The second feedback may include, for example, feedback of providing a heavy feeling which is larger than the first feedback (e.g., a vibration pattern of a relatively low frequency or an audio of a relatively low frequency). According to various embodiments, the processor 120 may perform a specified function, for example, may select an object and may delete the selected object, when the second strength level occurs. An audio of a relatively high frequency may be used to represent a relatively light feeling (e.g., to be applied when the first feedback is output to provide a relatively smaller heavy feeling).

In the above-mentioned operation, the second strength level may occur while passing through the first strength level. Thus, if a specified strength level is maintained during a specified time, the processor 120 may determine that a pressure input of the strength level occurs. The processor 120 may process a strength level, which is maintained during a relatively long time, as a strength level of a pressure input during a time from a start time when the pressure input occurs to a time when the pressure input is ended.

Meanwhile, in operation 503, if the input strength is within the touch category, in operation 509, the processor 120 may execute a function according to a touch input. For example, the processor 120 may determine that a tap event occurs on a point where a touch occurs.

According to various embodiments, the processor 120 may process occurrence of two or more pressure depending on a duration of a pressure input. For example, the processor 120 may classify a duration of a pressure input of a user into two or more time input stages and may perform an operation set according to each of the classified stages.

Figure 6A:
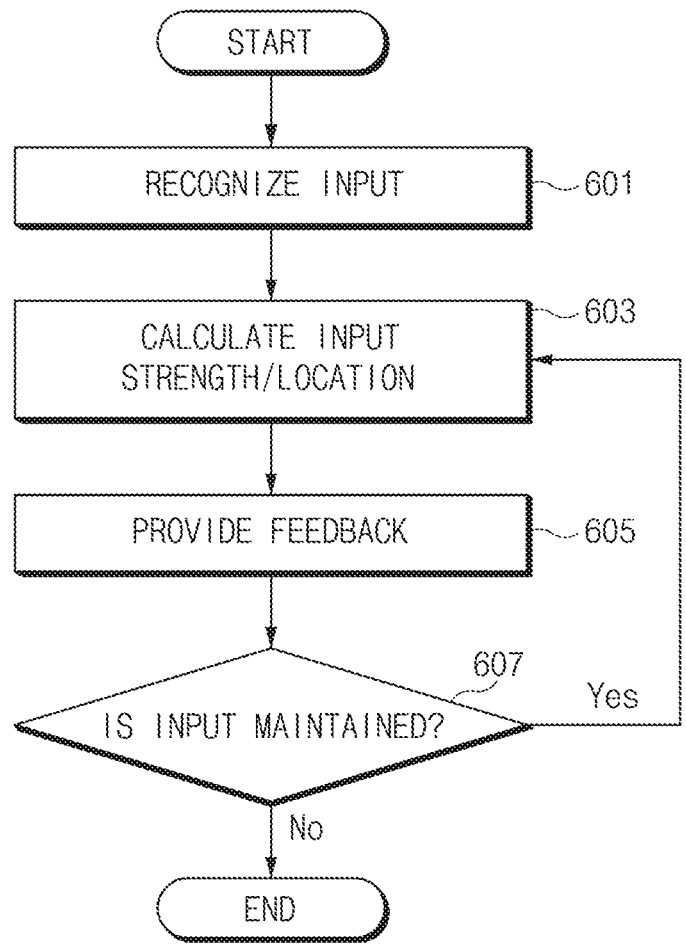
FIG. 6A is a flowchart illustrating another example of a method for operating an electronic device according to an embodiment of the present disclosure.

FIG. 6A is a flowchart illustrating another example of a method for operating an electronic device according to an embodiment of the present disclosure.

Referring to FIG. 6A, in connection with the method for operating the electronic device according to an embodiment of the present disclosure, in operation 601, a processor 120 of FIG. 2 may recognize an input in response to an input operation of a user. In this regard, the processor 120 may turn on a display 160 of FIG. 2 or may maintain the display 160 always in a turn-on state. According to various embodiments, after turning on a touch sensor 180 of FIG. 2 or maintaining the touch sensor 180 always in a turn-on state, if a touch input occurs, the processor 120 may activate a pressure sensor 190 of FIG. 2. Alternatively, after activating the touch sensor 180, if a touch input is maintained during a constant time, the processor 120 may activate the pressure sensor 190.

In operation 603, the processor 120 may calculate input strength and an input location. Herein, a duration of a pressure input may be a time when real pressure is provided to a specific location and may include a time when a touch is maintained on a corresponding location after pressure is initially detected.

In operation 605, if the input strength and the input location are detected, the processor 120 may output feedback in response to the input strength and the input location. For example, the processor 120 may determine a level of feedback corresponding to the input strength and may determine a point which outputs the determined feedback depending on an input location. According to an embodiment, the electronic device 100 may include a haptic actuator 200 of FIG. 2, provided to change a feedback output form for each location of the display 160 and may control a haptic actuator 200 of FIG. 2 such that a user may feel vibration to be relatively larger at a point where an input occurs using the haptic actuator 200. The processor 120 may provide a specific function using an input value of another external sensor, such as a touch sensor, an acceleration sensor, or a fingerprint sensor, other than an input value of the pressure sensor 190. According to various embodiments, while a pressure input is maintained, if a selected object and properties of the object are changed, the processor 120 may provide different feedback based on the changed object and/or properties. The properties of the object may include information associated with the object, for example, capacity of the object, importance of the object, and a frequency of use of the object, and the like and information which may be obtained through the object.

In this regard, in operation 607, the processor 120 may determine whether pressure is maintained. If the pressure is maintained, the processor 120 may branch to operation 603 to perform the operation again from operation 603.

According to various embodiments, the processor 120 of the electronic device 100 may change properties of feedback (e.g., at least one of a type and a level of the feedback) depending on properties (e.g., a size or a strength level, a duration, and a location) of a pressure input. According to various embodiments, the processor 120 may change properties of feedback depending on properties (e.g., a type, a size, or the like) of an object. Alternatively, the processor 120 may determine the properties of the pressure input and the properties of the object in a complex manner and may change properties of feedback depending on the determined result.

Figure 6B:
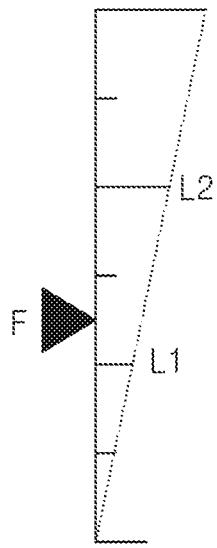

FIG. 6B is a drawing illustrating an example of a pressure input according to a form of an input according to an embodiment of the present disclosure.

Referring to FIG. 6B, a processor 120 of FIG. 2 may be configured to output different haptic feedback depending on at least one of a type of an input, intensity of the input, a duration of the input. For example, if an input of first pressure intensity (which is greater than or equal to L1 and is less than L2) occurs with first force, the processor 120 may output a first type of haptic feedback. Alternatively, if an input of second pressure intensity (which is greater than or equal to L2) occurs with second force, the processor 120 may output haptic feedback of a second type different from the first type. According to various embodiments, if a pressure is maintained for 5 seconds while having the first pressure intensity (which is greater than L1 which is less than L2) with the first force, the processor 120 may output the first type of the haptic feedback. If pressure is maintained for 10 seconds while having the second pressure intensity (which is greater than or equal to L2) with the second force, the processor 120 may output the second type of the haptic feedback. If pressure is maintained for 30 seconds while having third pressure intensity (which is greater than or equal to L3) with the third force, the processor 120 may output haptic feedback of a third type different from the second type.

FIG. 7 is a drawing illustrating a feedback change according to properties of an object according to an embodiment of the present disclosure.

Referring to FIG. 7, according to an embodiment, an object output on a display 160 of FIG. 2 may include text, an image (e.g., an image, such as a still image or a photo, configured with one frame), a video file (es , an image file, such as a slide or a video, configured with a plurality of frames), and the like. The processor 120 may output different feedback (e.g., vibration of different levels) depending on a type of an object selected by a pressure input. If a type of an object selected by a pressure input is changed, the processor 120 may output different feedback.

According to an embodiment, if a selected object is text, the processor 120 may output feedback of relatively low first intensity (e.g., vibration with relatively low amplitude, an audio with relatively low volume, light with relatively low intensity, or the like). According to various embodiments of the present disclosure, if the selected object is an image, the processor 120 may output feedback of second intensity (e.g., vibration, volume, and light of an illumination value, which are different from the first intensity or are higher than the first intensity). If the selected object is a video file, the processor 120 may output feedback of third intensity (e.g., vibration, volume, and light of an illumination value, which are different from the second intensity or are higher than the second intensity). According to an embodiment, the processor 120 may be configured to output feedback of providing a light feeling with respect to text, output feedback of providing an ordinary feeling (e.g., a relatively heavier feeling than the light feeling) with respect to an image, and output feedback of providing a heavy feeling (e.g., a relatively heavier feeling than the ordinaiy feeling) with respect to a video file.

According to various embodiments, the processor 120 may adjust feedback output according to contents (e.g., considerations) of selected objects. For example, the processor 120 may change a level or a type of feedback (e.g., vibration) (or different feedback such as vibration of a different pattern or an audio) to be output in response to a text object depending on the number of text included in the text object (e.g., the number of words, the number of sentences, the number of paragraphs, or the like) and a change in text (e.g., a change in paragraph or the like) and may output the changed feedback. Alternatively, the processor 120 may change a level or a type of feedback to be output in response to an image object depending on a size of the image object, a time when an image is captured, the number of persons included in the image, or the like and may output the changed feedback. Alternatively, the processor 120 may change a level or a type of feedback to be output in response to a video file depending on a size of the video file, a time when a video is captured, the number of persons included in the video, or the like and may output the changed feedback. According to an embodiment, the processor 120 may analyze an amount of variation of an object selected in response to a change in pressure input (e.g., drag which occurs according to movement of a finger on the display 160 while pressure of a specified level or more is maintained, or the like), and may change a type and/or a level of feedback according to the analyzed amount of variation and may output the changed feedback.

An electronic device according to various embodiments may include a processor configured to execute instructions stored in a memory of the electronic device. The processor may be configured to output a user interface (UI) including an object (e.g., at least one of text, an image, and a video file) on a display of the electronic device, verify a type of the object if a pressure input associated with the object occurs, and output different feedback depending on the type of the feedback. The processor may output relatively heavy feedback (e.g., vibration feedback of a relatively low frequency) in response to a type of an object which is relatively large in data quantity.

According to various embodiments, intensity of feedback (e.g., vibration) may vary in response to a level (e.g., T1, T2, or T3) of a pressure input. For example, referring to intensity of feedback of FIG. 7, when a pressure input (e.g., a curved graph) occurs, vibration of a constant level (e.g., a bar graph) corresponding to the level (e.g., T1, T2, or T3) of the pressure input may occur.

FIG. 8 is a drawing illustrating an example of a feedback output according to information associated with a selected object according to an embodiment of the present disclosure.

Referring to FIG. 8, in state 801, a display 160 of an electronic device 100 may output a screen including folders including at least one image. A screen of state 801 may include, for example, a folder region 841 and an image region 843. A plurality of folders may be located in the folder region 841. Images included in a folder selected on the folder region 841 may be located in the image region 843.

According to an embodiment, in state 803, if a first folder 810 including a relatively small number of images is selected on the folder region 841 by a pressure input, a processor 120 of FIG. 2 may verify the number of images included in the selected first folder 810. The processor 120 may output first feedback 811 (e.g., vibration of a first frequency or first amplitude) corresponding to a type and/or a level of feedback corresponding to the number of the included images. Further, in state 803, if a second folder 820 including a relatively large number of images is selected on the folder region 841 by a pressure input, the processor 120 may verify the number of images included in the selected second folder 820. The processor 120 may output second feedback 813 (e.g., vibration of a second frequency or second amplitude) corresponding to a type and/or a level of feedback corresponding to the number of the images included in the second folder 820. According to an embodiment, the first feedback 811 may be lower in amplitude than the second feedback 813. While performing the above-mentioned operation, the processor 120 may output different feedback depending on a level, a location, a duration, or the like of a pressure input.

According to various embodiments, while outputting a screen associated with a function of displaying a plurality of content such as a file explorer, a gallery, and an electronic mail (e-mail) of the electronic device 100, the processor 120 may output specified feedback associated with an object selected by a pressure input. For example, the processor 120 may output different feedback depending on a pressure input for selecting the first folder 810 including content of 150 megabytes (MB) or a pressure input for selecting the second folder 820 including content of 200 MB. The 150 MB may correspond to the entire capacity of the images included in the first folder 810, and the 200 MB may correspond to the entire capacity of the images included in the second folder 820. The processor 120 may output stronger haptic feedback when the second folder 820 having a larger size than the first folder 810 is selected. As capacity of content is larger, the processor 120 may output feedback of allowing a user to feel heavier. The user may determine (or estimate) an amount of content of an object selected by his or her pressure input depending on a form of feedback.

According to various embodiments, the processor 120 may provide different feedback depending on whether a file of an e-mail selected by a pressure input is attached or depending on capacity of an attached file. For example, the processor 120 may change first feedback output when a pressure input of an object corresponding to an e-mail in which there is no attached file occurs and second feedback output when a pressure input of an object corresponding to an e-mail in which there is an attached file occurs. The first feedback if there is no attached file in the e-mail may include feedback of a lighter feeling than feedback of the second feedback if there is the attached file in the e-mail.

According to various embodiments, the processor 120 may output first feedback output when a pressure input on an object (e.g., a chat window including only text) in which there is no attached file occurs while operating a messenger function such as a chat and second feedback output when a pressure input on an object in which there is an attached file (e.g., a chat window including an attached photo) occurs in different forms. For example, the processor 120 may adjust a sensation (e.g., a haptic sensation) the user feels by the second feedback to be in a form different from the first feedback (e.g., a form higher than the first feedback).

According to various embodiments, a processor of an electronic device may execute at least one instruction stored in a memory of the electronic device. The at least one instruction may be configured to output a (UI) including at least one object, receive a pressure input of a specified level or more for selecting the object, verify information associated with an object selected by the pressure input, and output vibration feedback of a first frequency or first amplitude if the information associated with the object is less than a first criterion and output vibration feedback of a second frequency relatively lower than the first frequency or second amplitude which is different from the first amplitude or is higher than the first amplitude if the information associated with the object is greater than or equal to the specified criterion.

According to various embodiments, an electronic device may include a processor configured to execute instructions stored in a memory of the electronic device. The processor may be configured to output a (UI) including an object on a display of the electronic device, verify the number of sub-objects of an object selected by a pressure input if the pressure input associated with the object occurs, and output specified feedback depending on the number of the objects. For example, the processor may be configured to output vibration feedback of a first frequency or first amplitude if the number of the sub-objects is less than a specific first number and output vibration feedback of a second frequency a frequency lower than the first frequency) or second amplitude (e.g., amplitude which is different from the first amplitude or is higher than the first amplitude) if the number of the sub-objects is greater than or equal to the first number.

FIG. 9 is a drawing illustrating another example of a feedback output according to information associated with a selected object according to an embodiment of the present disclosure.

Referring to FIG. 9, in response to executing a specified function, an electronic device 100 may output a screen where a function is executed on a display 160. The screen where the function is executed may be a screen, such as screen 901, on which at least one object is located. If a pressure input for selecting a first object 910 is generated on screen 901, the processor 120 may output a first feedback 911 depending on properties of the generated pressure input or properties of the first object 910 selected by the generated pressure input. For example, the processor 120 may output the first feedback 911 having a first vibration level in response to the number of persons included in the selected first object 910.

According to various embodiments, if a pressure input for selecting a second object 920 occurs on screen 903, the processor 120 may output second feedback 913 having a second vibration level in response to the number of persons included in the second object 920. The second feedback 913 may include, for example, vibration based on a frequency with relatively higher amplitude than that of the first feedback 911. The vibration by the frequency with the high amplitude may provide, for example, a heaver feeling to a user Based on the above-mentioned function, the user may determine the number of persons included in a selected photo object in a haptic manner as well as a visual manner.

According to various embodiments, a processor 120 of FIG. 2 may output feedback of a different form based on information included in an object selected by a pressure input. For example, the processor 120 may obtain information about an age or weight of a person included in an object selected by a pressure input and may output feedback corresponding to the obtained information. The age, weight, or the like of the person may be performed based on analysis of an image included in the object. For example, the processor 120 may analyze a face of the person and may compare and determine information about whether there are wrinkles of a constant size or number or more on a specified portion, a skin aging degree, or the like with previously stored reference information. Alternatively, the processor 120 may determine weight information of the person included in the object based on a database which may analyze a weight of the person based on a body size or rate of the person or a body type of the person. The processor 120 may be configured to output feedback of a relatively light feeling if an age, a weight, or the like is relatively low according to the determined information. The processor 120 may be configured to output feedback of a relatively heavy feeling if the age, the weight, or the like is relatively high according to the determined information.

According to various embodiments, the processor 120 may output a variety of feedback depending on a type of an object selected by a pressure input. For example, the processor 120 may determine a type of each of elements (e.g., a stone, a bread, a table, a blanket, or the like) included in an object (e.g., an image) based on a database (e.g., texture provided to distinguish a stone, a bread, a table, a blanket, or the like) which previously store the type of each of the elements included in the object. According to various embodiments, the processor 120 may transmit an object (e.g., an image) to an element analysis server and may receive information about a type of the object from the server. The processor 120 may output different feedback depending on a type of an element. For example, if a stone is included in an object, the processor 120 may output feedback of providing a hard feeling (e.g., fast vibration with high amplitude, which is repeatedly generated at a constant period). Alternatively, if a blanket is included in an object, the processor 120 may output feedback of providing a soft feeling (e.g., slow vibration with low amplitude, which is maintained to be relatively long).

According to various embodiments, the processor 120 may verify tag information of an object and may output specified feedback based on the tag information of the object. For example, if an object is an object in which a usage time is limited, the processor 120 may output different feedback based on a length of an expiration date when the object is used or a generation time when the object is generated. According to an embodiment, when a pressure input for selecting an object with relatively little expiration date left occurs, the processor 120 may output feedback (e.g., relatively fast frequency vibration) of providing relatively high tension. Alternatively, when a pressure input for selecting an object with an old generation time occurs, the processor 120 may output feedback of a light feeling or an old feeling (e.g., vibration of a relatively slow frequency).

An electronic device according to various embodiments may include a processor configured to instructions stored in a memory of the electronic device. The processor may be configured to output a UI including an object on a display of the electronic device, verify the number of screen elements (e.g., persons) included in an object selected by a pressure input if the pressure input associated with the object occurs, and output specified feedback depending on the number of the screen elements. For example, the processor may be configured to output vibration feedback of a first frequency or first amplitude if the number of the screen elements is less than a first number and output vibration feedback of a second frequency (e.g., a frequency which is different from the first frequency or is lower than the first frequency) or second amplitude (e.g., amplitude which is different from the first amplitude or is higher than the first amplitude) if the number of the screen elements is greater than or equal to the first number.

FIG. 10 is a drawing illustrating an example of a feedback output according to comparison of relative information of selected objects according to an embodiment of the present disclosure.

Referring to FIG. 10, a display 160 of an electronic device 100 may output a screen, such as screen 1001, including map information depending on execution of a specified function. Alternatively, the display 160 may output a plurality of route information (e.g., a first route 1010 and a second route 1030) on the map information. Alternatively, the display 160 may provide a selection button for selecting any one of the plurality of routes 1010 and 1030. The display 160 may provide a screen where any one of the plurality of routes 1010 and 1030 is selected as a default.

If a first pressure input 1011 occurs on the selection button, the display 160 may highlight a route (e.g., the first route 1010) selected as a default on screen 1001. If a second pressure input 1013 occurs on the selection button, the display 160 may highlight another route (e.g., the second route 1030) on screen 1003 by changing the route (e.g., the first route 1010) selected as the default to the route (e.g., the second route 1030). According to an embodiment, if a pressure input for selecting the first route 1010 occurs, a processor 120 of FIG. 2 may output first feedback 1021 corresponding to the first route 1010. The first feedback 1021 may include vibration having amplitude or a frequency of a first level.

According to an embodiment, if the pressure input for selecting the first route 1010 occurs, the display 160 may highlight a specified route (e.g., the first route 1010) on screen 1005. If a pressure input for selecting the second route 1030 occurs, the processor 120 may output second feedback 1023 corresponding to the second route 1030 again on screen 1003. The second feedback 123 may include, for example, vibration having amplitude or a frequency of a second level (e.g., a level which is different from the first level or is higher than the first level).

According to various embodiments, if a specified pressure input occurs on a button associated with selecting a route, the processor 120 may alternately highlight the first route 1010 and the second route 1030. In this operation, the processor 120 may output a specified feedback corresponding to a selected route.

FIG. 11 is a drawing illustrating another example of a feedback output according to comparison of relative information of selected objects according to an embodiment of the present disclosure.

Referring to FIG. 11, a processor 120 of FIG. 2 may be configured to output different feedback depending on a difference of a time taken by a route. For example, if a time taken by a route selected by a pressure input is long, the processor 120 may provide stronger or longer feedback than if the time taken is short. According to an embodiment, as shown in screen 1101, it takes 5 hours 11 minutes in case of a first route and it takes 9 hours 20 minutes in case of a second route. In this case, if the second route is selected through a pressure input 1110 for selecting the second route, the processor 120 may provide feedback 1111 configured to allow a user to feel that a time taken is long (e.g., vibration with relatively high amplitude or feedback having a time when relatively long vibration occurs or a time when relatively longer light is emitted). According to various embodiments, if a pressure input 1130 in screen 1103 for selecting the first route having a relatively short time taken occurs, the processor 120 may provide feedback 1113 configured to allow the user to feel that a time taken is short (e.g., vibration with relatively low amplitude or feedback having a time when relatively short vibration occurs or a time when relatively shorter light is emitted).

According to various embodiments, a processor 120 of an electronic device 100 of FIG. 2 may provide feedback in a different way depending on importance of an object selected by a pressure input. For example, the processor 120 may output feedback in a different way depending on a type which is transmission of a message selected by a pressure input. According to various embodiments, if a sender of a received message belongs to a specified group, such as a family member or a company, stored in contact information (or a phonebook), the processor 120 may output feedback configured to allow the user to feel relatively strong or heavy. In this regard, the processor 120 may extract a message sender and/or may perform phonebook comparison. If a received message is an advertisement or the like, the processor 120 may output feedback configured to allow the user to feel relatively weak and light. In this regard, the processor 120 may analyze contents of a message to verify whether a word such as "advertisement" is included in the message. Based on the above-mentioned function, the user may determine importance of a corresponding message without executing a specific message application. According to various embodiments, in case of an operation (e.g., a data deletion operation), such as message deletion or application deletion, in which it is necessary for user's agreement and in which it is difficult to perform recovery, the processor 120 may provide feedback different from a general selection operation such that the user recognizes importance of the operation.

An electronic device according to various embodiments may include a processor configured to execute instructions stored in a memory of the electronic device. The processor may be configured to output a UI including an object on a display of the electronic device, verify information about a time taken, indicated by the object selected by the pressure input, and output specified feedback depending on a level of the information about the time taken. For example, the processor may be configured to output vibration feedback of a first frequency or first amplitude if the information about the time taken is less than a first time and output vibration feedback of a second frequency (e.g., a frequency which is different from the first frequency or is lower than the first frequency) or second amplitude (e.g., amplitude which is different from the first amplitude or is higher than the first amplitude) if the information about the time taken is greater than or equal to the first time. Vibration and a pressure input, such as the above-mentioned feedback 1111 or 1113, may be an example of vibration or a pressure input described with reference to FIG. 7.

FIG. 12 is a drawing illustrating an example of a payment related feedback output according to an embodiment of the present disclosure.

FIG. 13 is a drawing illustrating another example of a payment related feedback output according to an embodiment of the present disclosure.

Referring to FIGS. 12 and 13, in state 1201, an electronic device 100 of FIG. 2 may output a screen according to execution of a specified payment application function on a display 160 of FIG. 2. When a pressure input occurs on a screen where the payment application function is executed, a processor 120 of FIG. 2 may output specified feedback information associated with payment contents. For example, when pressure occurs in a state where a screen when payment is performed is output on the display 160, the processor 1230 may output first feedback 1211 on screen 1203 in response to a first payment amount. When pressure occurs in a state where the screen where the payment is performed is output on the display 160, the processor 120 may output second feedback 1213 on screen 1205 in response to a second payment amount. The first feedback 1211 may include, for example, vibration of relatively lower amplitude than the second feedback 1213.

According to an embodiment, if a payment amount specified by a user is 40,000 won, the processor 120 may output the first feedback 1211 on screen 1203 when the user pays less than 40,000 won and may output the second feedback 1213 on screen 1205 when he or she pays 40,000 or more. For another example, the processor 120 may set feedback, provided with respect to an accumulated amount in which payment amounts are accumulated, the number of accumulated payment, or the like, in a different way. The second feedback 1213 may be feedback of allowing the user to feel heavy. Visual feedback may be provided other than the haptic feedback.

Referring to FIG. 13, the processor 120 may output a screen where a payment function is executed, such as screen 1301, on a display 160 of FIG. 2 depending on execution of a payment function application. If a specified touch input occurs to pay a specified payment amount (e.g., 30,000 won) or less in a state where the screen where the payment function is executed is output on the display 160, the processor 120 may output specified feedback 1311 on screens 1303 and 1305 in the same manner. The touch input may include, for example, a touch for fingerprint sensing. According to various embodiments, while fingerprint sensing associated with payment is performed, as described with reference to FIG. 12, if payment amounts (e.g., 30,000 won), each of which is greater than a specified level, differ from each other, the processor 120 may output different feedback depending on the level of the payment amount.

An electronic device according to various embodiments may include a processor configured to execute instructions stored in a memory of the electronic device. The processor may be configured to output a UI including an object on a. display of the electronic device, verify payment information paid by an object selected by a pressure input if the pressure input associated with the object occurs, and output specified feedback depending on a level of a payment amount. For example, the processor may be configured to output feedback of a first frequency or first amplitude if the payment amount is less than a first amount and output vibration feedback of a second frequency (e.g., a frequency which is different from the first frequency or is lower than the first frequency) or second amplitude (e.g., amplitude which is different from the first amplitude or is higher than the first amplitude) if the payment amount is greater than or equal to the first amount.

FIG. 14 is a drawing illustrating an example of a feedback output according to an amount of variation of an object selected in response to an input change according to an embodiment of the present disclosure.

Referring to FIG. 14, in response to a request to execute a specified application, a processor 120 of an electronic device 100 of FIG. 2 may output a screen including text (e.g., a document writing screen, a document view screen, an Internet webpage screen, or the like), such as screen 1401, on a display 160. A user may select at least a partial region of the text on the screen through his or her input. The processor 120 may output specified feedback in response to a size of a text region selected in response to a pressure input. The processor 120 may output different feedback depending on a size of the selected text region.

According to an embodiment, a first text region 1431 is selected by a first pressure input 1410 during time t1 (e.g., pressure of a specified level or more and pressure if the pressure is maintained during a specified time after a constant region of the display 160 is touched or if the pressure is gradually increased and decreased by a constant level with respect to a maximum point of the pressure) on screen 1401, the processor 120 may output feedback of a constant level corresponding to a size of the first text region 1431. According to various embodiments, in the shown drawing (see reference numerals 1411a and 1411b), the feedback of the constant level may be $11^{th}$ feedback (e.g., vibration 1411a) or $12^{th}$ feedback (e.g., vibration 1411b), and may be output during time t1 or may be output from a constant time after the first pressure input 1410 occurs to time t1. For example, the first pressure input 1410 may have a state, such as the $11^{th}$ feedback 1411a or the $12^{th}$ feedback 1411b, where a level of pressure gradually increases while drag is performed in a lower direction from an upper end of a screen and the level of the pressure more decreases than a just previous state while drag movement is stopped at a constant point.

The $11^{th}$ feedback (e.g., the vibration 1411a) may include, for example, feedback of generating vibration of a constant level in response to maintaining a first pressure input after the first pressure input of a specified level (e.g., T2) or more occurs. The vibration may be output to be shorter than, for example, time t1 or may continue being generated while a touch is maintained. The display 160 may display (e.g., inversely display) the first text region 1431 to be distinguished from a region around the first text region 1431.

For example, the $12^{th}$ feedback (e.g., the vibration 1411b) may gradually increase in strength to a specified level after a first pressure input of a specified level (e.g., T1) or more occurs.

According to various embodiments, if a second pressure input 1430 (e.g., a drag input moved by a specified distance after the first pressure input 1410) occurs on screen 1403 during time t2 after the first pressure input 1410 occurs, the processor 120 may output feedback of a constant level corresponding to a size of a second text region 1433. The second pressure input 1430 may be a pressure input (e.g., a pressure input between times t1 and t2) in a form having a second point of inflection, for example, a $21^{st}$ pressure input 1413a. A pressure input (e.g., a pressure input from 0 to time t1) in a form having a first point of inflection in the $21^{st}$ pressure input 1413a may indicate the first pressure input 1410. Feedback of a constant level in the shown drawing (see reference numerals 1413a and 1413b) may be feedback such as $21^{st}$ feedback (e.g., vibration 1413a) or $22^{nd}$ feedback (e.g., vibration 1413b). In another embodiment, feedback different from the $11^{th}$ feedback (e.g., the vibration 1411a) or the $12^{th}$ feedback (e.g., the vibration 1411b) of a t1 interval may be output depending on a size of a selection region. The second pressure input 1430 may be, for example, an input which occurs subsequent to occurrence of the first pressure input 1410 and may be an input which has the same level as the first pressure input 1410 or has a level lower than the first pressure input 1410. The processor 120 may consecutively output part of feedback between times t1 and t2. According to various embodiments, the feedback may be output during at least part of a time between times t1 and t2.

According to an embodiment, the second pressure input 1430 may be a pressure input in a form having two points of inflection, for example, the $21^{st}$ pressure input 1413a. For example, the $21^{st}$ pressure input 1413a may include a pressure input corresponding to an operation of performing drag while gradually increasing pressure while an input object (e.g., a finger of a user) is dragged in a lower direction from an upper end of the display 160, performing drag while increasing pressure again after stopping at a point, and stopping drag while decreasing pressure. Alternatively, the second pressure input 1430 may be a pressure input in a form having one point of inflection, for example, a $22^{nd}$ pressure input 1413*b*. For example, the $22^{nd}$ pressure input 1413*b* may include a pressure input corresponding to an operation of performing drag while initially increasing pressure while the input object is dragged in a lower direction from an upper end of the display 160 and performing drag while uniformly maintaining pressure from a constant distance or more.

If an additional pressure input of T2 or more occurs while a region selected by a constant pressure input is enlarged through drag, in the $21^{st}$ feedback (e.g., the vibration 1413*a*), vibration of a level greater than vibration of a constant level, which occurs in time t1, may be output. For example, the $21^{st}$ feedback (e.g., the vibration 1413*a*) may include a form where a level of vibration increases stage by stage. In another embodiment, the $21^{st}$ feedback (e.g., the vibration 1413*a*) may be vibration of the same level as that of the vibration which occurs in time t1. In another embodiment, in the $21^{st}$ feedback (e.g., the vibration 1413*a*), the vibration of the constant level, which occurs in time t1, may occur a plurality of times until time t2.

The $22^{nd}$ feedback (e.g., the vibration 1413*b*) may be configured such that vibration gradually increases until an interval between times t1 and t2 if a selection region is enlarged through a drag operation and if a second pressure input is maintained between T1 an T2 (e.g., if the second pressure input stays on a specific location during a constant time or more). In another embodiment, the $22^{nd}$ feedback (e.g., the vibration 1413*b*) may include vibration having an irregular level in response to a drag input. The display 160 may display (e.g., inversely display) the second text region 1433 to be distinguished from a region around the second text region 1433. In addition, upon a drag input, a level of a pressure input of a user may increase. In this case, the processor 120 may generate vibration of a relatively high level depending on the increase of the pressure input. Alternatively, if an increase of a drag selection region is irregular, the processor 120 may output vibration, strength of which is irregularly changed, in response to an irregular pattern.

According to various embodiments, if a third pressure input 1450 (e.g., a drag pressure input moved by a specified distance) occurs after time t2 on screen 1405, the processor 120 may output $31^{st}$ feedback 1415*a* or 32nd feedback 1415*b* corresponding to an input which occurs while the third text region 1435 is selected. In an embodiment, the third pressure input 1450 may include a pressure input (e.g., a pressure input between times t1 and t2) in the form of having a third point of inflection, for example the 31st pressure input 1415*a*. A pressure input (e.g., a pressure input from 0 to time t2) in the form of having first and second points of inflection in the 31st pressure input 1415*a* may indicate the first pressure input 1410 and the second pressure input 1430.

The third pressure input 1450 may include a pressure input in the form of having three points of inflection, for example, the 31st pressure input 1415*a*. For example, the 31st pressure input 1415*a* may include a pressure input corresponding to an operation where a stop operation occurs 3 times while an input object is dragged in a lower direction from an upper end of the display 160. Alternatively, the third pressure input 1450 may include a drag pressure input which includes one point of inflection and moves by uniform pressure, for example, the 32nd pressure input 1415*b*.

For example, in the 31st feedback 1415*a*, while a selection region is enlarged through drag, a level of vibration gradually increases. The level of the vibration may vary in the form of stairs.

According to various embodiments, the 31st feedback 1415*a* may include a pressure input state (e.g., drag which continue being performed with a pressure level of T1 and T2) in which pressure is maintained in a state where it decreases to a constant size, after an increase in pressure inflects after a constant time (e.g., after a pressure input of T1 or more initially occurs at time t1) while the third pressure input 1450 relatively rapidly increases. The 32nd feedback 1415*b* may be output in response to the third pressure input 1450. The 32nd feedback 1415*b* may include feedback in which a level of vibration gradually increases during times t1 to t3 as a selection region is enlarged, in response to the third pressure input 1450. In this operation, the display 160 may display (e.g., inversely display) the third text region 1435 to be distinguished from a region around the third text region 1435.

According to various embodiments, the third pressure input 1450 may be an input which occurs subsequent to occurrence of the first pressure input 1410 and the second pressure input 1430. In this case, as illustrated, feedback corresponding to the third pressure input 1450 may be output while the feedback is changed in strength from time 1 when the feedback is initially output to time t3. If pressure is continuously maintained after the third pressure input 1450, feedback which occurs during a previous time may be output after time t3. If the occurrence of pressure is stopped after third pressure input 1450, the output of the feedback may be stopped after time t3.

As described above, the electronic device 100 may change a selected text region in response to a pressure input and a drag operation based on pressure of a specified level or more and may output different feedback in response to a size of the changed text region.

According to various embodiments, the display 160 of the electronic device 100 may output a screen including text including a plurality of paragraphs. If a first pressure input for selecting a first paragraph occurs, the processor 120 may output first feedback according to the selection of the first paragraph. Further, a second paragraph is additionally selected through movement of the first pressure input or a second pressure input, the processor 120 may provide second feedback different from the first feedback. The second feedback may be feedback of allowing a user to feel stronger or heavier than the first feedback.

According to various embodiments, when a range is specified according to a pressure input, the processor 120 may change a selected range in response to a drag event while a touch and pressure are maintained after a pressure input initially occurs. For example, the processor 120 may select a constant region of a screen depending on a movement distance of a drag event which occurs While touch pressure is maintained. The processor 120 may output a specified haptic feedback (e.g., feedback of gradually increasing a heavy feeling) depending on a size of a selected range.

FIG. 15 is a drawing illustrating another example of a feedback output according to an amount of variation of an object selected in response to an input change according to an embodiment of the present disclosure.

Referring to FIG. 15, in response to a request to execute a specified application, a processor 120 of an electronic device 100 may output a screen, such as screen 1501, including an object (e.g., text), on a display 160. The processor 120 may change a selected text region in response to a pressure input collected based on a pressure sensor located at one side of the display 160 and may output specified feedback in response to a size of the changed text region.

According to an embodiment, if a first text region 1531 is selected on screen 1501 based on a first pressure input 1510 (e.g., an input of touching a constant region of the display 160 with pressure of a specified level T1-T2 and maintaining the touch during first time t1), the processor 120 may output 11th feedback (e.g., vibration 1511a) corresponding to a size of the first text region 1531. In this operation, the display 160 may display the first text region 1531 to be distinguished from a region around the first text region 1531. The first pressure input 1510 may include an input in a form where pressure passes through one point of inflection while the pressure gradually increases after a touch and where the pressure gradually decreases, for example, a 11th pressure input 1511a and a 12th pressure input 1511b. Alternatively, the first pressure input 1510 may include an input in a form where an increase form of pressure rapidly increases and where a pressure state of a specified level is maintained, for example, a 13th pressure input 1511c.

According to various embodiments, a second pressure input 1520 (e.g., a pressure input which is maintained during specified time t2 after the first pressure input 1510 or the same pressure input which repeatedly occurs with a specified time at a point where the first pressure input 1510 occurs) occurs on screen 1503, the processor 120 may select a second text region 1533 and may output at least one of 21st feedback (e.g., vibration 1513a), 22nd feedback (e.g., vibration 1513b), and 23rd feedback (e.g., vibration 1513c), corresponding to a size of the selected second text region 1533. The 21st feedback (e.g., the vibration 1513a) may be feedback of a level different from that of the 11th feedback (e.g., the vibration 1511a). For example, the 21st feedback (e.g., the vibration 1513a) may include feedback of allowing a user to feel heavier than the 11th feedback 1511a. A graph to time t1 in the shown drawing (see reference numeral 1513a) may correspond to the first pressure input 1510.

According to various embodiments, in the shown drawing (see reference numeral 1513a), if the second pressure input 1520 (e.g., a pressure input of a double tap type) in which pressure of a constant level occurs a plurality of number of times at a constant interval occurs, the electronic device 100 may output the 21st feedback (e.g., the vibration 1513a). The 21st feedback (e.g., the vibration 1513a) may include feedback of outputting vibration feedback of a first level on an initial pressure input and outputting vibration feedback of a second level on a next pressure input, if a pressure input of the same level occurs at the same or similar point. The similar point may include, for example, regions within a specified rate (e.g., 5% or 10%) as compared with a specified reference point.

According to various embodiments, the second pressure input 1520 may include an input in the form of initially providing pressure of a constant level without detaching an object which provides pressure from a pressure sensor and continuously (or consecutively) providing a pressure input, for example, the 22nd pressure input 1513b. In response, the electronic device 100 may output the 22nd feedback (e.g., the vibration 1513b). The 22nd feedback (e.g., the vibration 1513b) may include feedback of outputting first vibration of a constant level in response to one parabola pressure and outputting second vibration higher than the first vibration in response to subsequent parabola pressure. Herein, an output duration of the first time may differ from an output duration of the second vibration.

According to various embodiments, the second pressure input 1520 may include an input in a form (from a time when a touch occurs to time t2) where pressure increased from a constant time is maintained during a constant time while gradually increased, for example, a 23rd pressure input 1513c. In response, the electronic device 100 may output the 23rd feedback (e.g., the vibration 1513c). The 23rd feedback (e.g., the vibration 1513c) may include feedback output such that vibration gradually increases in level from time t1 when pressure of a constant level or more occurs to time t3. In this operation, the display 160 may display the second text region 1533 to be distinguished from a region around the second text region 1533.

According to various embodiments, a third pressure input 1530 on screen 1505 may include a pressure input which is maintained during specified time t3 after the second pressure input 1520 or an input in which the first pressure input 1510 repeatedly occurs a specified number of times or more at the same time, for example, a 31st pressure input 1515a. Alternatively, the third pressure input 1530 may include an input in a form where a change of an increase in pressure occurs three times in a state where an input object is not released from a surface of the display 160, for example, a 32nd pressure input 1515b. Alternatively, the third pressure input 1530 may include an input in a form where pressure of a specified level is maintained after initial pressure increases, for example, the 33rd pressure input 1515c.

If the 31st pressure input 1515a occurs, the processor 120 may select the third text region 1535 and may output the 31st feedback (e.g., the vibration 1515a) (e.g., feedback output during a constant interval, in which vibration gradually increases in intensity), the 32nd feedback (e.g., the vibration 1515b) (e.g., feedback output during a constant interval, in which vibration gradually changed is higher in intensity than the 31st feedback (e.g., the vibration 1515a)), or the 33rd feedback (e.g., the vibration 1515c) (e.g., a form of initially outputting vibration feedback of a first level and consecutively outputting vibration feedback of a second level). According to various embodiments, the 31st feedback (e.g., the vibration 1515a) may include feedback of providing a relatively heavier feeling than the 21st feedback (e.g., the vibration 1513a), The display 160 may display the third text region 1535 to be distinguished from a region around the third text region 1535.

The 11th feedback (e.g., the vibration 1511a), the 21st feedback (e.g., the vibration 1513a), and the 31st feedback (e.g., the vibration 1515a) may include, for example, a form (e.g., a frequency, amplitude of which increases, which is relatively lower) where feedback gradually increases in level.

As described above, the electronic device 100 may change a selected text region in response to a pressure input based on pressure of a specified level or more, a duration of the pressure, or the repeated number of times of the pressure input and may output different feedback in response to a size of the selected text region.

According to various embodiments, the processor 120 may change a selected range in response to pressure of the same strength or different strength, which additionally occurs after initial pressure occurs. For example, as a pressure input increases in strength, the processor 120 may expand a range selected on a screen. If a screen selection range increases in response to an increase in strength of a pressure input, the processor 120 may output haptic feedback which gradually increases in heavy feeling in response to the increase of the screen selection range (e.g., haptic feedback corresponding to a change in frequency corresponding to an increase in heavy feeling).

FIG. 16 is a drawing illustrating another example of a feedback output according to an input change and a change in selected object type according to an embodiment of the present disclosure.

Referring to FIG. 16, a processor 120 of an electronic device 100 may change selection for a region of a screen depending on a specified pressure input operation and may output specified feedback depending on an amount of variation of data of objects selected by this operation.

For example, a display 160 may output a screen, such as screen 1601, including a first text region 1661, an image region 1662 (e.g., a still video image or a moving video image), and a second text region 1663. In case of the video image, a key frame of a corresponding video and a virtual playback control button may be output on the image region 1662, and a screen in a form where a video is played back through the image region 1662 may be output. The processor 120 may select the first text region 1661 in response to occurrence of a first pressure input 1610. The processor 120 may output 11th feedback 1611a in response to selection of the first text region 1661. The first pressure input 1610 may include, for example, a pressure input in a form where pressure gradually increases after the pressure is provided to a constant point of the display 160, for example, the 11th pressure input 1611a. Alternatively, the first pressure input 1610 may include an input in a form where pressure gradually decreases from a constant point while the pressure gradually increases in level, for example, a 12th pressure input 1611c. In response, the 11th feedback (e.g., the vibration 1611a) may include feedback of outputting vibration corresponding to amplitude of a first level until pressure decreases to a constant level or less from a time when pressure of a constant level or more occurs. The 12th feedback (e.g., the vibration 1611c) may include feedback in a form where vibration gradually increases in intensity from a start point where a pressure input occurs.

The processor 120 may receive a second pressure input 1630 on screen 1603. The second pressure input 1630 may include, for example, an input corresponding to a drag pressure operation of moving a distance from a constant point of the display 160 to another point. According to an embodiment, the second pressure input 1630 may include a pressure input in a form where a change in pressure vibrates and is maintained within a constant range from a constant level while the pressure gradually increases, for example, a 21st pressure input 1613a or a 22nd pressure input 1613b. Alternatively, the second pressure input 1630 may include a pressure input in a form where pressure decreases to a constant level relative to a constant time while the pressure gradually increases and where the decreased pressure is maintained.

The processor 120 may select the first text region 1661 and the image region 1662 in response to the second pressure input 1630 and may output any one of the 21st feedback (e.g., the vibration 1613a), the 22nd feedback (e.g., the vibration 1613b), and the 23rd feedback (e.g., the vibration 1613c), corresponding to the selected region. The 21st feedback (e.g., the vibration 1613a) may include feedback of providing gradually higher strength or heavier feeling (or vibration feedback, a frequency of which is relatively lower or amplitude of which is higher). For example, while first vibration of a first level is output from a time when pressure of a constant level or more occurs to time t1, if the pressure is maintained within a constant range, the 21st feedback (e.g., the vibration 1613a) may include feedback of outputting second vibration of a second level (e.g., amplitude which is different from the first level or is higher than the first level) at time t2. The 22nd feedback (e.g., the vibration 1613b) may include feedback, second vibration of which is higher than that of the 21st feedback (e.g., the vibration 1613a). The 23rd feedback (e.g., the vibration 1613c) may include feedback in a form where vibration continues increasing in level from a time when a pressure input occurs.

The processor 120 may receive a third pressure input 1650 on screen 1605. The third pressure input 1650 may include, for example, an input corresponding to a pressure input of performing drag by a distance d2 from a constant point of the display 160 to another point (e.g., a distance which is longer than a distance moved by the second pressure input 1630). The third pressure input 1650 may include, for example, an input in a form where pressure gradually increases in level and where pressure of a constant level is maintained until time t3, for example, a 31st pressure input 1615a and a 32nd pressure input 1615b. Alternatively, the third pressure input 1650 may include an input in a form where pressure decreases to a constant level while the pressure gradually increases in level and where the pressure of the reduced level is maintained until time t3, for example, a 33rd pressure input 1615c.

The processor 120 may select the first text region 1661, the image region 1662, or the second text region 1663 in response to the third pressure input 1650 and may output the 31st feedback (e.g., the vibration 1615a), the 32nd feedback (e.g., the vibration 1615b), or the 33rd feedback (e.g., the vibration 1615c), corresponding to the selected region. The 31st feedback (e.g., the vibration 1615a) may include feedback of gradually higher strength or feedback of providing heavier feeling. The 32nd feedback (e.g., the vibration 1615b) may include feedback in a form where strength of vibration or a heavy feeling increases and then decreases. According to an embodiment, the 33rd feedback (e.g., the vibration 1615c) may include feedback in which amplitude of vibration gradually increases in level.

FIG. 17 is a drawing illustrating another example of a feedback output according to an input change and a change in selected object type according to an embodiment of the present disclosure.

Referring to FIG. 17, a processor 120 of an electronic device 100 of FIG. 2 may change selection for a region of a screen depending on a specified pressure input operation and may output specified feedback depending on an amount of variation of data of objects selected by this operation.

For example, a display 160 may output a screen, such as screen 1701, including a first text region 1661, an image region 1662, and a second text region 1663. The processor 120 may select the first text region 1661 in response to occurrence of a first pressure input 1710. The processor 120 may output first feedback (e.g., vibration 1711) in response to the selection of the first text region 1661. The first pressure input 1710 may include, for example, a pressure input in a form where pressure gradually increases and decreases within first time t1 on a constant point of the display 160 and where a change in pressure forms one point of inflection, for example, the 11th pressure input 1711. The first feedback (e.g., the vibration 1711) may include feedback of outputting vibration of a constant level from a time when pressure of a constant level (e.g., T1) or more occurs after a pressure input occurs.

The processor 120 may receive a second pressure input 1730 on screen 1703. The second pressure input 1730 may include, for example, an input corresponding to an input operation of maintaining pressure on a constant point of the display 160 during a second time t2. Alternatively, the second pressure input 1730 may include an input in a form where a level of pressure inflects (e.g., inflect immediately after time t1) at a constant point while the level of the pressure gradually increases and where pressure of a constant level is maintained until a specified time (e.g., immediately after time 2). The processor 120 may select the first text region 1661 and the image region 1662 in response to the second pressure input 1730 and may output second feedback (e.g., vibration 1713) corresponding to the selected region. The second feedback (e.g., the vibration 1713) may include feedback of higher strength than the first feedback (e.g., the vibration 1711) or feedback of providing a heavier feeling than the first feedback (e.g., the vibration 1711). For example, the second feedback (e.g., the vibration 1713) may include feedback of outputting first vibration of a constant level at a first time (e.g., time t1) and outputting second vibration of higher amplitude than the first vibration at a second time (e.g., time t2).

The processor 120 may receive a third pressure input 1750 on screen 1705. The third pressure input 1750 may include, for example, an input corresponding to an input operation of maintaining pressure on a constant point of the display 160 during third time t3. Alternatively, the third pressure input 1750 may include an input in a form where a pressure input in which an increase and decrease in pressure has a wave form from a constant level while pressure gradually increases is maintained until third time t3. The processor 120 may select the first text region 1661, the image region 1662, or the second text region 1663 in response to the third pressure input 1750 and may output third feedback (e.g., vibration 1715) corresponding to the selected region. As illustrated, the third feedback (e.g., the vibration 1715) may include feedback of outputting first vibration, second vibration, or third vibration, amplitude of which gradually increase in level at a constant time interval. Alternatively, the third feedback (e.g., the vibration 1715) may include feedback in which feedback of sequentially higher strength or feedback of providing a heavier feeling is output a plurality of times. Alternatively, the third feedback (e.g., the vibration 1715) may include, for example, feedback in which the first vibration of a constant level, the second vibration of higher amplitude than the first vibration, and the third vibration which is higher than amplitude of the first vibration, but is lower than amplitude of the second vibration are output at a constant time interval.

FIG. 18 is a drawing illustrating object selection and a feedback change according to a change in a level of a pressure input according to an embodiment of the present disclosure.

Referring to FIG. 18, a display 160 of an electronic device 100 of FIG. 2 may output a screen including text in state 1801 in response to a request to execute a specified application. If a first pressure input 1810 corresponding to pressure of a first level occurs, a processor 120 of the electronic device 100 may select a first region 1811 on an object (e.g., text). The processor 120 may output first feedback corresponding to the selection of the first region 1811. According to an embodiment, the processor 120 may select at least one word in a constant region with respect to a point where the first pressure input 1810 occurs.

Alternatively, if a second pressure input 1830 corresponding to pressure of a second level (e.g., pressure which is relatively higher than the first level) occurs in state 1803, the processor 120 may select a second region 1813 on a screen where text is displayed. The processor 120 may output second feedback corresponding to the selection of the second region 1813. According to an embodiment, the processor 120 may select at least one sentence in a constant region with respect to a point where the second pressure input 1830 occurs.

Alternatively, if a third pressure input 1850 corresponding to pressure of a third level (e.g., pressure which is higher than the second level) occurs, the processor 120 may select a third region 1815 on text in state 1805. The processor 120 may output third feedback corresponding to the selection of the third region 1815. According to an embodiment, the processor 120 may select at least one paragraph in a constant region with respect to a point where the third pressure input 1850 occurs.

As described above, the processor 120 of the electronic device 100 may adjust a selection region of text depending on a pressure level of pressure provided by a user. For example, the electronic device 100 may change a selection region depending on a pressure input level of the user in an environment of a document editor or a note pad, an electronic book (e-book), a message application, or a text viewer.

FIG. 19 is a waveform chart illustrating an example of describing a text selection according to a pressure input which is repeatedly input according to an embodiment of the present disclosure.

Referring to FIG. 19, a processor 120 of an electronic device 100 of FIG. 2 may expand a selection region of text for a repeated pressure input. For example, if a pressure input of a specified pressure level or more (or a first pressure range which is greater than a first pressure level and is less than a second pressure input) occurs in interval 1901, the processor 120 may select at least one word included in text. In this operation, the processor 120 may verify a point where a pressure input occurs and may select at least one word located within a constant range with respect to the point.

In addition, while pressure of a touch level or more is maintained after the pressure input occurs in interval 1901, if a pressure input of a specified pressure level or more occurs in interval 1903, the processor 120 may select at least one sentence included in text. In this operation, the processor 120 may select at least one sentence located within a constant range with respect to a point where the pressure input occurs.

According to various embodiments of the present disclosure, while pressure of the touch level or more is maintained after the pressure input occurs in interval 1093, if a pressure input of a specified pressure level or more occurs in interval 1905, the processor 120 may select at least one paragraph included in text. In this operation, the processor 120 may select at least one paragraph within a constant range with respect to a point where the pressure input occurs. According to various embodiments, the processor 120 may increase the number of selected paragraphs as compared with a duration where a pressure input is maintained. According to various embodiments, the processor 120 may select a word if the first pressure level is maintained during interval 1901 after the touch level, may select a sentence if the second pressure input is maintained by interval 1093, and may select a paragraph if the second pressure level is maintained by interval 1905. According to various embodiments, the processor 120 may select a word, a sentence, or a paragraph depending on a during of pressure (or a width of an interval). For example, the processor 120 may select a word if a pressure input corresponding to interval 1901 occurs, may select a sentence if a pressure input corresponding to interval 1093 occurs, and may select a paragraph if a pressure input corresponding to interval 1905 occurs. A type of a word, a sentence, or a paragraph according to a width of the interval may be changed.

According to various embodiments, if a received pressure input has a constant pressure level or more, the processor 120 may classify selection of a word, a sentence, or a paragraph depending on the number of times the pressure input is received or a time when pressure is maintained. For example, if pressure inputs, each of which has a specified pressure level, are repeatedly input with a specified time, the processor 120 may select a word, a sentence, or a paragraph in response to the number of times the pressure inputs are input. The processor 120 may select a word, a sentence, or a paragraph as a duration of pressure of a specified pressure level or more elapses.

According to various embodiments, if the electronic device 100 includes a pressure sensor configured to recognize only a one-stage pressure input, the processor 120 of the electronic device 100 may select a word of a portion to which a pressure input is provided with respect to pressure of one time (one stage), may select a sentence including the portion to which the pressure is provided with respect to pressure of two times (two stage), and may select a paragraph including the portion to which the pressure is provided with respect to pressure of three times (three stage). For example, the processor 120 may perform an operation of selecting a sentence which exists on a location to which pressure is currently provided through a pressure input of three times.

FIG. 20 is a waveform chart illustrating another example of describing a text selection according to a pressure level according to an embodiment of the present disclosure.

Referring to FIG. 20, a processor 120 of an electronic device 100 of FIG. 2 may change properties of object selection depending on a pressure level of a different level. If a first pressure input of a specified 1st pressure level or more and less than a 2nd pressure level (e.g., the first pressure input within a first pressure range) occurs in interval 2001, the processor 120 may select a word included in text in response to the first pressure input. According to an embodiment, the electronic device 100 may output a text screen including at least one word, sentence, and paragraph on a display 160 of FIG. 2. If the first pressure input occurs, the processor 120 may select at least one word with respect to a point where the first pressure input occurs. If a second pressure input (e.g., the second pressure input within a second pressure range) which is higher than a 2nd pressure level and is lower than a 3rd pressure level occurs in interval 2003, the processor 120 may select one sentence with respect to a point where the second pressure input occurs. If the second pressure input which is higher than the 2nd pressure level or is lower than the 3rd pressure level is generated again in interval 2005 after the second pressure input occurs, the processor 120 may select an additional sentence with respect to a point of the newly generated second pressure input. Thus, the processor 120 may select two sentences depending on a plurality of 2nd pressure levels. When selecting the word or the sentence, the processor 120 may select a word (e.g., the 1st pressure level) or a sentence (e.g., the 2nd pressure level), depending on a height of a pressure level generated irrespective of an interval length of generated pressure (e.g., a time when pressure is maintained).

If the first pressure input which is higher than the 1st pressure level and which is lower than the second pressure level occurs in interval 2007 after interval 2005, the processor 120 may select an additional word in response to the newly input first pressure input. In this operation, the processor 120 may select two previous sentences and may select a subsequent word. If a new third pressure input occurs in interval 2009, the processor 120 may select a sentence in response to the newly input third input. Thus, the processor 120 may select two sentences and may select a sentence.

As described above, the processor 120 may expand a selection region depending on strength of pressure. For example, if a one-stage pressure input is repeatedly input, the processor 120 may select the number of words corresponding to the on-stage pressure input. Alternatively, if a two-stage pressure input is repeatedly generated, the processor 120 may select sentences corresponding to the repeated two-stage pressure input. Alternatively, the processor 120 may expand and select a word, a sentence, a paragraph, or the like by repeatedly using at least one of a one stage, a two stage, or a three stage.

FIG. 21 is a flowchart illustrating a method for operating an electronic device associated with selecting a text region according to an embodiment of the present disclosure.

Referring to FIG. 21, in connection with the method for operating the electronic device according to an embodiment of the present disclosure, if a pressure input occurs, in operation 2101, the processor 120 may detect a location where the pressure input occurs. In operation 2103, the processor 120 may detect pressure. Alternatively, the processor 120 may simultaneously detect the location and the pressure level or may detect the location if the detect pressure is greater than or equal to a specified level after the pressure is detected.

In operation 2105, the processor 120 may determine whether the pressure level is greater than or equal to a first pressure level. If the pressure level is greater than or equal to the first pressure level, in operation 2107, the processor 120 may determine whether the pressure level is greater than or equal to a second pressure level. If the pressure level is less than the second pressure level, in operation 2109, the processor 120 may select a word. If the pressure level is greater than or equal to the second pressure level, in operation 2111, the processor 120 may verify whether the pressure level is greater than or equal to a third pressure level. If the pressure level is less than the third pressure level, in operation 2113, the processor 120 may select a sentence. If the pressure level is greater than or equal to the third pressure level, in operation 2115, the processor 120 may select a paragraph.

If the pressure level is less than the first pressure level in operation 2105, in operation 2117, the processor 120 may determine whether a touch is maintained during a constant time. If the touch is maintained during the constant time, in operation 2119, the processor 120 may move a cursor using a magnifying glass function. If the touch is not maintained during the constant time, in operation 2121, the processor 120 may move the cursor. According to various embodiments, in operation 2119, the processor 120 may execute a function (e.g., output a menu for selecting a word, a sentence, and a paragraph) depending on a long-touch input.

In the above-mentioned operation, the processor 120 may select a word, a sentence, a paragraph, or the like with respect to a point where a pressure input occurs. If a word, a sentence, a paragraph, or the like is selected depending on a pressure input, the processor 120 may invert the selected region and may display the inverted region to be different from a region around the selected region.

According to various embodiments, if an input corresponding to a specified gesture operation (e.g., a swipe operation) occurs after a text selection operation, the electronic device 100 may output an option menu on a display 160 of FIG. 2. The option menu may include, for example, an edit command such as "copy" or "cut" and may provide an application list including an instant message (IM) application associated with using selected text, a translation application, and the like. In this case, a selected application may be executed on the entire screen and may be temporarily executed on a small screen of a pop-up form.

An electronic device according to various embodiments may include a processor configured to execute instructions stored in a memory of the electronic device. The processor may be configured to output a UI including an object on a display of the electronic device, verify a selection region of the object, selected by a pressure input if the pressure input associated with the object occurs, and output specified feedback depending on a size of the selection region. For example, the processor may be configured to output vibration feedback of a first frequency or first amplitude if the size of the selection region is less than a first size and output vibration feedback of a second frequency (e.g., a frequency lower than the first frequency) or second amplitude (e.g., amplitude higher than the first amplitude) if the size of the selection region is greater than or equal to the first size.

Alternatively, the processor may change a selection range of an object depending on a pressure level of a pressure input (e.g., as a pressure level is higher, the processor may select a wider region) and may output a specified feedback in response to the selection range. Alternatively, the processor may change a selection range of the object depending on the number of pressure inputs (e.g., as there are more pressure inputs, the process may select a wider region) and may output specified feedback in response to the selection range. Alternatively, the processor may change feedback output according to an amount of variation of data of an object included in a selected region (e.g., as there are more amounts of variation of data, the process may output feedback stronger feedback).

According to various embodiments, a method for providing feedback by an electronic device including a touch screen display, a pressure sensor, and an actuator is provided. The method may include displaying a user interface (UI) including at least one object on the touch screen display, receiving a pressure input via the pressure sensor of a specified level or more associated with selecting the object and outputting different types of vibration feedback via the actuator depending on a difference of information associated with an object selected by the pressure input.

According to an embodiment, the method may further include, if the information associated with the object includes a first data quantity, outputting vibration feedback of a first frequency or a first amplitude, and if the information associated with the object includes a second data quantity higher than the first data quantity, outputting vibration feedback of a second frequency relatively lower than the first frequency or second amplitude higher than the first amplitude.

According to various embodiments, the outputting of the different types of vibration feedback may include, if an expiration data indicated by the information associated with the object is within a specified period of time, outputting vibration feedback of a first frequency or a first amplitude, and if the expiration data indicated by the information associated with the object is greater than a specified expiration date, outputting vibration feedback of a second frequency relatively lower than the first frequency or second amplitude higher than the first amplitude.

According to various embodiments, the outputting of the different types of vibration feedback may include, if the information associated with the object includes less than a specified number of sub-objects, outputting vibration feedback of a first frequency or first amplitude, and if the information associated with the object includes the specified number of sub-objects or more, outputting vibration feedback of a second frequency relatively lower than the first frequency or second amplitude higher than the first amplitude.

According to various embodiments, the outputting of the different types of vibration feedback may include, if the information associated with the object includes a specified number of search results or more, outputting vibration feedback of a first frequency or first amplitude, and if the information associated with the object includes less than the specified number of search results, outputting vibration feedback of a second frequency relatively lower than the first frequency or second amplitude higher than the first amplitude.

According to various embodiments, the outputting of the different types of vibration feedback may include, if a size of an object selection region on the touch screen display by the pressure input is less than a first size, outputting vibration feedback of a first frequency or first amplitude, and if the size of the object selection region on the touch screen display by the pressure input is greater than or equal to the first size, outputting vibration feedback of a second frequency relatively lower than the first frequency or second amplitude higher than the first amplitude.

According to various embodiments, the outputting of the different types of vibration feedback may include, if a time taken, indicated by the information associated with the object, is less than a first time, outputting vibration feedback of a first frequency or a first amplitude, and if the time taken, indicated by the information associated with the object, is greater than or equal to the first time, outputting vibration feedback of a second frequency relatively lower than the first frequency or second amplitude higher than the first amplitude.

FIG. 22 is a drawing illustrating an example of a feedback output according to a search result according to an embodiment of the present disclosure.

Referring to FIG. 22, an electronic device 100 of FIG. 2 may output a map screen, such as screen 2201, on a display 160 of FIG. 2 in response to execution of a specified application. If a specified pressure input occurs, a processor 120 of FIG. 2 may execute a function mapped to the pressure input. For example, the processor 120 may search for a specific store (e.g., a coffee shop) around a specific location depending on the occurrence of the pressure input. A type of a function executed according to a pressure input may vary according to a user setting. Alternatively, the electronic device 100 may provide a search window. After a keyword is entered in the search window, if a pressure input occurs, the electronic device 100 may execute a search function associated with the keyword. In this operation, the processor 120 may search for and display information associated with the keyword within a constant distance from a point where the pressure input occurs. Screen 2201 indicates the result of searching for a coffee shop around the point where the pressure input occurs. If one coffee shop is found on screen 2201, the processor 120 may output first feedback 2211 in response to the found result.

According to various embodiments, a plurality of coffee shops within a constant distance from a point where a pressure input occurs may be found on screen 2203. In this case, the processor 120 may output second feedback 2213 corresponding to the plurality of coffee shops. The second feedback 2213 may include feedback of providing a relatively heavier or stronger feeling than the first feedback 2211.

According to various embodiments, a larger number of coffee shops than those on screen 2203, within a constant distance from a point where a pressure input occurs may be found on screen 2205. In this case, the processor 120 may output third feedback 2215 corresponding to a relatively larger number of coffee shops. The third feedback 2215 may include feedback of providing a relatively heavier or stronger feeling than the second feedback 2213.

According to various embodiments, the processor 120 may change a size of a found search region depending on a change in a pressure level of a pressure input. For example, as a pressure input of a first level occurs on screen 2201 screen, the processor 120 may search for a feature associated with a keyword with respect to a region of a first size and may output the found result. If a pressure input of a second level occurs, the processor 120 may search for a feature associated with a keyword with respect to a relatively wide area and may output the found result on screen 2203.

As described above, the electronic device 100 may apply feedback in a different way based on the number of objects found from a current page. For example, if a pharmacy is found from a map, different feedback may be provided based on the number of pharmacies found within a specified distance.

According to various embodiments, the processor 120 may be configured to output different haptic feedback depending on accuracy of a search result. For example, if the accuracy of the search result is less than or equal to a specified degree, the processor 120 may output haptic feedback of a relatively light feeling. If the accuracy of the search result is greater than the specified degree, the processor 120 may output haptic feedback of a relatively heavy feeling.

An electronic device according to various embodiments may include a processor configured to execute instructions stored in a memory of the electronic device. The processor may be configured to output a UI including an object on a display of the electronic device, perform a search associated with an object selected by a pressure input if the pressure input associated with the object occurs, output vibration feedback of a first frequency or first amplitude if the search result meets a first condition (e.g., if the number of search results is less than a first number), and output vibration feedback of a second frequency (e.g., a frequency lower than the first frequency) or second amplitude (e.g., amplitude higher than the first amplitude) if the search result meets a second condition (e.g., if the number of the search results is greater than or equal to the first number). The processor may be configured to adjust a search range in a different way depending on a pressure level (e.g., as a pressure level is higher, the processor more widely or variously processes the search range).

FIG. 23 is a drawing illustrating an example of a feedback output according to the number of selected objects according to a search result according to an embodiment of the present disclosure.

Referring to FIG. 23, in response to execution of a specified application, a display 160 of an electronic device 100 may output a screen, such as screen 2301, including a plurality of objects (e.g., image objects or objects including a video file). A processor 120 of FIG. 2 may select a first number of objects (e.g., 4 objects) in response to a first pressure input 2310. The first pressure input 2310 may include, for example, a drag input for maintaining pressure of a constant level or more of selecting the first number of the objects. In response to this operation, the processor 120 may output first feedback 2311.

The processor 120 may select a second number of objects (e.g., 6 objects) in response to a second pressure input 2330 on screen 2303. The second pressure input 2330 may include a drag input for selecting the second number of the objects while maintaining pressure of substantially the same level as the first pressure input 2310. In response to this operation, the processor 120 may output second feedback 2313. The second feedback 2313 may include, for example, feedback of substantially the same or similar level to the first feedback 2311. The feedback of the similar level may include, for example, feedback within a specified level range from a level of the first feedback 2311 (e.g., feedback having a level of a 5% difference as compared with the level of the first feedback 2311).

According to various embodiments, if data amounts of additionally selected objects are the same as each other, the processor 120 may output the same feedback in response to the selected objects.

The processor 120 may select a third number of objects (e.g., 8 objects) in response to a third pressure input 2350 on screen 2305. The third pressure input 2350 may include a drag input for selecting the third number of the objects while maintaining pressure of substantially the same level as the first pressure input 2310 or the second pressure input 2330. The processor 120 may output third feedback 2315 in response to types of selected objects. For example, if an object (e.g., a video file) which differs in type from objects previously selected among the third number of objects or which rapidly increases in data quantity is selected, the processor 120 may output the third feedback 2315 different from previous feedback. The third feedback 2315 may include, for example, feedback having relatively higher or stronger vibration than the first feedback 2311 or the second feedback 2313. According to various embodiments, the processor 120 may process strength of feedback in a different way (e.g., to be higher) depending on a data size of a selected object (e.g., a size of a selected video).

According to various embodiments, if an object selected by an input signal, such as drag, is relatively large in quantity, the processor 120 may output a display effect as if a relatively heavy thing is dragged (e.g., a UI in which a heavy thing is dragged). If an object selected by drag is relatively small in quality, the processor 120 may output a display effect as if a relatively light object is dragged (e.g., a UI in which a light thing is dragged). As an object selected by an input signal increases or decreases in quantity, the processor 120 may change the display effect displayed while an input signal is generated.

FIG. 24 is a drawing illustrating an example of a feedback output according to an additional function associated with a selected object according to an embodiment of the present disclosure.

Referring to FIG. 24, in response to execution of a specified application, a display 160 of an electronic device 100 of FIG. 2 may output a screen, such as screen 2401, including at least one object. If a delete button is selected among function items displayed on the display 160, a processor 120 of FIG. 2 may output different feedback depending on a type or amount of each of objects selected for deletion or a size of each of the objects. For example, if a first pressure input 2410 for deletion occurs after one object is selected, the processor 120 may output first feedback 2411 of a first level or first strength in state 2401. After a plurality of objects are selected, if a first pressure input 2410 for deletion occurs, the processor 120 may output second feedback 2413 of a second level or second strength in state 2403. According to various embodiments, if a data size of a selected object is less than a first size, the processor 120 may output the first feedback 2411. If the data size of the selected object is greater than or equal to the first size, the processor 120 may output the second feedback 2413. After outputting the above-mentioned feedback, the processor 120 may output a pop-up window for verifying deletion.

According to various embodiments, if a plurality of photos or videos are selected on a gallery, the processor 120 may provide different feedback based on an accumulated size of the selected photos or videos. Alternatively, the processor 120 may change feedback provided based on properties of objects, for example, a frequency of use of content selected by a pressure input, the number of objects included in the content, an image capture date of the content, or the like. The above various examples are described about if the object is selected. However, the processor 120 may provide feedback upon movement after a pressure input such as drag.

FIG. 25 is a drawing illustrating an example of a visual based feedback output according to an embodiment of the present disclosure.

Referring to FIG. 25, after an object is selected, if the object moves by drag or the like, a processor 120 of an electronic device 100 of FIG. 2 may output a dragged effect in a different way depending on properties of the object. For example, in response to execution of a specified application, the processor 120 may output a screen, such as screen 2501, including at least one first object 2510 located on a first point 2511 on a display 160 of FIG, 2. The first object 2510 may include, for example, an object of a first size or an object having a first data quantity. After a pressure input for selecting the first object 2510 with an input means (e.g., a finger 2500) of a user occurs, as illustrated, the first object 2510 may be moved and displayed to a second point 2513 depending on a drag operation for location movement. In this operation, the processor 120 may move and display the first object 2510 at a similar speed to a movement speed of the finger 2500 of the user. The similar speed may include a speed value within a constant error range (e.g., within 5% to 10%) from speed information of a finger of the user, obtained through experimental or statistical information about users who use their electronic devices, According to various embodiments, the processor 120 may output a screen, such as screen 2503, including at least one second object 2530 located on a third point 2531 on the display 160. The third object 2530 may include, for example, an object of a second size (e.g., a size larger than the first size by a constant size) or an object having a second data quantity (e.g., a data quantity higher than the first data quantity by a specified level). After a pressure input for selecting the second object 2530 with the input means (e.g., the finger 2500) of the user occurs, as illustrated, the second object 2530 may be moved and displayed to a fourth point 2533 depending on a drag operation for location movement. In this operation, the processor 120 may move and display the second object 2530 to be different from a movement speed of the finger 2500 of the user (e.g., to be slower than the movement speed). Alternatively, the processor 120 may move and display the second object 2530 to be different from a movement distance of the finger 2500 of the user. For example, if an object is large in size, the processor 120 may display the object such that there are many afterimages and to be slowly dragged. In this operation, the processor 120 may provide feedback for allowing the user to feel heavy together.

As described above, in a method for displaying a UI upon a drag operation after a pressure input, the electronic device 100 may differentially display the UI based on displaying a weight according to a real size of an object or the like. For example, when a drag input is received after a pressure input on a word, the electronic device 100 may paste the word into a dragged point to move and display the word. If an input for dragging a sentence (e,g., an object which is larger in data quantity than a word) is received, the electronic device 100 may display the sentence to move slightly away from a dragged point.

FIG. 26A is a drawing illustrating an example of a device search or connection according to a pressure level according to an embodiment of the present disclosure.

FIG. 26B is a drawing illustrating another example of a device search or connection according to a pressure level according to an embodiment of the present disclosure.

Referring to FIGS. 26A and 26B, various devices 2601, 2602, 2603, 2604, 2605, 2606, 2607, 2608, 2609, and 2610 may be located around an electronic device 100 according to an embodiment. The electronic device 100 may connect devices based on a pressure input and may process feedback. According to an embodiment, the electronic device 100 may adjust a selection range of a device based on intensity of a pressure input. The electronic device 100 may provide various types of feedback of allowing a user to feel heavy, described by the above embodiments, based on various properties such as the number of found devices and an owner of each of the found devices. For example, the electronic device 100 may output feedback of allowing the user to feel relatively heavier if there is a device (or an external electronic device) or if there are many devices, the device or the devices being suitable for the number of found devices, an owner of each of the found devices, a fit of a connection between the found devices. A range of connection devices according to a pressure input may vary in distance according to strength of pressure. In this case, if there are many devices or if there are many connectable devices, the electronic device 100 may output feedback of relatively stronger strength.

For example, as shown in FIG. 26A, if a one-stage pressure input is detected, the electronic device 100 may search for or connect the peripheral devices 2603, 2606, 2608, and 2609 of a first range 2600a (e.g., 5 meters). For example, as shown in FIG. 26B, if a two-stage pressure input is detected, the electronic device 100 may search for or connect the peripheral devices 2601 to 2609 of a second range 2600b (e.g., 10 meters).

According to various embodiments, when the one-stage pressure input occurs, the electronic device 100 may search for a peripheral device of a room (or a living room) where the electronic device 100 is located. When the two-stage pressure input occurs, the electronic device 100 may search for a peripheral device located in the entire house including the room where the electronic device 100 is located. According to various embodiments, the electronic device 100 may separately search for devices which may be directly and indirectly connected. For example, when the one-stage pressure input occurs, the electronic device 100 may determine a directly connectable range (e.g., home) around a wirelessly communicable area. When the two-stage pressure input occurs, the electronic device 100 may determine a range communicable via a server (e.g., a connectable communication network category). In this case, a service may be included in an object to be searched for.

If a relation-oriented connection range is expanded, a range according to a user who owns a device may be considered. For example, if the one-stage pressure input is received, the electronic device 100 may search for or connect devices owned by the user (e.g., a device or the like which is currently connected with a main device based on an account or around the main device). For example, if the two-stage pressure input is received, the electronic device 100 may search for or connect relatively many devices, which are owned by persons who has a high intimacy level except for the user and have the same type, the intimacy level being determined by the number of times of a call connection and the like based on a phonebook and the like. According to various embodiments, the electronic device 100 may output a UI for a connectable range of the connection devices shown in FIGS. 26A and 26B on its display. For example, as shown in FIG. 26A, the electronic device 100 may output a first virtual image corresponding to a first range on the display in response to occurrence of the one-stage pressure input. In this operation, the electronic device 100 may display found peripheral devices at specified locations (or random locations) on the first virtual image. According to various embodiments, as shown in FIG. 26B, the electronic device 100 may display a second virtual image corresponding to a second range (e.g., a range which is wider than the first range) on the display in response to occurrence of the two-stage pressure input. In this operation, the electronic device 100 may display found peripheral devices at specified locations (or random locations) on the second virtual image.

An electronic device according to various embodiments may include a processor configured to execute instructions stored in a memory of the electronic device. The processor may be configured to output a UI including an object associated with connecting peripheral devices on a display of the electronic device and set a peripheral scan range in a different way depending on a pressure level of a pressure input if the pressure input associated with the object occurs. For example, the processor may be configured to scan a first range if the pressure level is less than a first level and scan a second range (e.g., a range which is wider than the first range) if the pressure level is greater than or equal to the first level.

According to various embodiments, the electronic device 100 may process feedback in a connected device or virtual reality (VR) environment in a different way. For example, if there is a connected device in a feedback providing operation, the electronic device 100 may provide feedback based on a type of the connected device or the like. For example, if a user selects an object displayed on the electronic device 100 by a pressure input while viewing content provided from the electronic device 100 through a VR device (or a head mounted device), feedback corresponding to the pressure input may be output on at least one of the electronic device 100 and the VR device. As another example, if a wearable device is connected to the electronic device 100, the electronic device 100 may provide feedback of allowing the user to feel heavy based on properties of the device. For example, in case of a Bluetooth (BT) headset, the electronic device 100 may provide a sound of adding a heavy feeling together. In case of a bracelet type accessory, the electronic device 100 may provide an electrical stimulus of allowing the user to feel heavy.

As described above, in connection with setting a heavy feeling, texture, or tactility of haptic feedback, the electronic device 100 may output the haptic feedback depending on control of a specified frequency. For example, a skin of a person may respond to a stimulus through skin tissue, and a sense of touch the user feels may be configured by adjusting a provided stimulus. For example, the user may recognize a stimulus through a Merkel's disk, a Meissner corpuscle, a Pacinian corpuscle, a Ruffini's ending, and a nerve ending. For example, Merkel's disks of a human body may be distributed near a skin, may be small in size, and may be high in density. Particularly, many Merkel's disks of the human body may be distributed in fingertips. The Merkel's disks of the human body may respond to skin stimulation of 0.4 to 3 Hz and may be sensitive to 0.4 to 1 Hz. The Merkel's disks of the human body may mainly respond to a subtle pressure distribution of a surface, and the user may perceive a pattern or a shape. For example, Meissner corpuscles may be distributed near a skin, may be small in size, and may be high in density. The Meissner corpuscles may respond to a stimulus of 3 to 100 Hz and may be sensitive to 25 to 40 Hz. The Meissner corpuscles may respond when passing through a protruded portion on a surface or an edge of a subtle shape and may be subsidiarily associated with perceiving a pattern of the surface. For example, Pacinian corpuscles may have a shape such as an onion, may be large in size, and may be distributed at low density in a lower end portion of dermis. The Pacinian corpuscles may respond to a stimulus of a range of 35 to 500 Hz, may be sensitive to 250 to 300 Hz, and may be associated with perceiving vibration. Particularly, since a threshold is the lowest threshold among mechanical receptors, a person may be most sensitive to vibration of 250 Hz. For example, Ruffini's endings may be distributed at low density in a lower end portion of dermis and may respond to a stimulus of 0.5 to 400 Hz. The Ruffini's endings may generate an electric signal if skin stretch of rubbing a surface occurs and may be associated with a process of perceiving that a skin is drawn by a situation where continuous pressure is maintained, that is, a surface with large friction, particles with small friction, or the like. For example, since a receptor does not exist as a corpuscle in nerve endings in case of pain and thermal feedback, a person may have a characteristic of responding to a change in temperature rather than responding to an absolute temperature value as a channel through cold and menthol receptor 1 (CMR1) if temperature is low, a channel through vanilloid receptor subtype 1 (VR1) if temperature is high, and a channel through vanilloid receptor 1-lik receptor (VRL1) with a fast response if temperature is very high. The electronic device 100 may output haptic feedback of allowing the user to feel various types of stimulus (e.g., a heavy feeling, texture, and tactility) by operating vibration corresponding to different frequency bands which may stimulate the Merkel's disks, the Meissner corpuscles, the Pacinian corpuscles, the Ruffini's endings, the nerve endings, and the like.

The electronic device according to an embodiment may include a tactile actuator for providing feedback on a pressure input of the user. For example, the electronic device may include an inertial actuator, a piezoelectric actuator, a dielectric electro-active polymer, an electrostatic actuator, and the like.

Since the inertial actuator is small in size and is relatively small in power consumption, it may be usually used for a mobile phone or the like and may include an eccentric motor and a linear resonant actuator in a vibration motor scheme. An operating voltage of the eccentric motor may be 130 mA to 160 mA, and an operation frequency of the eccentric motor may be 90 to 200 Hz. The linear resonant actuator may usually vibrate with a resonance frequency between 150 Hz and 200 Hz, and current consumption of the linear resonant actuator may be 65 mA to 70 Ma. The piezoelectric actuator may be an actuator which operates without a magnet or a coil. The piezoelectric actuator may have a fast response speed, and an operating frequency of the piezoelectric actuator may be wide as a frequency of 150 Hz to 300 Hz. The piezoelectric actuator may include a beam type or a disk type. The dielectric electro-active polymer actuator may be an actuator using dielectric electro-active polymer. As a chemical bonding structure varies, the dielectric electro-active polymer actuator may have a characteristic in which it momentarily varies in size or shape. A driving frequency of the dielectric electro-active polymer actuator may be wide as a frequency of 50 Hz to 200 Hz, but the dielectric electro-active polymer actuator may mainly use a resonance frequency near 90 Hz to 125 Hz. The electrostatic actuator may include an actuator, a surface of which directly vibrates. Since the electrostatic actuator has a structure in which the entire film vibrates, it may be difficult for the electrostatic actuator to provide local tactile feedback or the electrostatic actuator may implement a very real button click feeling. As a film size is larger, the electrostatic actuator may provide tactility of a stronger level.

An operation of providing haptic feedback according to an embodiment may be output based on at least one of the above elements. According to various embodiments, a Merkel cell of a shallow portion of a skin may be responsible for static pressure. Meissner corpuscles of the shallow portion of the skin may be responsible for a low-frequency region near 30 Hz. Pacini corpuscles of a deep portion of the skin may be responsible for a high-frequency region near 200 MHz. If a receptor is stimulated for each type, all senses of touch may be recreated by combining the stimuli. For example, if it is driven with a low frequency band, a heavier feeling than a high frequency band may be provided. For example, if feedback is provided to the user using the 140 Hz band, he or she may feel heavier (e.g., feel sucked it) than operating with the 200 Hz band. As another example, the user may feel heavier in changing 200 Hz to 100 Hz and operating with 100 Hz than changing 200 Hz to 150 Hz and operating with 150 Hz. As another example, it should be driven during a specified time or more, for example, 100 ms or more.

As another example, if a sound is provided together with vibration feedback, the user may feel heavier. If the user generates a pressure input, feedback provided using the above element may allow a finger to have tactility using voltage, an electrostatic force, or the like. For example, if an image with a large file size is selected, the user may feel heavy by adjusting a coefficient of friction or frictional resistance. As another example, when selecting an image or the like, the user may feel a stronger stimulus when selecting text. According to various embodiments, the electronic device 100 may provide a pulling and pushing effect using a flexible display. For example, at least a partial region of the flexible display may move up and down to provide pull/push feedback. A frictional force may be reduced in case of an ultrasound range of 20 KHz or more when haptic force is provided using ultrasonic surface friction (USF).

According to various embodiments, the operation and function described above may be provided in the form an application programming interface API for a $3^{rd}$ party application in an operating system (OS) of a terminal. For example, to provide an operation of processing a pressure input of a gallery described above to the $3^{rd}$ party application, an OS of an electronic device may define and provide an API.

According to various embodiments, an electronic device may include a housing configured to include a first surface facing a first direction and a second surface facing a second direction opposite to the first direction, a touch screen display configured to be located between the first surface and the second surface and be exposed through the first surface, a pressure sensor configured to be located between the first surface and the second surface and detect pressure by an external object on the display, a wireless communication circuit configured to be located at an inner side of the housing, an actuator configured to be located at the inner side of the housing and generate feedback, at least one processor configured to be electrically connected with the display, the pressure sensor, the wireless communication circuit, and the actuator, and a memory configured to be electrically connected with the at least one processor. The memory may store at least one instruction by the at least one processor, when a function is executed. The at least one instruction may be configured to display a UI on the display, detect pressure on the display based on the pressure sensor, and control the actuator to generate feedback corresponding to a frequency selected based on at least part of the detected pressure. If the detected pressure is within a first range, the selected frequency may be a first frequency. If the detected pressure is within a second range wider than the first range, the selected frequency may be lower than the first frequency.

According to various embodiments, the feedback may include at least one of at least one vibration, lamp emission, an audio, and a specified screen effect through the display.

According to various embodiments, the first frequency may be substantially the same or similar to the third frequency. For example, if the first frequency and the third frequency are similar to each other may be if a difference value between a level of the first frequency and a level of the third frequency is within a specified range or if the ratio of the first frequency to the third frequency is within a specified range (e.g., within 5% to 10%).

According to various embodiments, an electronic device may include a housing configured to include a housing configured to include a first surface facing a first direction and a second surface facing a second direction opposite to the first direction, a touch screen display configured to be located between the first surface and the second surface and to be exposed through the first surface, a pressure sensor configured to be located between the first surface and the second surface and detect pressure by an external object on the display, a wireless communication circuit configured to located at an inner side of the housing, an actuator configured to be located at the inner side of the housing and generate feedback, at least one processor configured to be electrically connected with the display, the pressure sensor, the wireless communication circuit, and the actuator, and a memory configured to be electrically connected with the at least one processor. The memory may store at least one instruction executed by the processor, when a function is executed. The at least one instruction may be configured to display a UI including at least one of a first object and a second object on the display, the first object and the second object having different characteristics, receive a user input for selecting any one of the first object or the second object, detect pressure on the display while the user input is received based on the pressure sensor, and control the actuator to generate feedback corresponding to a frequency selected based on at least part of the characteristic of the selected object. If the selected object is the first object, the selected frequency may be a first frequency. If the selected object is the second object, the selected frequency may include a second frequency lower than the first frequency.

According to various embodiments, the characteristic may include at least one of a size, a type, properties, and a color of the object, a size of a display region on the display, contents, the number of the objects, data quantity corresponding to the object, a date when the object is generated, and a validity period of the object.

FIG. 27 is a block diagram illustrating a configuration of an electronic device in a network environment according to an embodiment.

Referring to FIG. 27, in various embodiments, a network environment 2700 may include an electronic device 2701 and a first external electronic device 2702, a second external electronic device 2704, or a server 2706 connected with each other through a network 2762 or local-area communication 2764. The electronic device 2701 may include a bus 2710, a processor 2720, a memory 2730, an input and output interface 2750, a display 2760, and a communication interface 2770. In various embodiments, at least one of the components may be omitted from the electronic device 2701, or other components may be additionally included in the electronic device 2701.

The bus 2710 may be, for example, a circuit which connects the components 2720 to 2770 with each other and transmits a communication signal (e.g., a control message and/or data) between the components.

The processor 2720 may include one or more of a CPU, an AP, or a communication processor (CP). For example, the processor 2720 may perform calculation or data processing about control and/or communication of at least another of the components of the electronic device 2701.

The memory 2730 may include a volatile and/or non-volatile memory. The memory 2730 may store, for example, a command or data associated with at least another of the components of the electronic device 2701. According to an embodiment, the memory 2730 may store software and/or a program 2740. The program 2740 may include, for example, a kernel 2741, a middleware 2743, an API 2745, and/or at least one application program 2747 (or "at least one application"), and the like. At least part of the kernel 2741, the middleware 2743, or the API 2745 may be referred to as an OS.

The kernel 2741 may control or manage, for example, system resources (e.g., the bus 2710, the processor 2720, or the memory 2730, and the like) used to execute an operation or function implemented in the other programs (e.g., the middleware 2743, the API 2745, or the application program 2747). Also, as the middleware 2743, the API 2745, or the application program 2747 accesses a separate component of the electronic device 2701, the kernel 2741 may provide an interface which may control or manage system resources.

The middleware 2743 may play a role as, for example, a go-between such that the API 2745 or the application program 2747 communicates with the kernel 2741 to communicate data.

Also, the middleware 2743 may process one or more work requests, received from the application program 2747, in order of priority. For example, the middleware 2743 may assign priority which may use system resources (the bus 2710, the processor 2720, or the memory 2730, and the like) of the electronic device 2701 to at least one of the at least one application program 2747. For example, the middleware 2743 may perform scheduling or load balancing for the one or more work requests by processing the one or more work requests in order of the priority assigned to the at least one of the at least one application program 2747.

The API 2745 may be, for example, an interface in which the application program 2747 controls a function provided from the kernel 2741 or the middleware 2743. For example, the API 2745 may include at least one interface or function (e.g., a command) for file control, window control, image processing, or text control, and the like.

The input and output interface 2750 may play a role as, for example, an interface which may transmit a command or data input from a user or another external device to another component (or other components) of the electronic device 2701. Also, input and output interface 2750 may output an instruction or data received from another component (or other components) of the electronic device 2701 to the user or the other external device.

The display 2760 may include, for example, a LCD, a LED display, an organic LED (OLED) display, a microelectromechanical systems (MEMS) display, or an electronic paper display. The display 2760 may display, for example, a variety of content (e.g., text, images, videos, icons, or symbols, and the like) to the user. The display 2760 may include a touch screen, and may receive, for example, touch, gesture, proximity, or a hovering input using an electronic pen or part of a body of the user.

The communication interface 2770 may establish communication between, for example, the electronic device 2701 and an external device a first external electronic device 2702, a second external electronic device 2704, or a server 2706). For example, the communication interface 2770 may connect to a network 2762 through wireless communication or wired communication and may communicate with the external device (e.g., the second external electronic device 2704 or the server 2706).

The wireless communication may use, for example, at least one of long term evolution (LT), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 2764. The local-area communication 2764 may include, for example, at least one of Wi-Fi communication, BT communication, near field communication (NFC), or global navigation satellite system (GNSS) communication, and the like.

A magnetic secure transmission (MST) module may generate a pulse based on transmission data using an electromagnetic signal and may generate a magnetic field signal based on the pulse. The electronic device 2701 may output the magnetic field signal to a point of sales (POS) system. The POS system may restore the data by detecting the magnetic field signal using an MST reader and converting the detected magnetic field signal into an electric signal.

The GNSS may include, for example, at least one of a GPS, a Glonass, a Beidou navigation satellite system (hereinafter referred to as "Beidou"), or a Galileo (i.e., the European global satellite-based navigation system) according to an available area or a bandwidth, and the like. Hereinafter, the "GPS" used herein may be interchangeably with the "GNSS". The wired communication may include at least one of, for example, universal serial bus (USB) communication, high definition multimedia interface (HDMI)

communication, recommended standard 232 (RS-232) communication, or plain old telephone service (POTS) communication, and the like. The network 2762 may include a telecommunications network, for example, at least one of a computer network (e.g., a local area network (LAN) or a wide area network (WAN)), the Internet, or a telephone network.

Each of the first and second external electronic devices 2702 and 2704 may be the same as or different device from the electronic device 2701. According to an embodiment, the server 2706 may include a group of one or more servers. According to various embodiments, all or some of operations executed in the electronic device 2701 may be executed in another electronic device or a plurality of electronic devices (e.g., the first external electronic device 2702, the second external electronic device 2704, or the server 2706). According to an embodiment, if the electronic device 2701 should perform any function or service automatically or according to a request, it may request another device (e.g., the first external electronic device 2702, the second external electronic device 2704, or the server 106) to perform at least part of the function or service, rather than executing the function or service for itself or in addition to the function or service. The other electronic device (e.g., the first external electronic device 2702, the second external electronic device 2704, or the server 2706) may execute the requested function or the added function and may transmit the executed result to the electronic device 2701. The electronic device 2701 may process the received result without change or additionally and may provide the requested function or service. For this purpose, for example, cloud computing technologies, distributed computing technologies, or client-server computing technologies may be used.

FIG. 28 is a block diagram illustrating a configuration of an electronic device according to various embodiments.

Referring to FIG. 28, the electronic device 2801 may include, for example, all or part of an electronic device 2701 shown in FIG. 27. The electronic device 2801 may include one or more processors 2810 (e.g., APs), a communication module 2820, a subscriber identification module (SIM) 2829, a memory 2830, a security module 2836, a sensor module 2840, an input device 2850, a display 2860, an interface 2870, an audio module 2880, a camera module 2891, a power management module 2895, a battery 2896, an indicator 2897, and a motor 2898.

The processor 2810 may drive, for example, an OS or an application program to control a plurality of hardware or software components connected thereto and may process and compute a variety of data. The processor 2810 may be implemented with, for example, a system on chip (SoC). According to an embodiment, the processor 2810 may include a graphic processing unit (CPU) (not shown) and/or an image signal processor (ISP) (not shown). The processor 2810 may include at least some (e.g., a cellular module 2821) of the components shown in FIG. 28. The processor 2810 may load a command or data received from at least one of other components a non-volatile memory) into a volatile memory to process the data and may store various data in a non-volatile memory.

The communication module 2820 may have the same or similar configuration to a communication interface 2770 of FIG. 27. The communication module 2820 may include, for example, the cellular module 2821, a Wi-Fi module 2822, a BT module 2823, a GNSS module 2824 (e.g., a GPS module, a Glonass module, a Beidou module, or a Galileo module), an NFC module 2825, an MST module 2826, and a radio frequency (RF) module 2827.

The cellular module 2821 may provide, for example, a voice call service, a video call service, a text message service, or an Internet service, and the like through a communication network. According to an embodiment, the cellular module 2821 may identify and authenticate the electronic device 2801 in a communication network using the SIM 2829 (e.g., a SIM card). According to an embodiment, the cellular module 2821 may perform at least part of functions which may be provided by the processor 2810. According to an embodiment, the cellular module 2821 may include a CP.

The Wi-Fi module 2822, the BT module 2823, the GNSS module 2824, the NFC module 2825, or the MST module 2826 may include, for example, a processor for processing data transmitted and received through the corresponding module. According to various embodiments, at least some (e.g., two or more) of the cellular module 2821, the Wi-Fi module 2822, the BT module 2823, the GNSS module 2824, the NFC module 2825, or the MST module 2826 may be included in one IC or one IC package.

The RF module 2827 may transmit and receive, for example, a communication signal (e.g., an RF signal). Though not shown, the RF module 2827 may include, for example, a transceiver, a power amplifier module (PAM), a frequency filter, or a low noise amplifier (LNA), or an antenna, and the like. According to another embodiment, at least one of the cellular module 2821, the Wi-Fi module 2822, the BT module 2823, the GNSS module 2824, the NFC module 2825, or the MST module 2826 may transmit and receive an RF signal through a separate RF module.

The SIM 2829 may include, for example, a card which includes a SIM and/or an embedded SIM. The SIM 2829 may include unique identification information (e.g., an integrated circuit card identifier (ICCID)) or subscriber information (e.g., an international mobile subscriber identity (IMSI)).

The memory 2830 (e.g., a memory 2730 of FIG. 27) may include, for example, an embedded memory 2832 or an external memory 2834. The embedded memory 2832 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 2834 may include a flash drive, for example, a compact flash (CF), a secure digital (SD), a micro-SD, a mini-SD, an extreme digital (xD), a multimedia card (MMC), or a memory stick, and the like. The external memory 2834 may operatively and/or physically connect with the electronic device 2801 through various interfaces.

The secure module 2836 may be a module which has a relatively higher secure level than the memory 2830 and may be a circuit which stores secure data and guarantees a protected execution environment. The secure module 2836 may be implemented with a separate circuit and may include a separate processor. The secure module 2836 may include, for example, an embedded secure element (eSE) which is present in a removable smart chip or a removable SD card or is embedded in a fixed chip of the electronic device 2801. Also, the secure module 2836 may be driven by an OS different from the OS of the electronic device 2801. For example, the secure module 2836 may operate based on a java card open platform (JCOP) OS.

The sensor module 2840 may measure, for example, a physical quantity or may detect an operation state of the electronic device 2801, and may convert the measured or detected information to an electric signal. The sensor module 2840 may include at least one of, for example, a gesture sensor 2840A, a gyro sensor 2840B, a barometric pressure sensor 2840C, a magnetic sensor 2840D, an acceleration sensor 2840E, a grip sensor 2840F, a proximity sensor 2840G, a color sensor 2840H (e.g., red, green, blue (ROB) sensor), a biometric sensor 2840I, a temperature/humidity sensor 2840J, an illumination sensor 2840K, or an ultraviolet (UV) sensor 2840M. Additionally or alternatively, the sensor module 2840 may further include, for example, an e-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), and/or a fingerprint sensor (not shown), and the like. The sensor module 2840 may further include a control circuit for controlling at least one or more sensors included therein. According to various embodiments, the electronic device 2801 may further include a processor configured to control the sensor module 2840, as part of the processor 2810 or to be independent of the processor 2810. While the processor 2810 is in a sleep state, the electronic device 2801 may control the sensor module 2840.

The input device 2850 may include, for example, a touch panel 2852., a (digital) pen sensor 2854, a key 2856, or an ultrasonic input device 2858. The touch panel 2852 may use at least one of, for example, a capacitive type, a resistive type, an infrared type, or an ultrasonic type. Also, the touch panel 2852 may further include a control circuit. The touch panel 2852 may further include a tactile layer and may provide a tactile reaction to a user.

The (digital) pen sensor 2854 may be, for example, part of the touch panel 2852 or may include a separate sheet for recognition. The key 2856 may include, for example, a physical button, an optical key, or a keypad. The ultrasonic input device 2858 may allow the electronic device 2801 to detect a sound wave using a microphone (e.g., a microphone 2888) and to verify data through an input tool generating an ultrasonic signal.

The display 2860 (e.g., a display 2760 of FIG. 27) may include a panel 2862, a hologram device 2864, or a projector 2866. The panel 2862 may include the same or similar configuration to the display 160 or 2760. The panel 2862 may be implemented to be, for example, flexible, transparent, or wearable. The panel 2862 and the touch panel 2852 may be integrated into one module. The hologram device 2864 may show a stereoscopic image in a space using interference of light. The projector 2866 may project light onto a screen to display an image. The screen may be positioned, for example, inside or outside the electronic device 2801. According to an embodiment, the display 2860 may further include a control circuit for controlling the panel 2862, the hologram device 2864, or the projector 2866.

The interface 2870 may include, for example, an 2872, a USB 2874, an optical interface 2876, or a D-subminiature 2878. The interface 2870 may be included in, for example, a communication interface 170 or 2770 shown in FIG. 2 or 27. Additionally or alternatively, the interface 2870 may include, for example, a mobile high definition link (MHL) interface, an SD card/MMC interface, or an infrared data association (IrDA) standard interface.

The audio module 2880 may convert a sound and an electric signal in dual directions. At least part of components of the audio module 2880 may be included in, for example, an input and output interface 2750 (or a UI) shown in FIG. 27. The audio module 2880 may process sound information input or output through, for example, a speaker 2882, a receiver 2884, an earphone 2886, or the microphone 2888, and the like.

The camera module 2891 may be a device which captures a still image and a moving image. According to an embodiment, the camera module 2891 may include one or more image sensors (not shown) (e.g., a front sensor or a rear sensor), a lens (not shown), an ISP (not shown), or a flash (not shown) (e.g., an LED or a xenon lamp).

The power management module 2895 may manage, for example, power of the electronic device 2801. According to an embodiment, though not shown, the power management module 2895 may include a power management integrated circuit (PMIC), a charger IC or a battery or fuel gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 2896 and voltage, current, or temperature thereof while the battery 2896 is charged. The battery 2896 may include, for example, a rechargeable battery or a solar battery.

The indicator 2897 may display a specific state of the electronic device 2801 or part (e.g., the processor 2810) thereof, for example, a booting state, a message state, or a charging state, and the like. The motor 2898 may convert an electric signal into mechanical vibration and may generate vibration or a haptic effect, and the like. Though not shown, the electronic device 2801 may include a processing unit (e.g., a GPU) for supporting a mobile TV The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device according to various embodiments of the present disclosure may include at least one of the above-mentioned elements, some elements may be omitted from the electronic device, or other additional elements may be further included in the electronic device. Also, some of the elements of the electronic device according to various embodiments of the present disclosure may be combined with each other to form one entity, thereby making it possible to perform the functions of the corresponding elements in the same manner as before the combination.

FIG. 29 is a block diagram illustrating a configuration of a program module according to various embodiments.

According to an embodiment, the program module 2910 (e.g., a program 2740 of FIG. 27) may include an OS for controlling resources associated with an electronic device (e.g., an electronic device 2701 of FIG. 27) and/or various applications (e.g., an application program 2747 of FIG. 27) which are executed on the OS. The OS may be, for example, Android, iOS™, Windows™, Symbian™, Tizen™, or Bada™, and the like.

The program module 2910 may include a kernel 2920, a middleware 2930, an API 2960, and/or an application 2970. At least part of the program module 2910 may be preloaded on the electronic device, or may be downloaded from an external electronic device (e.g., a first external electronic device 2702, a second external electronic device 2704, or a server 2706, and the like of FIG. 27).

The kernel 2920 (e.g., a kernel 2741 of FIG. 27) may include, for example, a system resource manager 2921 and/or a device driver 2923. The system resource manager 2921 may control, assign, or collect, and the like system resources. According to an embodiment, the system resource manager 2921 may include a process management unit, a memory management unit, or a file system management unit, and the like. The device driver 2923 may include, for example, a display driver, a camera driver, a BT driver, a shared memory driver, a USB driver, a keypad driver, a Wi-Fi™ driver, an audio driver, or an inter-process communication (IPC) driver.

The middleware 2930 (e.g., a middleware 2743 of FIG. 27) may provide, for example, functions the application 2970 needs in common, and may provide various functions to the application 2970 through the API 2960 such that the application 2970 efficiently uses limited system resources in the electronic device. According to an embodiment, the middleware 2930 (e.g., the middleware 2743) may include at least one of a runtime library 2935, an application manager 2941, a window manager 2942, a multimedia manager 2943, a resource manager 2944, a power manager 2945, a database manager 2946, a package manager 2947, a connectivity manager 2948, a notification manager 2949, a location manager 2950, a graphic manager 2951, a security manager 2952, or a payment manager 2954.

The runtime library 2935 may include, for example, a library module used by a compiler to add a new function through a programming language while the application 2970 is executed. The runtime library 2935 may perform a function about input and output management, memory management, or an arithmetic function.

The application manager 2941 may manage, for example, a life cycle of at least one of the application 2970. The window manager 2942 may manage graphic user interface (GUI) resources used on a screen of the electronic device. The multimedia manager 2943 may determine a format utilized for reproducing various media files and may encode or decode a media file using a codec corresponding to the corresponding format. The resource manager 2944 may manage source codes of at least one of the application 2970, and may manage resources of a memory or a storage space, and the like.

The power manager 2945 may act together with, for example, a basic input/output system (BIOS) and the like, may manage a battery or a power source, and may provide power information utilized for an operation of the electronic device. The database manager 2946 may generate, search, or change a database to be used in at least one of the application 2970. The package manager 2947 may manage installation or update of an application distributed by a type of a package file.

The connectivity manager 2948 may manage, for example, wireless connection such as Wi-Fi connection or BT connection, and the like. The notification manager 2949 may display or notify events, such as an arrival message, an appointment, and proximity notification, by a method which is not disturbed to the user. The location manager 2950 may manage location information of the electronic device. The graphic manager 2951 may manage a graphic effect to be provided to the user or a UI related to the graphic effect. The security manager 2952 may provide all security functions utilized for system security or user authentication, and the like. According to an embodiment, when the electronic device (e.g., an electronic device 100 or 2701 of FIG. 1 or 27) has a phone function, the middleware 2930 may further include a telephony manager (not shown) for managing a voice or video communication function of the electronic device.

The middleware 2930 may include a middleware module which configures combinations of various functions of the above-described components. The middleware 2930 may provide a module which specializes according to kinds of OSs to provide a differentiated function. Also, the middleware 2930 may dynamically delete some of old components or may add new components.

The API 2960 (e.g., an API 2745 of FIG. 27) may be, for example, a set of API programming functions, and may be provided with different components according to OSs. For example, in case of Android or iOS™, one API set may be provided according to platforms. In case of Tizen™, two or more API sets may be provided according to platforms.

The application 2970 (e.g., an application program 2747 of FIG. 27) may include one or more of, for example, a home application 2971, a dialer application 2972, a short message service/multimedia message service (SMS/MMS) application 2973, an IM application 2974, a browser application 2975, a camera application 2976, an alarm application 2977, a contact application 2978, a voice dial application 2979, an e-mail application 2980, a calendar application 2981, a media player application 2982, an album application 2983, a clock application 2984, a payment application 2985, a health care application (e.g., an application for measuring quantity of exercise or blood sugar, and the like), or an environment information application (e.g., an application for providing atmospheric pressure information, humidity information, or temperature information, and the like), and the like.

According to an embodiment, the application 2970 may include an application (hereinafter, for better understanding and ease of description, referred to as "information exchange application") for exchanging information between the electronic device (e.g., the electronic device 2701 of FIG. 27) and an external electronic device (e.g., the first external electronic device 2702 or the second external electronic device 2704). The information exchange application may include, for example, a notification relay application for transmitting specific information to the external electronic device or a device management application for managing the external electronic device.

For example, the notification relay application may include a function of transmitting notification information, which is generated by other applications (e.g., the SMS/MMS application, the e-mail application, the health care application, or the environment information application, and the like) of the electronic device, to the external electronic device (e.g., the first external electronic device 2702 or the second external electronic device 2704). Also, the notification relay application may receive, for example, notification information from the external electronic device, and may provide the received notification information to the user of the electronic device.

The device management application may manage (e.g., install, delete, or update), for example, at least one (e.g., a function of turning on/off the external electronic device itself (or partial components) or a function of adjusting brightness (or resolution) of a display) of functions of the external electronic device (e.g., the first external electronic device 2702 or the second external electronic device 2704) which communicates with the electronic device, an application which operates in the external electronic device, or a service (e.g., a call service or a message service) provided from the external electronic device.

According to an embodiment, the application 2970 may include an application (e.g., the health card application of a mobile medical device) which is preset according to attributes of the external electronic device (e.g., the first external electronic device 2702 or the second external electronic device 2704). According to an embodiment, the application 2970 may include an application received from the external electronic device (e.g., the server 2706, the first external electronic device 2702, or the second external electronic device 2704). According to an embodiment, the application 2970 may include a preloaded application or a third party application which may be downloaded from a server. Names of the components of the program module 2910 according to various embodiments of the present disclosure may differ according to kinds of OSs.

According to various embodiments, at least part of the program module 2910 may be implemented with software, firmware, hardware, or at least two or more combinations thereof, At least part of the program module 2910 may he implemented (e.g., executed) by, for example, a processor (e.g., a processor 2720 of FIG. 27). At least part of the program module 2910 may include, for example, a module, a program, a routine, sets of instructions, or a process, and the like for performing one or more functions.

The terminology "module" used herein may mean, for example, a unit including one of hardware, software, and firmware or two or more combinations thereof. The terminology "module" may be interchangeably used with, for example, terminologies "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a RAM, or a flash memory, and the like), and the like. Also, the program instructions may include not only mechanical codes compiled by a compiler but also high-level language codes which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure as defined in the claims, and their equivalents.

The above-described embodiments of the present disclosure can be implemented in hardware, firmware or via the execution of software or computer code that can be stored in a recording medium such as a CD ROM, a DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The control unit may include a microprocessor or any suitable type of processing circuitry, such as one or more general-purpose processors (e.g., advanced reduced instruction set computing (RISC) machine (ARM)-based processors), a digital signal processor (DSP), a programmable logic device (PLD), an ASIC, a FPGA, a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and operations provided in the figures may be implemented in hardware, software or a combination of both and may be performed in whole or in part within the programmed instructions of a computer. In addition, an artisan understands and appreciates that a "processor" or "microprocessor" may be hardware in the claimed disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a touch screen display;
a pressure sensor;
an actuator;
a memory configured to store at least one instruction; and at least one processor configured to be electrically coupled with the touch screen display, the pressure sensor, the actuator, and the memory, wherein the at least one instruction, when executed by the at least one processor, is configured to cause the electronic device to:
- display a user interface (UI) including at least one object on the touch screen display,
- receive a pressure input via the pressure sensor of a specified level or more associated with selecting the object, and
- output different types of vibration feedback via the actuator depending on a difference of information associated with an object selected by the pressure input, and wherein the at least one instruction, when executed by the at least one processor, is configured to cause the electronic device to:
- if an expiration data indicated by the information associated with the object is within a specified period of time, output vibration feedback of a first frequency or a first amplitude, and
- if the expiration data indicated by the information associated with the object is greater than a specified expiration date, output vibration feedback of a second frequency relatively lower than the first frequency or second amplitude higher than the first amplitude.

2. The electronic device of claim 1, wherein the at least one instruction, when executed by the at least one processor, is configured to cause the electronic device to allow the difference between the first frequency and the second frequency to be included in a range of 100 Hz to 200 Hz.

3. An electronic device comprising:
a touch screen display;
a pressure sensor;
an actuator;
a memory configured to store at least one instruction; and
at least one processor configured to be electrically coupled with the touch screen display, the pressure sensor, the actuator, and the memory, wherein the at least one instruction, when executed by the at least one processor, is configured to cause the electronic device to:
- display a user interface (UI) including at least one object on the touch screen display,
- receive a pressure input via the pressure sensor of a specified level or more associated with selecting the object, and
- output different types of vibration feedback via the actuator depending on a difference of information associated with an object selected by the pressure input, and wherein the at least one instruction, when executed by the at least one processor, is configured to cause the electronic device to:
- if the information associated with the object includes less than a specified number of sub-objects, output vibration feedback of a first frequency or first amplitude, and
- if the information associated with the object includes the specified number of sub-objects or more, output vibration feedback of a second frequency relatively lower than the first frequency or second amplitude higher than the first amplitude.

4. An electronic device comprising:
a touch screen display;
a pressure sensor;
an actuator;
a memory configured to store at least one instruction; and
at least one processor configured to be electrically coupled with the touch screen display, the pressure sensor, the actuator, and the memory, wherein the at least one instruction, when executed by the at least one processor, is configured to cause the electronic device to:
- display a user interface (UI) including at least one object on the touch screen display,
- receive a pressure input via the pressure sensor of a specified level or more associated with selecting the object, and
- output different types of vibration feedback via the actuator depending on a difference of information associated with an object selected by the pressure input, and wherein the at least one instruction, when executed by the at least one processor, is configured to cause the electronic device to:
- if the information associated with the object includes a specified number of search results or more, output vibration feedback of a first frequency or first amplitude, and
- if the information associated with the object includes less than the specified number of search results, output vibration feedback of a second frequency relatively lower than the first frequency or second amplitude higher than the first amplitude.

5. The electronic device of claim 4, wherein the at least one instruction, when executed by the at least one processor, is configured to cause the electronic device to allow the difference between the first frequency and the second frequency to be included in a range of 100 Hz to 200 Hz.

6. The electronic device of claim 3, wherein the at least one instruction, when executed by the at least one processor, is configured to cause the electronic device to allow the difference between the first frequency and the second frequency to be included in a range of 100 Hz to 200 Hz.

* * * * *